US010662344B2

(12) United States Patent
Sato et al.

(10) Patent No.: US 10,662,344 B2
(45) **Date of Patent: *May 26, 2020**

(54) AQUEOUS DISPERSION, METHOD FOR MANUFACTURING THE SAME, AND IMAGE FORMING METHOD

(71) Applicant: FUJIFILM CORPORATION, Minato-ku, Tokyo (JP)

(72) Inventors: Noriaki Sato, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,468

(22) Filed: Jan. 10, 2018

(65) Prior Publication Data

US 2018/0127612 A1 May 10, 2018

Related U.S. Application Data

(63) Continuation of application No. PCT/JP2016/069939, filed on Jul. 5, 2016.

(30) Foreign Application Priority Data

Aug. 31, 2015 (JP) ................................ 2015-171418

(51) Int. Cl.

| | |
|---|---|
| ***C09D 11/38*** | (2014.01) |
| ***C09D 11/10*** | (2014.01) |
| ***C09D 11/102*** | (2014.01) |
| ***C08G 18/81*** | (2006.01) |
| ***C08G 18/80*** | (2006.01) |
| ***C08G 18/22*** | (2006.01) |
| ***C09D 175/16*** | (2006.01) |
| ***C08G 18/34*** | (2006.01) |
| ***C08G 18/32*** | (2006.01) |
| ***C08G 18/76*** | (2006.01) |
| ***C08F 2/50*** | (2006.01) |
| ***C08G 18/75*** | (2006.01) |
| ***C08F 2/44*** | (2006.01) |
| ***B41M 7/00*** | (2006.01) |
| ***C08G 18/72*** | (2006.01) |
| ***C09D 11/023*** | (2014.01) |
| ***C09D 11/033*** | (2014.01) |
| ***C09D 11/101*** | (2014.01) |
| ***C09D 175/04*** | (2006.01) |

(52) U.S. Cl.

CPC ........... *C09D 11/38* (2013.01); *B41M 7/0081* (2013.01); *C08F 2/44* (2013.01); *C08F 2/50* (2013.01); *C08G 18/227* (2013.01); *C08G 18/3206* (2013.01); *C08G 18/348* (2013.01); *C08G 18/728* (2013.01); *C08G 18/751* (2013.01); *C08G 18/755* (2013.01); *C08G 18/758* (2013.01); *C08G 18/7621* (2013.01); *C08G 18/7642* (2013.01); *C08G 18/8025* (2013.01); *C08G 18/8048* (2013.01); *C08G 18/8064* (2013.01); *C08G 18/8175* (2013.01); *C09D 11/023* (2013.01); *C09D 11/033* (2013.01); *C09D 11/101* (2013.01); *C09D 11/102* (2013.01); *C09D 175/04* (2013.01); *C09D 175/16* (2013.01)

(58) Field of Classification Search

CPC .... C09D 11/38; C09D 175/16; C09D 175/04; C09D 11/101; C09D 11/105; C09D 11/033; C09D 11/023; C09D 11/102; C08G 18/8064; C08G 18/5048; C08G 18/8175; C08G 18/8025; C08G 18/7642; C08G 18/7621; C08G 18/758; C08G 18/755; C08G 18/871; C08G 18/728; C08G 18/348; C08G 18/3206; C08G 18/227; C08F 2/24; C08F 2/50

See application file for complete search history.

(56) References Cited

U.S. PATENT DOCUMENTS

| | | | |
|---|---|---|---|
| 5,368,973 | A | 11/1994 | Hasegawa |
| 2011/0237700 | A1 | 9/2011 | Miyabayashi |
| 2013/0258017 | A1 | 10/2013 | Kagose et al. |

FOREIGN PATENT DOCUMENTS

| | | | | |
|---|---|---|---|---|
| JP | H04-166943 | A | | 6/1992 |
| JP | 08259888 | A | * | 10/1996 |
| JP | H08-259888 | A | | 10/1996 |
| JP | H08259888 | A | * | 10/1996 |
| JP | H09-157495 | A | | 6/1997 |
| JP | H10-182763 | A | | 7/1998 |
| JP | 2000-136211 | A | | 5/2000 |
| JP | 2008-536004 | A | | 9/2008 |
| JP | 2009-542833 | A | | 12/2009 |
| JP | 2011-201973 | A | | 10/2011 |
| JP | 2011-213114 | A | | 10/2011 |

(Continued)

OTHER PUBLICATIONS

International Search Report issued in International Application No. PCT/JP2016/069939 dated Sep. 6, 2016.

(Continued)

*Primary Examiner* — Sanz L. McClendon

(74) *Attorney, Agent, or Firm* — Solaris Intellectual Property Group, PLLC

(57) ABSTRACT

Provided is an inkjet ink including: a resin having a polymerizable resin; a gel particle which includes a polymerizable group, includes a three-dimensional cross-linked structure containing at least one selected from the group consisting of a urethane bond and a urea bond, and includes a photopolymerization initiator in the interior of the gel particle; and water, in which a total amount of a solid content of the gel particle with respect to a total amount of the resin having a polymerizable group is 0.1% by mass to 100% by mass. Also provided are a method for manufacturing the inkjet ink and an inkjet recording method using the inkjet ink.

12 Claims, No Drawings

(56) References Cited

FOREIGN PATENT DOCUMENTS

| | | | |
|---|---|---|---|
| JP | 2013-199602 | A | 10/2013 |
| WO | 2016/052053 | A1 | 4/2016 |

OTHER PUBLICATIONS

Written Opinion of the ISA issued in International Application No. PCT/JP2016/069939 dated Sep. 6, 2016.

Examination Report dated Jun. 29, 2018, issued in corresponding AU Patent Application No. 2016315218.

Extended European Search Report dated Jul. 30, 2018, issued in corresponding EP Patent Application No. 16841276.5.

English language translation of the following: Office action dated Jan. 22, 2019 from the JPO in a Japanese patent application No. 2017-537621 corresponding to the instant patent application.

Office action dated Dec. 24, 2019 from the IPO in a Indian patent application No. 201847006723 corresponding to the instant patent application.

* cited by examiner

AQUEOUS DISPERSION, METHOD FOR MANUFACTURING THE SAME, AND IMAGE FORMING METHOD

CROSS-REFERENCE TO RELATED APPLICATIONS

This application is a continuation application of International Application No. PCT/JP2016/069939, filed Jul. 5, 2016, the disclosure of which is incorporated herein by reference in its entirety. Further, this application claims priority from Japanese Patent Application No. 2015-171418, filed Aug. 31, 2015, the disclosure of which is incorporated herein by reference in its entirety.

BACKGROUND OF THE INVENTION

1. Field of the Invention

The present invention relates to an aqueous dispersion, a method for manufacturing the same, and an image forming method. More specifically, the present invention relates to an inkjet ink, a method for manufacturing the same, and an inkjet recording method.

2. Description of the Related Art

As image forming methods for forming an image on a recording medium, there are an electrophotographic method, a sublimation-type thermal transfer method, a fusion-type thermal transfer method, an ink jet method, and the like.

The ink jet image forming method has advantages such as being able to be performed using an inexpensive device and incurring low running costs because ink can be efficiently used.

As one of the ink jet image forming methods, there is an image forming method in which an ink jet ink that can be cured by being irradiated with active energy rays such as ultraviolet rays is used.

Hereinafter, the ink jet ink that can be cured by being irradiated with active energy rays will be referred to as “photocurable ink” in some cases. In addition to the ink jet ink, a composition that can be cured by being irradiated with active energy rays is referred to as “photocurable composition” in some cases.

In recent years, from the viewpoint of reducing environmental load, improving workability, and the like, instead of a solvent-based composition (for example, a solvent-based ink) containing an organic solvent as a solvent or a dispersion medium, an aqueous composition (for example, an aqueous ink) containing water as a solvent or a dispersion medium has been used in some cases.

As an aqueous photocurable composition, for example, the following composition is known.

For example, as an ink composition for an ink jet that retains the properties of being cured by ultraviolet irradiation in the presence of water or a solvent and exhibits excellent jetting stability, an ink composition for an ink jet is known which contains water, a coloring material, a resin emulsion formed of a compound having a radically polymerizable group, an inorganic particle dispersion, and a photoradical initiator (for example, see JP2013-199602A).

As an aqueous emulsion which can be cured by heat or light and can be suitably used in a coating agent and the like, an aqueous emulsion is known which contains a vinyl-based polymer having a specific acryl functional group on at least one terminal of the polymer (for example, see JP2000-136211A).

Furthermore, as photocurable compositions not being limited to the aqueous compositions, for example, the following compositions are known.

For example, as a color developing photosensitive composition which has excellent post-exposure color developing stability by the infrared laser exposure and exhibits high color developability even by being subjected to exposure after the lapse of time, a color developing photosensitive composition is known which contains microgel containing a polymer having a glass transition temperature of equal to or higher than 50° C. in the interior thereof, a photoinitiator, and an infrared absorbing dye, and a binder polymer (for example, see JP2011-213114A).

As an ink jet printing ink cured by irradiation, an ink jet ink is known which contains at least one irradiation curable-type monomer, at least one inert thermoplastic resin, at least one radical photoinitiator, and at least one colorant and has a viscosity less than 100 mPas at 25° C., in which the content of at least one inert resin with respect to the total weight of the ink is 2% to 15% by weight, and the ink has a molecular weight of 1,500 to 70,000 (for example, see JP2009-542833A).

Furthermore, as an energy curable-type aqueous composition having improved characteristics, an energy curable-type aqueous composition containing water, an ethylenically unsaturated oligomer, and a resin not containing an energy curable-type functional group is known (for example, see JP2008-536004A)

SUMMARY OF THE INVENTION

In recent years, in a case where a cured film (for example, an image) is formed on a substrate (for example, a recording medium) using a photocurable composition (for example, a photocurable ink), a further improvement of the hardness of the cured film has been required.

Regarding the aforementioned point, the ink composition for an ink jet described in JP2013-199602A, the aqueous emulsion described in JP2000-136211A, the color developing photosensitive composition described in JP2011-213114A, and the energy curable-type aqueous composition described in JP2008-536004A tend to exhibit insufficient sensitivity to light, and accordingly, the hardness of a cured film (an image) formed of these tends to be insufficient. In addition, the compositions described in these documents tend to have poor storage stability.

The components of the ink jet ink described in JP2009-542833A are considered as components that are not easily dissolved or dispersed in water. Accordingly, the ink jet ink described in JP2009-542833A is considered difficult to be prepared as an aqueous dispersion.

Meanwhile, in a case where a cured film (for example, an image) is formed on a substrate (for example, a recording medium) is formed using a photocurable composition (for example, a photocurable ink), a further improvement of the surface conditions of the cured film is also required.

An embodiment of the present invention is based on the circumstances described above, and is for achieving the following objects.

That is, an object of the embodiment of the present invention is to provide an aqueous dispersion, which makes it possible to form a film having excellent hardness and excellent surface conditions and has excellent storage stability, and a method for manufacturing the aqueous dispersion.

The other object of the embodiment of the present invention is to provide an image forming method which makes it possible to form an image having excellent hardness and excellent surface conditions.

Specific means for achieving the aforementioned objects are as below.

<1> An aqueous dispersion, including:

a resin having a polymerizable group;

a gel particle which includes a polymerizable group, includes a three-dimensional cross-linked structure including at least one selected from the group consisting of a urethane bond and a urea bond, and includes a photopolymerization initiator in the interior of the gel particle; and water, in which a total amount of a solid content of the gel particle with respect to a total amount of the resin having a polymerizable group is 0.1% by mass to 100% by mass.

<2> The aqueous dispersion described in <1>, in which the photopolymerization initiator includes at least one selected from the group consisting of a carbonyl compound and an acylphosphine oxide compound.

<3> The aqueous dispersion described in <1> or <2>, in which the gel particle further includes a hydrophilic group on a surface of the gel particle.

<4> The aqueous dispersion described in any one of <1> to <3>, in which the gel particle includes a polymerizable monomer in the interior of the gel particle.

<5> The aqueous dispersion described in any one of <1> to <4>, in which the gel particle includes a sensitizer in the interior of the gel particle.

<6> The aqueous dispersion described in any one of <1> to <5>, in which the resin having a polymerizable group includes a polyurethane structure.

<7> The aqueous dispersion described in any one of <1> to <6>, in which a total amount of a solid content of the gel particle with respect to a total amount of the resin having a polymerizable group is 5% by mass to 75% by mass.

<8> The aqueous dispersion described in any one of <1> to <7>, in which a content of the resin having a polymerizable group with respect to a total amount of the aqueous dispersion is 2% by mass to 40% by mass.

<9> A method for manufacturing the aqueous dispersion described in any one of <1> to <8>, the method including:

preparing a gel particle dispersion including the gel particle and water; and mixing the gel particle dispersion with the resin having a polymerizable group to obtain the aqueous dispersion.

<10> The method for manufacturing the aqueous dispersion described in <9>, in which the preparation includes:

obtaining an emulsion by mixing and emulsifying any one oil-phase component selected from the group consisting of an oil-phase component containing a photopolymerization initiator, an isocyanate compound having three or more functional groups, a polymerizable monomer, and an organic solvent, an oil-phase component containing a photopolymerization initiator, a polymerizable group-containing isocyanate compound having three or more functional groups, and an organic solvent, and an oil-phase component containing a photopolymerization initiator, a polymerizable group-containing isocyanate compound having three or more functional groups, a polymerizable monomer, and an organic solvent, with a water-phase component containing water; and obtaining the gel particle dispersion by heating the emulsion.

<11> The method for manufacturing the aqueous dispersion described in <10>, in which the isocyanate compound having three or more functional groups in the oil-phase component includes an isocyanate compound derived from at least one selected from the group consisting of isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane 4,4'-diisocyanate.

<12> An image forming method, including:

applying the aqueous dispersion described in any one of <1> to <8> onto a recording medium; and irradiating the aqueous dispersion applied onto the recording medium with an active energy ray.

According to an embodiment of the present invention, there are provided an aqueous dispersion, which makes it possible to form a film having excellent hardness and excellent surface conditions and has excellent storage stability, and a method for manufacturing the aqueous dispersion.

Furthermore, according to the embodiment of the present invention, there is provided an image forming method which makes it possible to form an image having excellent hardness and excellent surface conditions.

DESCRIPTION OF THE PREFERRED EMBODIMENTS

Hereinafter, specific embodiments of the present invention will be described in detail, but the present invention is not limited to the following embodiments.

In the present specification, a range of numerical values described using "to" means a range including the numerical values listed before and after "to" as a minimum value and a maximum value.

In the present specification, in a case where there are a plurality of substances corresponding to each component in a composition, unless otherwise specified, the amount of each component in the composition means the total amount of the plurality of substances present in the composition.

In the present specification, the term "step" means not only an independent step, but also a step that cannot be clearly distinguished from other steps as long as the intended goal of the step is accomplished.

In the present specification, conceptually, "light" includes active energy rays such as γ-rays, β-rays, electron beams, ultraviolet rays, visible rays, and infrared rays.

In the present specification, the ultraviolet rays are referred to as "UV (Ultra Violet) light" in some cases.

In the present specification, the light emitted from a Light Emitting Diode (LED) light source is referred to as "LED light" in some cases.

In the present specification, "(meth)acrylic acid" conceptually includes both the acrylic acid and the methacrylic acid, "(meth)acrylate" conceptually includes both the acrylate and the methacrylate, and "(meth)acryloyl group" conceptually includes both the acryloyl group and the methacryloyl group.

[Aqueous Dispersion]

The aqueous dispersion of the present disclosure contains: a resin having a polymerizable group (hereinafter, referred to as "polymerizable resin" as well); gel particles, each of which has a polymerizable group, has a three-dimensional cross-linked structure containing at least one kind of bond selected from a urethane bond and a urea bond, and contains a photopolymerization initiator in the interior of each of the gel particles; and water, in which the total amount of solid content(s) of the gel particles with respect to the total amount of the polymerizable resin is 0.1% by mass to 100% by mass.

The aqueous dispersion of the present disclosure contains the polymerizable resin separately from the gel particles (that is, the aqueous dispersion contains the polymerizable resin in the exterior of the gel particles), and the amount of the total solid content of the gel particles with respect to the total amount of the polymerizable resin is 0.1% by mass to 100% by mass. That is, the aqueous dispersion of the present disclosure contains a relatively large amount of polymerizable resin separately from the gel particles (specifically, the content of the polymerizable resin is equal to or greater than the amount of the total solid content of the gel particles).

In the present specification, "the aqueous dispersion contains the polymerizable resin in the exterior of the gel particles" means that the aqueous dispersion contains a polymerizable resin that is not contained in the interior of the gel particles. The same is true for a case where the aqueous dispersion contains other components (a photopolymerization initiator, a polymerizable monomer, and the like) in the exterior of the gel particles.

Furthermore, in the present specification, in a case where the gel particles contain a solvent (an organic solvent, water, and the like; the same shall be applied hereinafter), the total solid content of the gel particles means the total amount of the gel particles including the photopolymerization initiator and the like contained in the interior of the gel particles except for the solvent from the gel particles. In a case where the gel particles do not contain a solvent, the total solid content of the gel particles means the total amount of the gel particles including the photopolymerization initiator and the like contained in the interior of the gel particles.

According to the aqueous dispersion of the present disclosure, it is possible to form a film having excellent hardness (for example, pencil hardness) and excellent surface conditions. Furthermore, the aqueous dispersion of the present disclosure has excellent storage stability.

The reason why the aqueous dispersion of the present disclosure brings about the aforementioned effects is unclear, but is assumed to be as below according to the inventors of the present invention.

Regarding the hardness of the film, the assumption made by the inventors of the present invention is as below.

In the aqueous dispersion of the present disclosure, the gel particles each have a polymerizable group and contain a photopolymerization initiator in the interior of each of the gel particles. Accordingly, in the aqueous dispersion of the present disclosure, the distance between the polymerizable group and the photopolymerization initiator is shorter than in an aqueous dispersion of the related art (for example, an aqueous emulsion containing resin particles, which each have a polymerizable group but do not contain a photopolymerization initiator in the interior of each of the gel particles, and a photopolymerization initiator). It is considered that for this reason, in a case where a film is formed using the aqueous dispersion of the present disclosure, and the formed film is cured by being irradiated with light, the curing sensitivity (hereinafter, simply referred to as "sensitivity" as well) of the film is further improved than in a case where the aqueous dispersion of the related art is used, and hence a film having excellent hardness is formed.

Furthermore, the aqueous dispersion of the present disclosure contains a relatively large amount of polymerizable resin in the exterior of the gel particles (specifically, the content of the polymerizable resin is equal to or greater than the amount of the total solid content of the gel particles). The gel particles are considered to function as a photopolymerization initiator for the polymerizable resin contained in the aqueous dispersion in the aforementioned content. More specifically, it is considered that the photopolymerization initiator contained in the interior of the gel particles acts not only on the polymerizable group of the gel particles but also on the polymerizable group of the polymerizable resin contained in the aqueous dispersion in the aforementioned content. It is considered that as a result, in a case where the aqueous dispersion of the present disclosure is used, a film can be cured with excellent sensitivity, and hence a film having excellent hardness is formed.

In addition, the fact that the three-dimensional cross-linked structure of the gel particles contains at least one kind of bond selected from a urethane bond and a urea bond also makes a contribution to the improvement of the hardness of the film.

It is considered that for the reasons described above, according to the aqueous dispersion of the present disclosure, a film having excellent hardness can be formed.

Furthermore, regarding the surface conditions of the film, the assumption made by the inventors of the present invention is as below.

The inventors of the present invention consider that one of the reasons why the aqueous dispersion of the present disclosure makes it possible to form a film having excellent surface conditions is that the aqueous dispersion of the present disclosure contains a relatively large amount of resin component (specifically, a polymerizable resin). The inventors also consider that another reason why the aqueous dispersion of the present disclosure makes it possible to form a film having excellent hardness is that the curing uniformity of the film is improved due to the polymerizable group of the polymerizable resin.

Moreover, regarding the storage stability of the aqueous dispersion, the assumption made by the inventors of the present invention is as below.

That is, in the aqueous dispersion of the present disclosure, the gel particles each contain a photopolymerization initiator in the interior thereof. It is considered that, accordingly, compared to a case where the gel particles do not contain the photopolymerization initiator in the interior thereof, the precipitation of the photopolymerization initiator that occurs over time is further inhibited, and hence the storage stability of the aqueous dispersion is improved.

Unlike the particles contained in the aqueous dispersion of the present disclosure, none of the particles contained in the resin emulsion in the ink composition for an ink jet described in JP2013-199602A and the aqueous emulsion described in JP2000-136211A have a three-dimensional cross-linked structure and are gel particles. Furthermore, the microgel in the color developing photosensitive composition described in JP2011-213114A does not have a polymerizable group. In addition, the energy curable-type aqueous composition described in JP2008-536004A does not contain gel particles which each have a polymerizable group and contain a photopolymerization initiator in the interior of the gel particles.

It is considered that consequently, the film formed of any of the compositions described in the above documents has poor hardness compared to the film formed of the aqueous dispersion of the present disclosure, and has poor storage stability.

It is considered that the components of the ink jet ink described in JP2009-542833A are components that are not easily dissolved or dispersed in water. Accordingly, it is considered that it is difficult to prepare the ink jet ink described in JP2009-542833A as an aqueous dispersion.

The aqueous dispersion of the present disclosure also makes it possible to form a film exhibiting excellent adhesiveness with respect to a substrate.

As described above, the aqueous dispersion of the present disclosure contains gel particles which each have a polymerizable group and contain a photopolymerization initiator in the interior of the gel particles, and hence a film can be cured with excellent sensitivity. It is considered that for this reason, the aqueous dispersion makes it possible to form a film exhibiting excellent adhesiveness with respect to a substrate.

Furthermore, because the aqueous dispersion of the present disclosure contains the resin component (the polymerizable resin), the cure shrinkage of a film can be inhibited, and hence the adhesiveness between the film and a substrate is inhibited from deteriorating due to the cure shrinkage of the film. It is considered that for this reason, the aqueous dispersion makes it possible to form a film exhibiting excellent adhesiveness with respect to a substrate.

In addition, because the polymerizable resin has a polymerizable group, the adhesiveness between the film and a substrate is improved by polymerization. It is considered that for this reason, the aqueous dispersion makes it possible to form a film exhibiting excellent adhesiveness with respect to a substrate.

An aqueous dispersion of particles is required to have redispersibility in some cases.

Herein, "redispersibility" means the properties in which in a case where an aqueous liquid (for example, water, an aqueous solution, an aqueous dispersion, or the like) is supplied to a solidified product formed by the evaporation of water from the aqueous dispersion, the particles in the solidified product are dispersed again in the aqueous liquid. Examples of the solidified product include a solidified product of an aqueous dispersion formed on a coating head or an ink jet head.

Because the aqueous dispersion of the present disclosure contains the gel particles, the aqueous dispersion also has excellent redispersibility.

In a case where the aqueous dispersion of the present disclosure is used, for example, as an ink composition for ink jet recording (hereinafter, simply referred to as "ink composition" as well), the aqueous dispersion exhibits excellent jetting properties.

It is considered that this is because the aqueous dispersion of the present disclosure has excellent redispersibility as described above. That is, even though water in the aqueous dispersion as an ink composition evaporates, and hence the gel particles are fixed to the vicinity of a nozzle of an ink jet recording device, by supplying a new ink composition (that is, the aqueous dispersion), the gel particles are easily dispersed again, and the occurrence of nozzle clogging can be inhibited. It is considered that for this reason, the aqueous dispersion of the present disclosure also has excellent jetting properties.

In the aqueous dispersion of the present disclosure, as described above, the amount of the total solid content of the gel particles with respect to the total amount of the polymerizable resin is 0.1% by mass to 100% by mass.

Herein, "amount of the total solid content of the gel particles with respect to the total mass of the polymerizable resin" refers to the amount represented by the following equation.

Amount of total solid content of gel particles with respect to total amount of polymerizable resin (% by mass)=(total amount of total solid content of gel particles contained in aqueous dispersion/total content of polymerizable resin contained in aqueous dispersion)×100

In a case where the amount of the total solid content of the gel particles with respect to the total amount of the polymerizable resin is equal to or greater than 0.1% by mass, the effect such as the improvement of the hardness of the film resulting from the gel particles is effectively exhibited.

In a case where the amount of the total solid content of the gel particles with respect to the total amount of the polymerizable resin is equal to or smaller than 100% by mass, the effect such as the improvement of the surface conditions of the film that is brought about by the polymerizable resin is effectively exhibited.

As described above, the amount of the total solid content of the gel particles with respect to the total amount of the polymerizable resin is 0.1% by mass to 100% by mass. From the viewpoint of the hardness and surface conditions of the film, the amount of the total solid content of the gel particles is preferably equal to or greater than 0.1% by mass and less than 100% by mass, more preferably 1% by mass to 100% by mass, even more preferably 5% by mass to 75% by mass, and particularly preferably 10% by mass to 50% by mass.

The content of the polymerizable resin in the aqueous dispersion with respect to the total amount of the aqueous dispersion is preferably 2% by mass to 40% by mass, more preferably 3% by mass to 30% by mass, and particularly preferably 7% by mass to 20% by mass.

The fact that the gel particles in the aqueous dispersion of the present disclosure contain a photopolymerization initiator in the interior thereof has an advantage that a photopolymerization initiator exhibiting low solubility in water (for example, a photopolymerization initiator exhibiting solubility equal to or lower than 1.0% by mass in water at 25° C.) or a photopolymerization initiator having low dispersibility is readily used as a photopolymerization initiator.

In the aqueous dispersion of the present disclosure, the gel particles contain a photopolymerization initiator in the interior thereof. As a result, a range of choice of the photopolymerization initiators to be used broadens, and hence a range of choice of the light source to be used also broadens. Consequently, the curing sensitivity can be further improved compared to the related art.

For example, a carbonyl compound and an acylphosphine oxide compound (particularly, an acylphosphine oxide compound) are photopolymerization initiators showing particularly excellent curing sensitivity to the irradiation of active energy rays.

However, because the carbonyl compound and the acylphosphine oxide compound exhibit low solubility in water, it is difficult to incorporate these compounds into an aqueous composition in the related art.

In the aqueous dispersion of the present disclosure, the gel particles contain a photopolymerization initiator in the interior thereof. Accordingly, as the photopolymerization initiator, it is possible to select a photopolymerization initiator such as a carbonyl compound and an acylphosphine oxide compound which exhibit excellent sensitivity to light but show low solubility in water.

From the viewpoints described above, the photopolymerization initiator contained in the interior of the gel particles preferably includes at least one of the carbonyl compound or the acylphosphine oxide compound, and more preferably includes an acylphosphine oxide compound.

In a case where the photopolymerization initiator is an acylphosphine oxide compound, the sensitivity to light, particularly, the sensitivity to LED light is improved.

The wavelength of the LED light is preferably 355 nm, 365 nm, 385 nm, 395 nm, or 405 nm.

The gel particles may contain components (a polymerizable monomer, a sensitizer, a resin, and the like) other than the photopolymerization initiator in the interior of the gel particles.

In the aqueous dispersion of the present disclosure, a substance showing low solubility in water is contained in the interior of the gel particles, and in this way, such a substance can be incorporated into the aqueous dispersion which is an aqueous composition. This is one of the advantageous of the aqueous dispersion of the present disclosure.

<Internal Containment>

In the present specification, for example, a description of "the photopolymerization initiator is contained in the gel particles" means that the photopolymerization initiator is contained in the interior of the gel particles. Herein, "interior of the gel particles" means a void of the three-dimensional cross-linked structure.

In the aqueous dispersion of the present disclosure, from the viewpoint of the curing sensitivity of a film, an internal content rate (% by mass) of the photopolymerization initiator is preferably equal to or higher than 10% by mass, more preferably equal to or higher than 50% by mass, even more preferably equal to or higher than 70% by mass, still more preferably equal to or higher than 80% by mass, yet more preferably equal to or higher than 90% by mass, much more preferably equal to or higher than 95% by mass, far more preferably equal to or higher than 97% by mass, and particularly preferably equal to or higher than 99% by mass.

In a case where the aqueous dispersion contains two or more kinds of photopolymerization initiators, it is preferable that the internal content rate of at least one kind of photopolymerization initiator is within the aforementioned preferable range.

The internal content rate (% by mass) of the photopolymerization initiator means the amount of the photopolymerization initiator contained in the interior of the gel particles with respect to the total amount of the photopolymerization initiators in the prepared aqueous dispersion, and refers to a value obtained as below.

—Method for Measuring Internal Content Rate (% by Mass) of Photopolymerization Initiator—

The operation described below is performed under the condition of a liquid temperature of 25° C.

In a case where the aqueous dispersion does not contain a pigment, the operation described below is performed using the aqueous dispersion as it is. In a case where the aqueous dispersion contains a pigment, first, the pigment is removed from the aqueous dispersion by centrifugation, and then the operation described below is performed on the aqueous dispersion from which the pigment has been removed.

First, from the aqueous dispersion, two samples (hereinafter, referred to as "sample 1" and "sample 2") of the same mass are collected.

Tetrahydrofuran (THF) having a mass 500 times the mass of the total solid content in the sample 1 is added to and mixed with the sample 1, thereby preparing a diluted solution. The obtained diluted solution is subjected to centrifugation under the condition of 80,000 rounds per minute (rpm; the same shall apply hereinafter) and 40 minutes. The supernatant (hereinafter, referred to as "supernatant 1") generated by the centrifugation is collected. It is considered that by this operation, all of the photopolymerization initiators contained in the sample 1 is extracted into the supernatant 1. The mass of the photopolymerization initiator contained in the collected supernatant 1 is measured by liquid chromatography (for example, a liquid chromatography device manufactured by Waters Corporation). The obtained mass of the photopolymerization initiator is taken as "total amount of photopolymerization initiator".

Furthermore, the sample 2 is subjected to centrifugation under the same conditions as in the centrifugation performed on the aforementioned diluted solution. The supernatant (hereinafter, referred to as "supernatant 2") generated by the centrifugation is collected. It is considered that by this operation, the photopolymerization initiator that was not contained in the interior of the gel particles in the sample 2 (that is, the free photopolymerization initiator) is extracted into the supernatant 2. The mass of the photopolymerization initiator contained in the collected supernatant 2 is measured by liquid chromatography (for example, a liquid chromatography device manufactured by Waters Corporation). The obtained mass of the photopolymerization initiator is taken as "amount of the free photopolymerization initiator".

Based on "total amount of photopolymerization initiator" and "amount of free photopolymerization initiator" described above, the internal content rate (% by mass) of the photopolymerization initiator is calculated according to the equation shown below.

Internal content rate (% by mass) of photopolymerization initiator=((total amount of photopolymerization initiator−amount of free photopolymerization initiator)/total amount of photopolymerization initiator)×100

In a case where the aqueous dispersion contains two or more kinds of photopolymerization initiators, by using the total amount of the two or more kinds of photopolymerization initiators as "total amount of photopolymerization initiators" and using the total amount of the two or more kinds of free photopolymerization initiators as "amount of free photopolymerization initiators", the total internal content rate of the two or more kinds of photopolymerization initiators may be determined. Alternatively, by using the amount of one kind of photopolymerization initiator as "total amount of photopolymerization initiator" and using the amount of the other one kind of free photopolymerization initiator as "amount of free photopolymerization initiator", the internal content rate of any one kind of photopolymerization initiator may be determined.

Whether or not the components other than the photopolymerization initiator are contained in the interior of the gel particles can be checked by the same method as the method for investigating whether or not the photopolymerization initiator is contained in the interior of the gel particles.

Here, for a compound having a molecular weight equal to or greater than 1,000, by measuring the masses of the compounds contained in the supernatant 1 and the supernatant 2 described above by gel permeation chromatography (GPC) and taking the masses as "total amount of compound" and "amount of free compound" respectively, the internal content rate (% by mass) of the compound is determined.

In the present specification, the mass of a compound is measured by a gel permeation chromatography (GPC), by using HLC (registered trademark)-8020 GPC (manufactured by Tosoh Corporation) as a measurement device, three columns of TSKgel (registered trademark) Super Multipore HZ-H (4.6 mm ID×15 cm, manufactured by Tosoh Corporation) as columns, and tetrahydrofuran (THF) as an eluent. Furthermore, GPC is performed using an RI detector under the measurement conditions of a sample concentration of 0.45% by mass, a flow rate of 0.35 ml/min, a sample injection amount of 10 μL, and a measurement temperature of 40° C.

A calibration curve is prepared from 8 samples of "Standard Sample TSK standard, polystyrene" manufactured by Tosoh Corporation: "F-40", "F-20", "F-4", "F-1", "A-5000", "A-2500", "A-1000", and "n-propylbenzene".

<Three-Dimensional Cross-Linked Structure>

In the present specification, "three-dimensional cross-linked structure" refers to a three-dimensional network structure formed by cross-linking. In the aqueous dispersion of the present disclosure, each of the gel particles are formed in such a manner that the three-dimensional cross-linked structure is formed in each of the particles.

That is, in the present specification, "the particles each have a three-dimensional cross-linked structure" has the same definition as "the particles are gel particles".

Whether the aqueous dispersion contains the gel particles having a three-dimensional cross-linked structure is checked as below. The operation described below is performed under the condition of a liquid temperature of 25° C.

In addition, in a case where the aqueous dispersion does not contain a pigment, the operation described below is performed using the aqueous dispersion as it is. In a case where the aqueous dispersion contains a pigment, first, the pigment is removed from the aqueous dispersion by centrifugation, and then the operation described below is performed on the aqueous dispersion from which the pigment has been removed.

A sample is collected from the aqueous dispersion. Tetrahydrofuran (THF) having a mass 500 times the mass of the total solid content in the sample is added to and mixed with the collected sample, thereby preparing a diluted solution. The obtained diluted solution is subjected to centrifugation under the condition of 80,000 rpm and 40 minutes. After the centrifugation, whether there are residues is checked by visual observation. In a case where there are residues, a redispersion liquid is prepared by redispersing the residues in water. For the obtained redispersion liquid, by using a wet-type particle size distribution measurement apparatus (LA-910, manufactured by HORIBA, Ltd.), the particle size distribution is measured by a light scattering method.

In a case where the particle size distribution can be checked by the operation described above, it is determined that the aqueous dispersion contains gel particles having a three-dimensional cross-linked structure.

<Polymerizable Group>

In the aqueous dispersion of the present disclosure, as the polymerizable group of the polymerizable resin and the polymerizable group of the gel particles, a group containing an ethylenic double bond is preferable, and a group containing at least one of a vinyl group or a 1-methylvinyl group is more preferable.

As the polymerizable group, from the viewpoint of the polymerization reactivity and the hardness of the formed film, a (meth)acryloyl group is particularly preferable.

Each of the polymerizable resin and the gel particles may contain only one kind of polymerizable group or contain two or more kinds of polymerizable groups.

Furthermore, the polymerizable group of the polymerizable resin and the polymerizable group of the gel particles may be the same type of group or different types of groups.

In the present specification, "gel particles have a polymerizable group" means that the gel particles have at least one of the polymerizable group contained in the three-dimensional cross-linked structure or the polymerizable group not being contained in the three-dimensional cross-linked structure.

That is, in the gel particles, the polymerizable group may be present as a part of the three-dimensional cross-linked structure or may be present as a portion other than the three-dimensional cross-linked structure.

"Polymerizable group is present as a portion other than the three-dimensional cross-linked structure" means that a polymerizable monomer (that is, a monomer having a polymerizable group) is contained in the gel particles.

In any case, it is preferable that the polymerizable group is present on the surface portion (portion coming into contact with water) of the gel particles.

Whether the "gel particles have a polymerizable group" can be checked, for example, by Fourier transform infrared spectroscopy (FT-IR).

From the viewpoint of the sensitivity and the hardness of the film, it is preferable that the gel particles contain a monomer having a polymerizable group (polymerizable monomer) in the interior of the gel particles.

Preferable aspects of the monomer having a polymerizable group (polymerizable monomer) will be specifically described later.

Furthermore, it is preferable that gel particles each have a hydrophilic group on the surface thereof.

In a case where the gel particles have a hydrophilic group on the surface thereof, the dispersibility of the gel particles in the aqueous dispersion is further improved.

Furthermore, in a case where the gel particles each have a hydrophilic group on the surface thereof, the hydrophilicity of the gel particles is improved, and the storage stability and the redispersibility thereof becomes excellent.

In the gel particles, the hydrophilic group may be present as a part of the three-dimensional cross-linked structure or may be present as a portion other than the three-dimensional cross-linked structure.

Herein, "hydrophilic group is present as a part of the three-dimensional cross-linked structure" means that a covalent bond is formed between the hydrophilic group and a portion of the three-dimensional cross-linked structure other than the hydrophilic group.

In addition, "hydrophilic group is present as a portion other than the three-dimensional cross-linked structure" means that the gel particles contain a compound having a hydrophilic group, separately from the three-dimensional cross-linked structure.

Examples of the hydrophilic group present on the surface of each of the gel particles include a carboxyl group, a salt of a carboxyl group, a phosphonic acid group, a salt of a phosphonic acid group, a phosphoric acid group, a salt of a phosphoric acid group, a sulfo group, a salt of a sulfo group, a sulfuric acid group, a salt of a sulfuric acid group, a group having a polyether structure, a group having a betaine structure, and the like.

The salt of a carboxyl group, the salt of a sulfo group, the salt of a sulfuric acid group, the salt of a phosphonic acid group, and the salt of phosphoric acid group described above may be the salts formed by neutralization in the process of manufacturing the gel particles. In a case where the gel particles each have a hydrophilic group on the surface thereof, the gel particles may each have only one kind of hydrophilic group or two or more kinds of hydrophilic groups.

In the present specification, "hydrophilic group" is distinguished from an active hydrogen group (a hydroxyl group, a primary amino group, a secondary amino group, and a mercapto group) which will be described later.

The hydrophilic group present on the surface of each of the gel particles is preferably at least one kind of hydrophilic group selected from a group having a polyether structure, a carboxyl group, and a salt of a carboxyl group.

The group having a polyether structure is preferably a monovalent group including a polyalkylene oxy group, and more preferably a group (WS) represented by Formula (WS).

$$*\!\left(R^{W1}-O\right)_{nw}R^{W2}$$ Formula (WS)

In Formula (WS), $R^{W1}$ represents an alkylene group having 1 to 6 carbon atoms that may be branched, $R^{W2}$ represents an alkyl group having 1 to 6 carbon atoms that may be branched, nw represents an integer of 2 to 200, and * represents a binding position.

In Formula (WS), the number of carbon atoms in the alkylene group represented by $R^{W1}$ having 1 to 6 carbon atoms that may be branched is preferably 2 to 4, more preferably 2 or 3, and particularly preferably 2 (that is, $R^{W1}$ is particularly preferably an ethylene group).

In Formula (WS), the number of carbon atoms in the alkyl group represented by $R^{W2}$ having 1 to 6 carbon atoms that may be branched is preferably 1 to 4, and particularly preferably 1 (that is, $R^{W2}$ is particularly preferably a methyl group).

In Formula (WS), nw represents an integer of 2 to 200. nw is preferably an integer of 10 to 200, more preferably an integer of 10 to 150, even more preferably an integer of 20 to 150, and particularly preferably an integer of 20 to 100.

It is preferable that the gel particles each contain a sensitizer in the interior thereof.

In a case where the aqueous dispersion of the present disclosure contains a sensitizer, the decomposition of the photopolymerization initiator by the irradiation of active energy rays can be further accelerated. At this time, in a case where the gel particles each contain the sensitizer in the interior thereof, the reactivity with the photopolymerization initiator is further improved. As a result, the sensitivity and the hardness of the film are further improved.

The preferable range of the sensitizer will be described later.

From the viewpoint of further improving the hardness of the film and from the viewpoint of further improving the adhesiveness between the film and the substrate (particularly, the adhesiveness with respect to a polyethylene terephthalate (PET) substrate), it is preferable that the polymerizable resin has a polyurethane structure.

The aqueous dispersion of the present disclosure can be suitably used as a liquid for forming a film (for example, an image) on a substrate (for example, a recording medium).

Examples of such a liquid include an ink composition for forming an image on a substrate as a recording medium (for example, an ink composition for ink jet recording), a coating solution for forming a coating film on a substrate (for example, a photosensitive resin composition such as a coating agent, an adhesive, and a paint), and the like.

It is particularly preferable that the aqueous dispersion of the present disclosure is used for ink jet recording (that is, it is particularly preferable that the aqueous dispersion of the present disclosure is used as an ink composition for ink jet recording).

The ink composition (preferably the ink composition for ink jet recording), which is one of the uses of the aqueous dispersion of the present disclosure, may be an ink composition containing a coloring material or a transparent ink composition (referred to as "clear ink" or the like in some cases) which does not contain a coloring material.

The same is true for a coating solution which is another use of the aqueous dispersion of the present disclosure.

The substrate for forming a film by using the aqueous dispersion of the present disclosure is not particularly limited, and for example, a substrate known as a support or a recording material can be used.

Examples of the substrate include paper, paper on which plastic (for example, polyethylene, polypropylene, polystyrene, or the like) is laminated, a metal plate (for example, a plate of a metal such as aluminum, zinc, or copper), a plastic film (for example, films of a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, an acrylic resin, and the like), paper on which the aforementioned metal is laminated or vapor-deposited, a plastic film on which the aforementioned metal is laminated or vapor-deposited, and the like.

The aqueous dispersion of the present disclosure is particularly suitable for uses in which a film is formed on a nonabsorbent substrate, because the aqueous dispersion makes it possible to form a film exhibiting excellent adhesiveness with respect to a substrate.

As the nonabsorbent substrate, plastic substrates such as a polyvinyl chloride (PVC) substrate, a polystyrene (PS) substrate, a polycarbonate (PC) substrate, a polyethylene terephthalate (PET) substrate, a polypropylene (PP) substrate, and an acrylic resin substrate are preferable.

Hereinafter, a preferable range of the aqueous dispersion of the present disclosure will be more specifically described.

<Polymerizable Resin>

The aqueous dispersion of the present disclosure contains a polymerizable resin (that is, a resin having a polymerizable group) separately from the gel particles (that is, the aqueous dispersion contains the polymerizable resin in the exterior of the gel particles).

By having a polymerizable group, the polymerizable resin makes a contribution to the improvement of the hardness of the film, the improvement of the adhesiveness between the film and the substrate, and the improvement of the surface conditions of the film.

Furthermore, because the polymerizable resin is a resin, the polymerizable resin makes a contribution to the improvement of the surface conditions of the film and the inhibition of the cure shrinkage (the improvement of the adhesiveness between the film and the substrate).

The aqueous dispersion of the present disclosure may contain only one kind of polymerizable resin or two or more kinds of polymerizable resins.

In addition, as long as the effects of the present disclosure are not impaired, the aqueous dispersion of the present disclosure may contain a resin not having a polymerizable group.

As described above, as the polymerizable resin, a resin having a polyurethane structure (for example, polyurethane) is preferable. Examples of the polymerizable resin also include an ethylene oxide-modified acrylate (hereinafter, referred to as "EO-modified acrylate" as well), a water-soluble epoxy acrylate, a water-soluble carboxylic acid-modified acrylate, a water-soluble phosphoric acid-modified acrylate, a water-soluble polyester acrylate, and the like. "Water-soluble" mentioned herein has the same definition as "Water-soluble" in the water-soluble resin which will be described later.

As described above, as the polymerizable group in the polymerizable resin, a group containing an ethylenic double bond is preferable, and a group containing at least one of a vinyl group or a 1-methylvinyl group is more preferable, and a (meth)acryloyl group is particularly preferable.

The polymerizable resin is preferably a water-soluble resin or a water-dispersible resin, and more preferably a water-dispersible resin.

Herein, "water-soluble" in the water-soluble resin refers to a property in which in a case where the resin is dried for 2 hours at 105° C., the amount of the resin dissolving in 100 g of distilled water with a temperature of 25° C. is greater than 1 g.

Furthermore, "water-dispersible" in the water-dispersible resin refers to a property in which the resin is water-insoluble but is dispersed in water. Herein, "water-insoluble" refers to a property in which in a case where the resin is dried for 2 hours at 105° C., the amount of the resin dissolving in 100 g of distilled water with a temperature of 25° C. is equal to or smaller than 1 g.

In addition, the polymerizable resin is preferably a resin having a functional group selected from a carboxyl group, a salt of a carboxyl group, a sulfo group, a salt of a sulfo group, a sulfuric acid group, a salt of a sulfuric acid group, a phosphonic acid group, a salt of a phosphonic acid group, a phosphoric acid group, a salt of a phosphoric acid group, an ammonium base, a hydroxyl group, a carboxylic acid amide group, and an alkyleneoxy group.

As a countercation of the aforementioned salt, an alkali metal cation such as sodium or potassium, an alkali earth metal cation such as calcium or magnesium, an ammonium cation, or a phosphonium cation is preferable, and an alkali metal cation is particularly preferable.

As an alkyl group contained in the ammonium group of the ammonium base, a methyl group or an ethyl group is preferable.

As a counteranion of the ammonium base, a halogen anion such as chlorine or bromine, a sulfate anion, a nitrate anion, a phosphate anion, a sulfonate anion, a carboxylate anion, or a carbonate anion is preferable, and a halogen anion, a sulfonate anion, or a carboxylate anion is particularly preferable.

As a substituent on a nitrogen atom of the carboxylic acid amide group, an alkyl group having 8 or less carbon atoms is preferable, and an alkyl group having 6 or less carbon atoms is particularly preferable.

The resin having an alkyleneoxy group preferably has an alkyleneoxy chain formed of repeating alkyleneoxy groups. The number of alkyleneoxy groups contained in the alkyleneoxy chain is preferably 2 or greater, and particularly preferably 4 or greater.

From the viewpoint of further improving the surface conditions of the film, the adhesiveness between the film and the substrate, and the dispersion stability of the aqueous dispersion, the weight-average molecular weight of the polymerizable resin is preferably equal to or greater than 700 and equal to or smaller than 200,000, more preferably equal to or greater than 800 and equal to or smaller than 100,000, and even more preferably equal to or greater than 900 and equal to or smaller than 50,000.

The weight-average molecular weight of the polymerizable resin is a value measured by gel permeation chromatography (GPC).

In a case where the polymerizable resin is resin particles (for example, particles formed of a water-dispersible resin), the volume average particle diameter of the polymerizable resin in the aqueous dispersion is not particularly limited. However, from the viewpoint of the dispersibility, the volume average particle diameter of the polymerizable resin is preferably 10 nm to 10,000 nm, more preferably 20 nm to 1,000 nm, and even more preferably 30 nm to 500 nm.

The gel particles are a dispersoid in the aqueous dispersion of the present disclosure. In a case where the polymerizable resin is resin particles (for example, particles formed of a water-dispersible resin), the polymerizable resin can also be a dispersoid in the aqueous dispersion of the present disclosure.

The preferable range of the content of the polymerizable resin in the aqueous dispersion is as described above.

<Gel Particles>

The aqueous dispersion of the present disclosure contains gel particles which each have a polymerizable group and a three-dimensional cross-linked structure having at least one kind of bond selected from a urethane bond and a urea bond and contain a photopolymerization initiator in the interior thereof.

The gel particles are a dispersoid in the aqueous dispersion of the present disclosure.

The photopolymerization initiator contained in the interior of the gel particles includes a photopolymerization initiator which is present in a void of the three-dimensional cross-linked structure of the gel particles without being bonded to the three-dimensional cross-linked structure.

In the present specification, the photopolymerization initiator present in a void of the three-dimensional cross-linked structure and the like are also regarded as "gel particle".

As described above, the aqueous dispersion of the present disclosure contains the aforementioned gel particles. Accordingly, the aqueous dispersion has excellent dispersibility and exhibits excellent redispersibility in a case where fixing occurs, and makes it possible to obtain a film having excellent film hardness (water resistance and solvent resistance) by being cured with high sensitivity.

More specifically, because the gel particles each have a polymerizable group, the gel particles adjacent to each other can be cross-linked or the gel particles and the polymerizable resin can be cross-liked, and hence a film can be formed.

Furthermore, because the gel particles each have a three-dimensional cross-linked structure containing at least one kind of bond selected from a urethane bond and a urea bond, a film (for example, an image) having excellent hardness is obtained. Furthermore, a film (for example, an image) having excellent mechanical strength is obtained.

In addition, because the gel particles contain a photopolymerization initiator in the interior thereof, the gel particles are cured with high sensitivity and have high cross-linking properties.

The three-dimensional cross-linked structure of the gel particles contains at least one kind of bond selected from a urethane bond and a urea bond. It is more preferable that the three-dimensional cross-linked structure contains both the urethane bond and the urea bond.

The total amount (mmol/g) of the urethane bond and the urea bond contained in 1 g of the three-dimensional cross-linked structure is preferably 1 mmol/g to 10 mmol/g, more preferably 1.5 mmol/g to 9 mmol/g, and particularly preferably 2 mmol/g to 8 mmol/g.

((Structure (1))

The three-dimensional cross-linked structure of the gel particles preferably includes a structure (1) shown below.

The three-dimensional cross-linked structure may include a plurality of structures (1), and the plurality of structures (1) may be the same as or different from each other.

Structure (1)

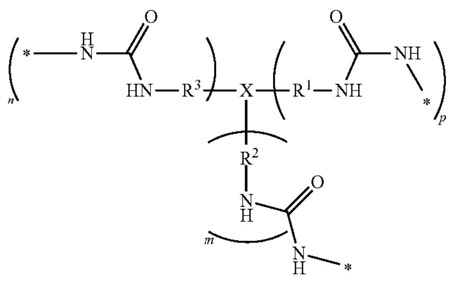

In the structure (1), X represents a (p+m+n)-valent organic group formed by linking at least two groups selected from the group consisting of a hydrocarbon group which may have a ring structure, —NH—, >N—, —C(═O)—, —O—, and —S—.

In the structure (1), $R^1$, $R^2$, and $R^3$ each independently represent a hydrocarbon group having 5 to 15 carbon atoms that may have a ring structure.

In Structure (1), * represents a binding position, each of p, m, and n is equal to or greater than 0, and p+m+n equals 3 or greater.

The total molecular weight of X, $R^1$, $R^2$, and $R^3$ is preferably less than 2,000, more preferably less than 1,500, and even more preferably less than 1,000. In a case where the total molecular weight of X, $R^1$, $R^2$, and $R^3$ is less than 2,000, the internal content rate of the compound contained in the interior of the gel particles can be increased.

The hydrocarbon group in the organic group represented by X is preferably a linear or branched hydrocarbon group having 1 to 15 carbon atoms, and more preferably a linear or branched hydrocarbon group having 1 to 10 carbon atoms.

Examples of the ring structure that the hydrocarbon group in the organic group represented by X and the hydrocarbon group represented by $R^1$, $R^2$, and $R^3$ may have include an alicyclic ring structure and an aromatic ring structure.

Examples of the alicyclic ring structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In the structure (1), p is equal to or greater than 0. p is preferably 1 to 10, more preferably 1 to 8, even more preferably 1 to 6, and particularly preferably 1 to 3.

In the structure (1), m is equal to or greater than 0. m is preferably 1 to 10, more preferably 1 to 8, even more preferably 1 to 6, and particularly preferably 1 to 3.

In the structure (1), n is equal to or greater than 0. n is preferably 1 to 10, more preferably 1 to 8, even more preferably 1 to 6, and particularly preferably 1 to 3.

In the structure (1), p+m+n is preferably an integer of 3 to 10, more preferably an integer of 3 to 8, and even more preferably an integer of 3 to 6.

The (p+m+n)-valent organic group represented by X is preferably a group represented by any one of Formulae (X-1) to (X-12).

(X-1)

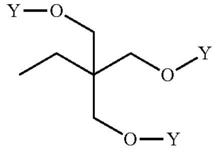

(X-2)

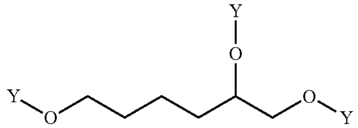

(X-3)

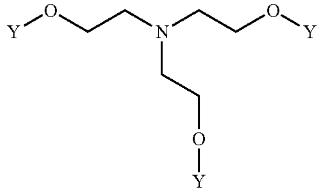

(X-4)

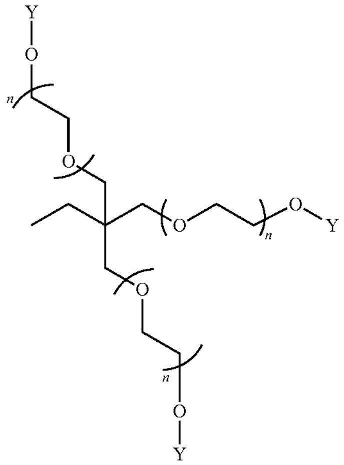

(X-5)

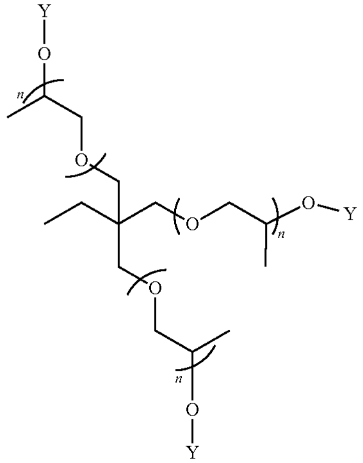

-continued (X-6)

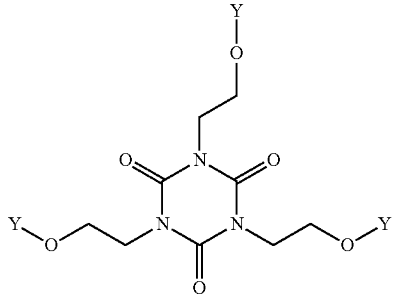

(X-7)

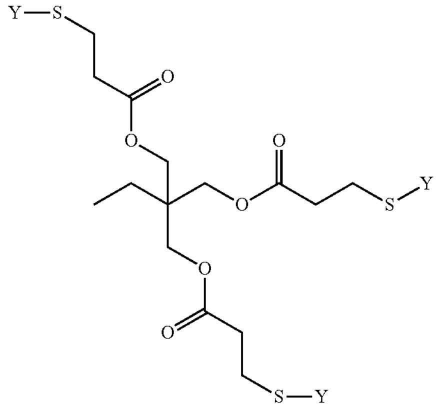

(X-8)

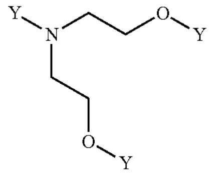

(X-9)

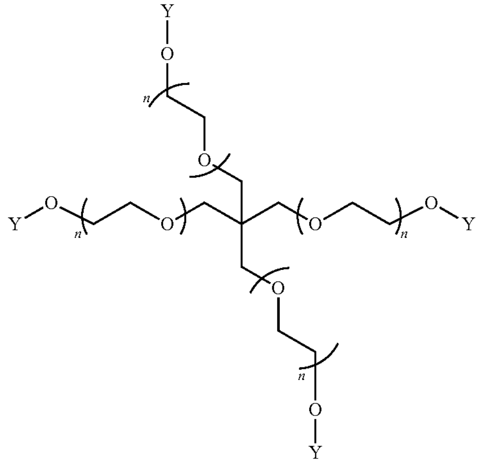

-continued (X-10)

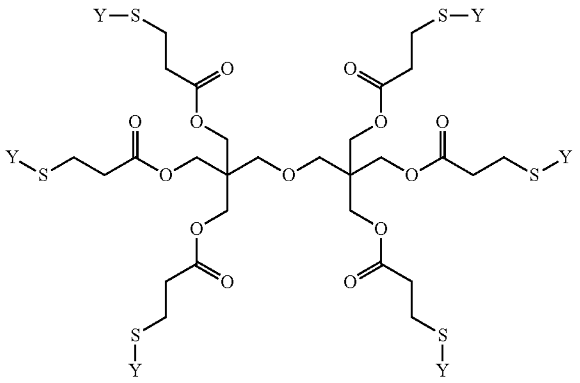

(X-11)

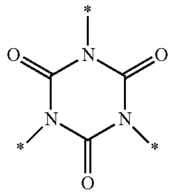

(X-12)

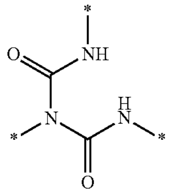

In Formulae (X-1) to (X-12), n represents an integer of 1 to 200. n is preferably an integer of 1 to 50, more preferably an integer of 1 to 15, and particularly preferably an integer of 1 to 8.

In Formulae (X-11) and (X-12), * represents a binding position.

In Formulae (X-1) to (X-10), Y represents (Y-1).

(Y-1)

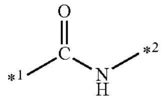

In (Y-1), $*^1$ represents a binding position in which (Y-1) is bonded to S or O in (X-1) to (X-10), and $*^2$ represents a binding position in which (Y-1) is bonded to $R^1$, $R^2$, or $R^3$ in the structure (1).

In the structure (1), $R^1$, $R^2$, and $R^3$ each independently represent a hydrocarbon group having 5 to 15 carbon atoms that may have a ring structure.

The hydrocarbon group represented by $R^1$, $R^2$, and $R^3$ may have a substituent, and examples of the substituent include hydrophilic groups described above.

$R^1$, $R^2$, and $R^3$ preferably each independently represent a group represented by any one of (R-1) to (R-20). In (R-1) to (R-20), * represents a binding position.

(R-1)

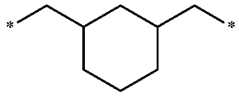

(R-2)

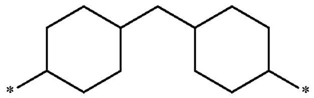

(R-3)

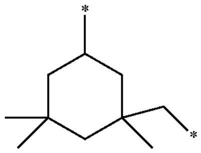

(R-4)

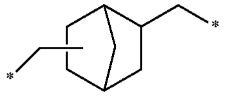

(R-5)

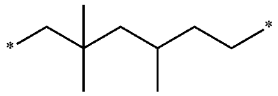

(R-6)

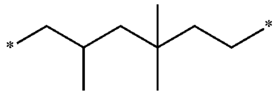

(R-7)

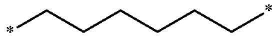

(R-8)

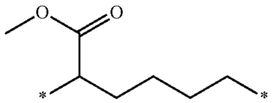

(R-9)

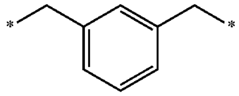

(R-10)

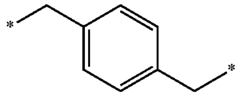

(R-11)

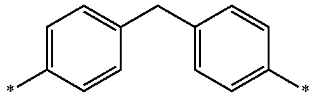

(R-12)

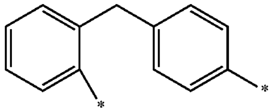

(R-13)

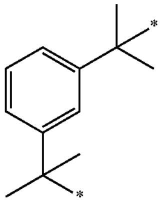

-continued (R-14)

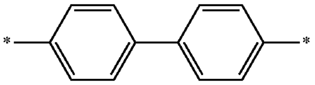

(R-15)

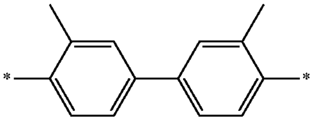

(R-16)

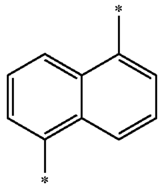

(R-17)

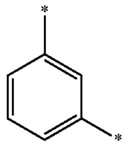

(R-18)

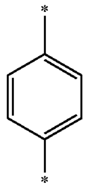

(R-19)

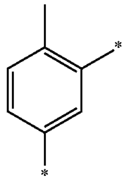

(R-20)

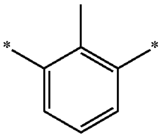

The content rate of the structure (1) in the three-dimensional cross-linked structure with respect to the total mass of the three-dimensional cross-linked structure is preferably 8% by mass to 100% by mass, more preferably 25% by mass to 100% by mass, and even more preferably 50% by mass to 100% by mass.

It is preferable that the three-dimensional cross-linked structure includes, as the structure (1), at least one structure among a structure (2), a structure (3), and a structure (4) shown below.

Structure (2)

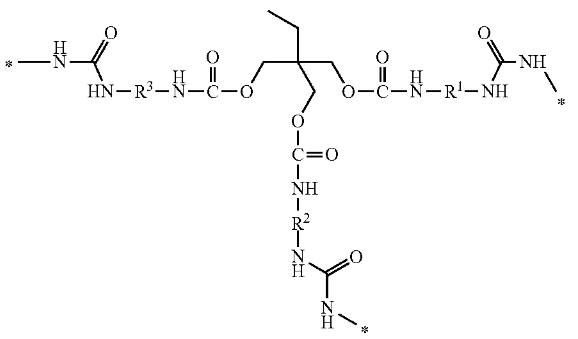

In the structure (2), $R^1$, $R^2$, and $R^3$ each independently represent a hydrocarbon group having 5 to 15 carbon atoms that may have a ring structure.

Each of the hydrocarbon groups represented by $R^1$, $R^2$, and $R^3$ in the structure (2) has the same definition as each of the hydrocarbon groups represented by $R^1$, $R^2$, and $R^3$ in the structure (1), and the preferable range thereof is also the same.

In the structure (2), * represents a binding position.

Structure (3)

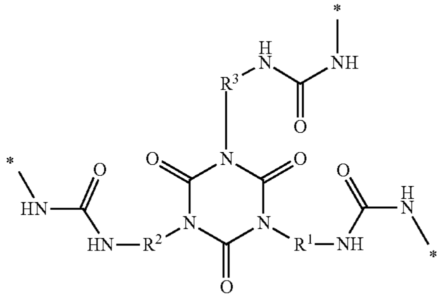

In the structure (3), $R^1$, $R^2$, and $R^3$ each independently represent a hydrocarbon group having 5 to 15 carbon atoms that may have a ring structure.

Each of the hydrocarbon groups represented by $R^1$, $R^2$, and $R^3$ in the structure (3) has the same definition as each of the hydrocarbon groups represented by $R^1$, $R^2$, and $R^3$ in the structure (1), and the preferable range thereof is also the same.

In the structure (3), * represents a binding position.

Structure (4)

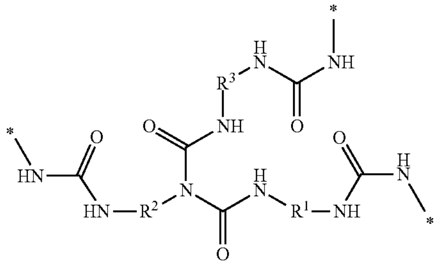

In the structure (4), $R^1$, $R^2$, and $R^3$ each independently represent a hydrocarbon group having 5 to 15 carbon atoms that may have a ring structure.

Each of the hydrocarbon groups represented by $R^1$, $R^2$, and $R^3$ in the structure (4) has the same definition as each of the hydrocarbon groups represented by $R^1$, $R^2$, and $R^3$ in the structure (1), and the preferable range thereof is also the same.

In the structure (4), * represents a binding position.

Specific examples of the structure (1) to the structure (4) include structures shown in the following Table 1.

TABLE 1

| Structure (1) | | | | | | | Corresponding |
|---|---|---|---|---|---|---|---|
| X | $R^1$ | $R^2$ | $R^3$ | p | n | m | structure |
| X-1 | R-1 | R-1 | R-1 | 1 | 1 | 1 | Structure (2) |
| X-1 | R-7 | R-7 | R-7 | 1 | 1 | 1 | Structure (2) |
| X-11 | R-1 | R-1 | R-1 | 1 | 1 | 1 | Structure (3) |
| X-11 | R-7 | R-7 | R-7 | 1 | 1 | 1 | Structure (3) |
| X-12 | R-7 | R-7 | R-7 | 1 | 1 | 1 | Structure (4) |

The three-dimensional cross-linked structure in the gel particles can be formed, for example, by a reaction between an isocyanate compound having three or more functional groups or a difunctional isocyanate compound and water or a compound having two or more active hydrogen groups.

Particularly, in a case where the raw material used at the time of manufacturing the gel particles includes at least one kind of compound having three or more reactive groups (isocyanate groups or active hydrogen groups), a three-dimensional cross-linking reaction more effectively proceeds, and hence a three-dimensional network structure is more effectively formed.

The three-dimensional cross-linked structure in the gel particles is preferably a product formed by a reaction between an isocyanate compound having three or more functional groups and water.

(Isocyanate Compound Having Three or More Functional Groups)

The isocyanate compound having three or more functional groups is a compound having three or more isocyanate groups in a molecule. As this compound, it is possible to use a compound synthesized by a method which will be described later and a known compound. Examples of the isocyanate compound having three or more functional groups include an aromatic isocyanate compound having three or more functional groups, an aliphatic isocyanate compound having three or more functional groups, and the like.

Examples of the compounds known as such a compound include the compounds described in "Polyurethane Resin Handbook" (edited by Keiji Iwata, published from NIKKAN KOGYO SHIMBUN, LTD. (1987)).

As the isocyanate compound having three or more functional groups, a compound having three or more isocyanate groups in a molecule, specifically, a compound represented by Formula (X) is preferable.

$$X^1\text{-}(\text{-NCO})_n \qquad \text{Formula (X)}$$

In Formula (X), $X^1$ represents an n-valent organic group.

In Formula (X), n is equal to or greater than 3. n is preferably 3 to 10, more preferably 3 to 8, and even more preferably 3 to 6.

As the compound represented by Formula (X), a compound represented by Formula (11) is preferable.

Formula (11)

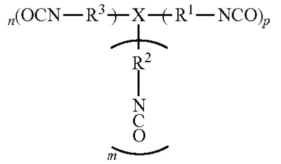

X, $R^1$, $R^2$, $R^3$, p, m, and n in Formula (11) have the same definition as X, $R^1$, $R^2$, $R^3$, p, m, and n in the structure (1) described above, and the preferable aspect thereof is also the same.

The isocyanate compound having three or more functional groups is preferably a compound derived from a difunctional isocyanate compound (a compound having two isocyanate groups in a molecule). The isocyanate compound having three or more functional groups is preferably an isocyanate compound derived from at least one kind of compound selected from isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane 4,4'-diisocyanate.

Herein, “derived” means that the above compounds are used as raw materials, and hence the isocyanate compound has a structure derived from the raw materials.

As the isocyanate compound having three or more functional groups, for example, an isocyanate compound (adduct type) caused to have three or more functional groups as an adduct product (adduct) of a difunctional isocyanate compound (a compound having two isocyanate groups in a molecule) and a compound having three or more active hydrogen groups in a molecule such as polyol, polyamine, or polythiol having three or more functional groups, a trimer of a difunctional isocyanate compound (a biuret type or an isocyanurate type), and a compound having three or more isocyanate groups in a molecule such as a formalin condensate of benzene isocyanate are also preferable.

These isocyanate compounds having three or more functional groups are preferably a mixture containing a plurality of compounds. It is preferable that a compound represented by Formula (11A) or Formula (11B) shown below is a main component of this mixture, and other components may also be contained in the mixture.

—Adduct Type—

The adduct-type isocyanate compound having three or more functional groups is preferably a compound represented by Formula (11A) or Formula (11B).

Formula (11A)

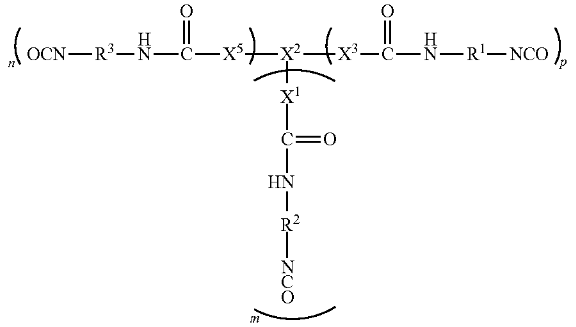

Formula (11B)

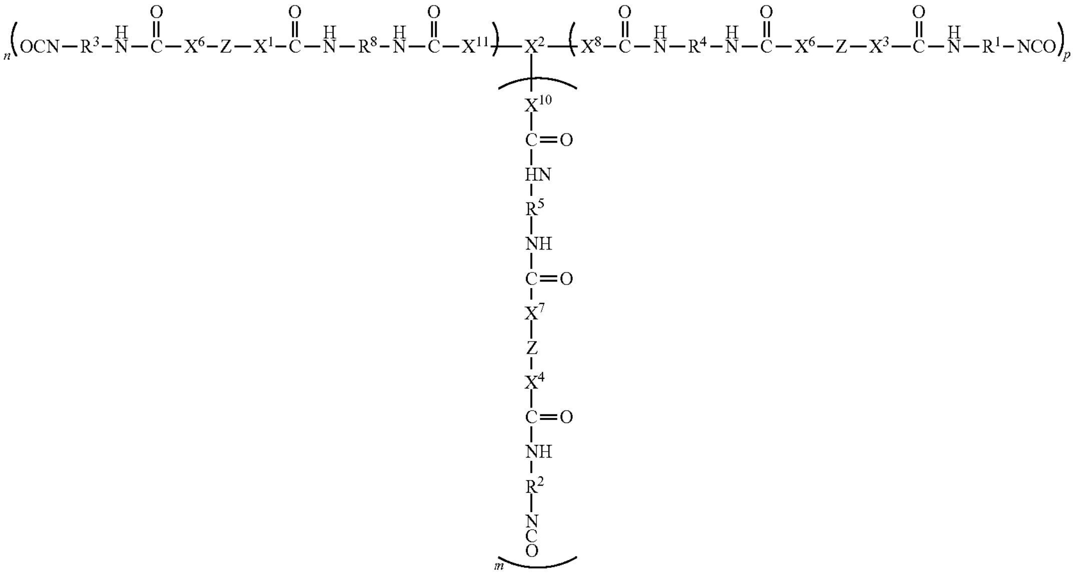

In Formula (11A) and Formula (11B), $X^2$ represents a (p+m+n)-valent organic group, each of p, m, and n is 0 or greater, and p+m+n equals 3 or greater.

In Formula (11A) and Formula (11B), $X^3$ to $X^{11}$ each independently represent O, S, or NH.

In Formula (11A) and Formula (11B), $R^1$ to $R^6$ each independently represent a divalent organic group.

In Formula (11A) and Formula (11B), Z represents a divalent organic group.

In Formula (11A) and Formula (11B), $X^2$ is preferably a (p+m+n)-valent organic group formed by linking at least two groups selected from the group consisting of a hydrocarbon group which may have a ring structure, —NH—, >N+, —C(═O)—, —O—, and —S—.

In Formula (11A) and Formula (11B), p+m+n preferably equals 3 to 10, more preferably equals 3 to 8, and even more preferably equals 3 to 6.

In Formula (11A) and Formula (11B), $X^3$ to $X^{11}$ each independently preferably represent O or S, and more preferably represent O.

In Formula (11A) and Formula (11B), $R^1$ to $R^6$ each independently preferably represent a hydrocarbon group having 5 to 15 carbon atoms that may have a ring structure.

In Formula (11A) and Formula (11B), the preferable aspect of each of $R^1$ to $R^6$ is the same as the preferable aspect of $R^1$ in the structure (1).

In a case where $X^2$ in Formula (11A) and Formula (11B) is a hydrocarbon group that may have a ring structure, examples of the ring structure include an alicyclic ring structure and an aromatic ring structure.

Examples of the alicyclic ring structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In a case where each of $R^1$ to $R^6$ in Formula (11A) and Formula (11B) is a hydrocarbon group having 5 to 15 carbon atoms that may have a ring structure, examples of the ring structure include an alicyclic ring structure and an aromatic ring structure.

Examples of the alicyclic ring structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In Formula (11A) and Formula (11B), the (p+m+n)-valent organic group represented by $X^2$ is preferably a group represented by any one of (X2-1) to (X2-10).

(X2-1)

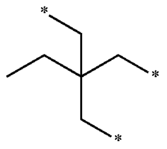

(X2-2)

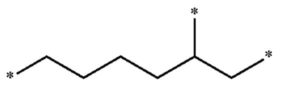

(X2-3)

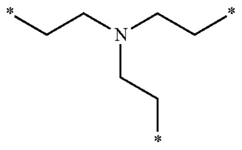

-continued (X2-4)

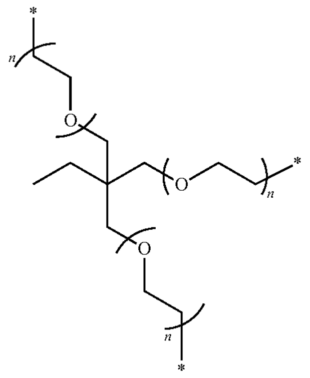

(X2-5)

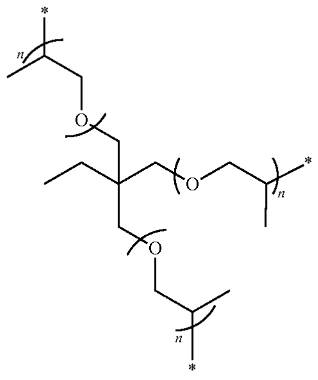

(X2-6)

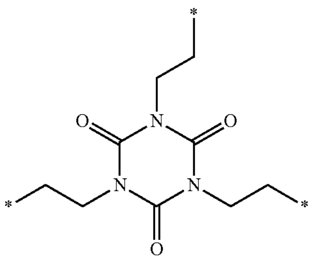

(X2-7)

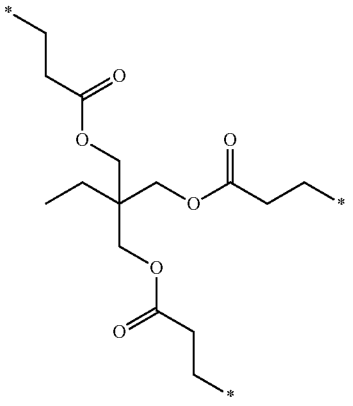

(X2-8)

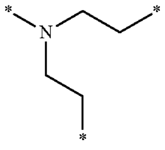

-continued (X2-9)

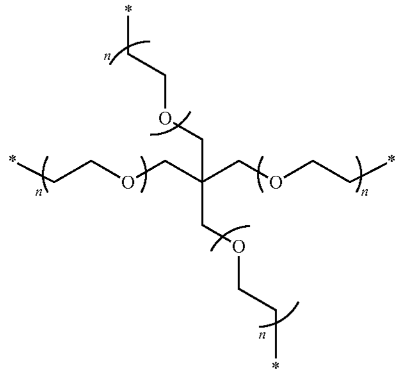

(X2-10)

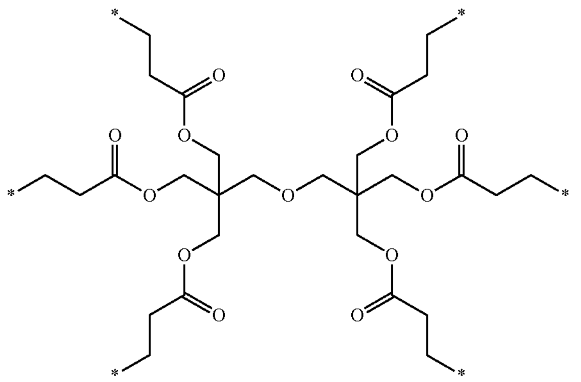

In Formula (X2-1) to Formula (X2-10), n represents an integer of 1 to 200. n preferably represents an integer of 1 to 50, more preferably represents an integer of 1 to 15, and particularly preferably represents an integer of 1 to 8.

In Formula (X2-1) to Formula (X2-10), * represents a binding position.

In Formula (11B), the divalent organic group represented by Z is preferably a hydrocarbon group, a group having a polyoxyalkylene structure, a group having a polycaprolactone structure, a group having a polycarbonate structure, or a group having a polyester structure.

The hydrocarbon group represented by Z may be a linear hydrocarbon group, a branched hydrocarbon group, or a cyclic hydrocarbon group.

The number of carbon atoms in the hydrocarbon group represented by Z is preferably 2 to 30.

In Formula (11A) and Formula (11B), $R^1$ to $R^6$ each independently preferably represent a group (R-1) to a group (R-20).

In Formula (11A) and Formula (11B), $R^1$ to $R^6$ each independently more preferably represent any of a group (R-3) derived from isophorone diisocyanate (IPDI), a group (R-7) derived from hexamethylene diisocyanate (HDI), a group (R-5) derived from trimethylhexamethylene diisocyanate (TMHDI), a group (R-9) derived from m-xylylene diisocyanate (XDI), a group (R-1) derived from 1,3-bis(isocyanatomethyl)cyclohexane, and a group (R-2) derived from dicyclohexylmethane 4,4'-diisocyanate.

As the compound represented by General Formula (11A), a compound represented by Formula (11A-1) is preferable.

Formula (11A-1)

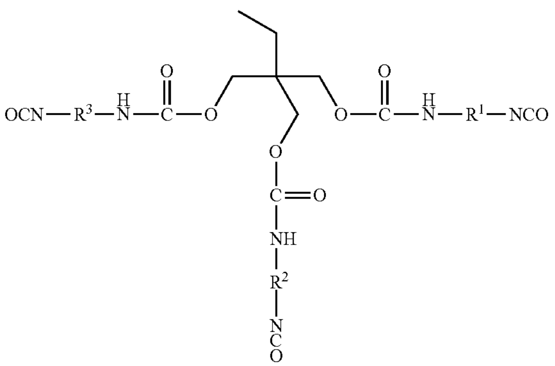

In Formula (11A-1), $R^1$, $R^2$, and $R^3$ have the same definition as $R^1$, $R^2$, and $R^3$ in Formula (11A), and the preferable aspect thereof is also the same.

The adduct-type isocyanate compound having three or more functional groups can be synthesized by reacting a compound, which will be described later, having three or more active hydrogen groups in a molecule with a difunctional isocyanate compound which will be described later. The active hydrogen group means a hydroxyl group, a primary amino group, a secondary amino group, and a mercapto group.

The adduct-type isocyanate compound having three or more functional groups can be obtained, for example, by heating (50° C. to 100° C.) a compound having three or more active hydrogen groups in a molecule and a difunctional isocyanate compound in an organic solvent with stirring or by stirring the above compounds at a low temperature (0° C. to 70° C.) while adding a catalyst such as stannous octanoate thereto (a synthesis scheme 1 shown below).

Generally, as the difunctional isocyanate compound reacted with the compound having three or more active hydrogen groups in a molecule, a difunctional isocyanate compound is used of which the number of moles (number of molecules) is equal to or higher than 60% of the number of moles (the equivalent number of active hydrogen groups) of the active hydrogen groups in the compound having three or more active hydrogen groups in a molecule. The number of moles of the difunctional isocyanate compound is preferably 60% to 500%, more preferably 60% to 300%, and even more preferably 80% to 200% of the number of moles of the active hydrogen groups.

-Synthesis scheme 1-

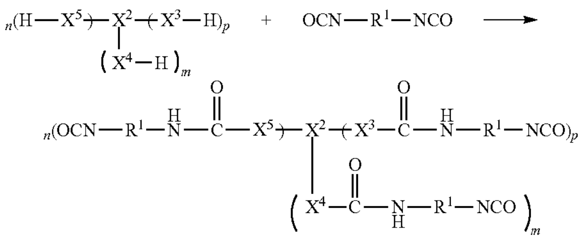

Furthermore, the adduct-type isocyanate compound having three or more functional groups can also be obtained, as shown in Synthesis scheme 2 described below, by synthesizing a prepolymer (PP) shown below which is an adduct of a compound having two active hydrogen groups in a molecule and a difunctional isocyanate compound and then reacting the prepolymer (PP) with a compound having three or more active hydrogen groups in a molecule.

-Synthesis scheme 2-

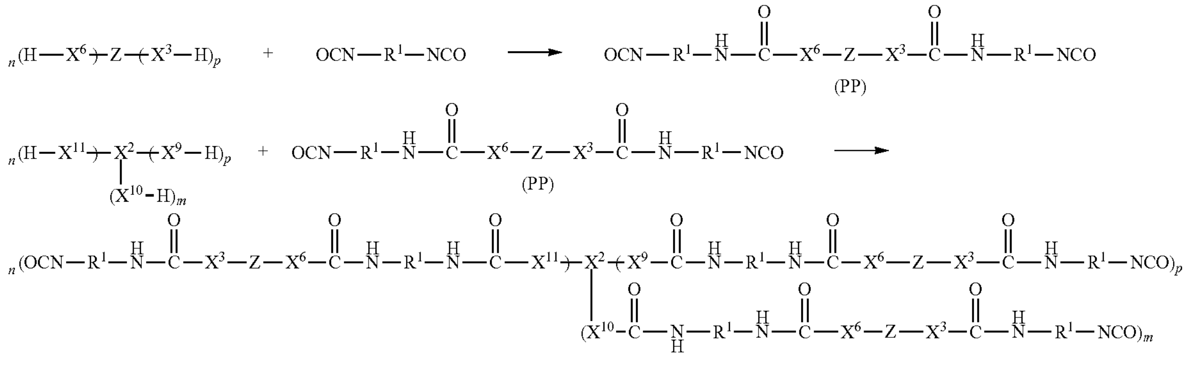

Examples of the difunctional isocyanate compound include a difunctional aromatic isocyanate compound, a difunctional aliphatic isocyanate compound, and the like.

Specific examples of the difunctional isocyanate compound include isophorone diisocyanate (IPDI), m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyl diisocyanate, 3,3'-dimethyldiphenylmethane-4,4'-diisocyanate, m-xylylene diisocyanate (XDI), p-xylylene diisocyanate, 4-chloroxylylene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane (HXDI), norbornene diisocyanate (NBDI), trimethylhexamethylene diisocyanate (TMHDI), lysine diisocyanate, 1,3-bis(2-isocyanato-2-propyl)benzene, and the like.

Among these difunctional isocyanate compounds, compounds having structures represented by (I-1) to (I-24) shown below are preferable.

(I-1)

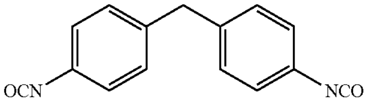

MDI (I-2)

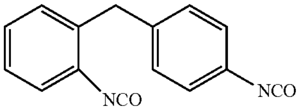

(I-3)

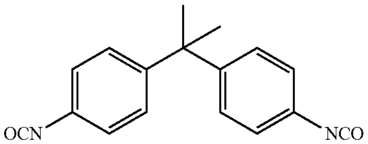

-continued (I-4)

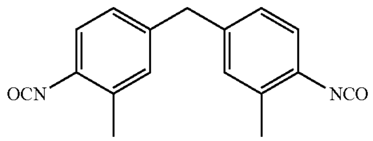

(I-5)

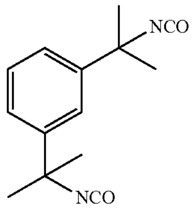

(I-6)

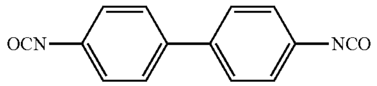

(I-7)

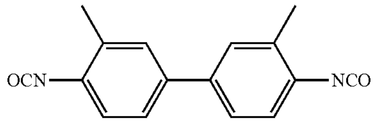

(I-8)

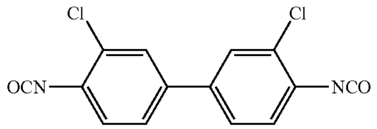

(I-9)

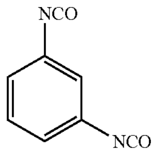

(I-10)

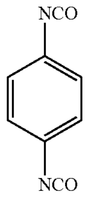

-continued (I-11)

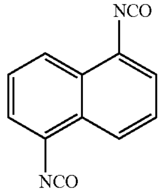

(I-12)

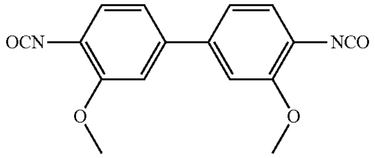

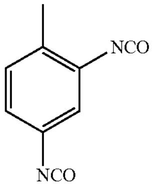

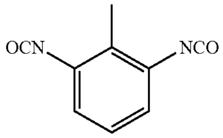

TDI (I-13)

TDI (I-14)

These are used singly or used as a mixture (I-15)

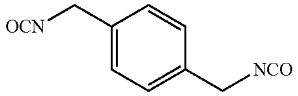

(I-16)

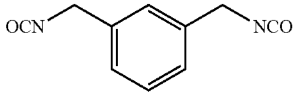

XDI (I-17)

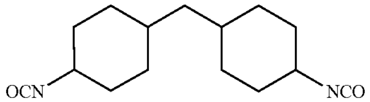

HMDI (I-18)

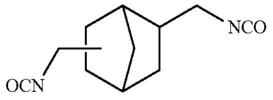

NBDI (I-19)

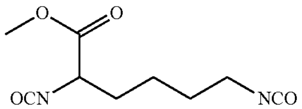

(I-20)

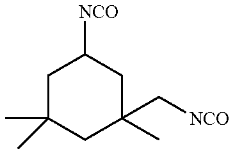

IPDI

-continued (I-21)

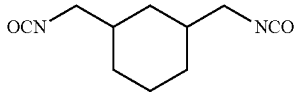

HXDI

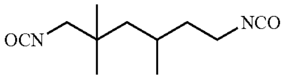

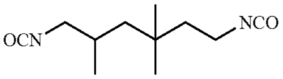

(I-22)

(I-23)

These are used singly or used as a mixture

TMHDI (I-24)

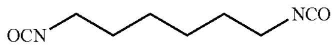

HDI

Among these difunctional isocyanate compounds, isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), and dicyclohexylmethane-4,4'-diisocyanate are preferable.

As the difunctional isocyanate compound, difunctional isocyanate compounds derived from the above compounds can also be used. Examples thereof include DURANATE (registered trademark) D101, D201, A101 (manufactured by Asahi Kasei Corporation) and the like.

The compound having three or more active hydrogen groups in a molecule is a compound having three or more groups, each of which is at least one kind of group selected from a hydroxyl group, a primary amino group, a secondary amino group, and a mercapto group, in a molecule. Examples of the compound include compounds having structures represented by (H-1) to (H-13) shown below. In the following structures, n represents an integer selected from 1 to 100.

(H-1)

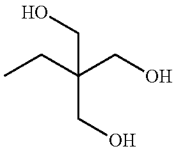

(H-2)

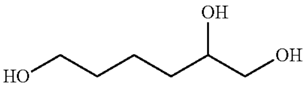

(H-3)

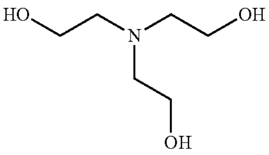

-continued
(H-4)
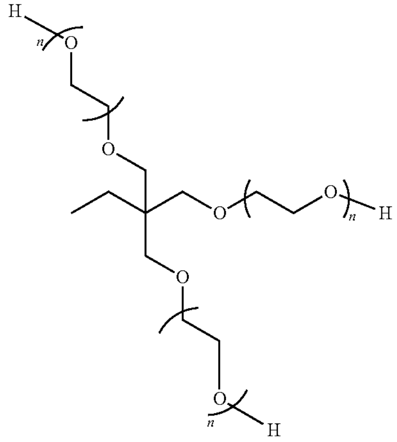
(H-5)
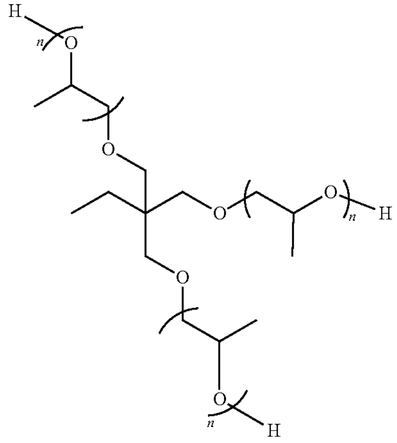
(H-6)
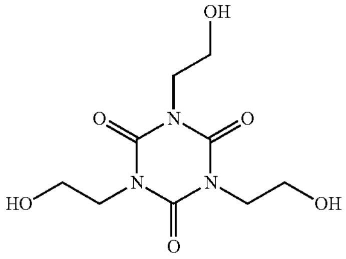
(H-7)
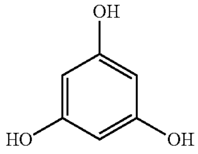
(H-8)
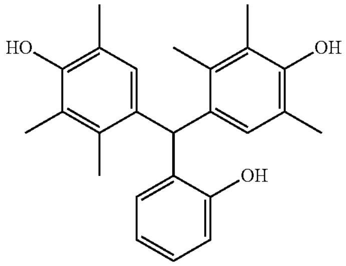
-continued
(H-9)
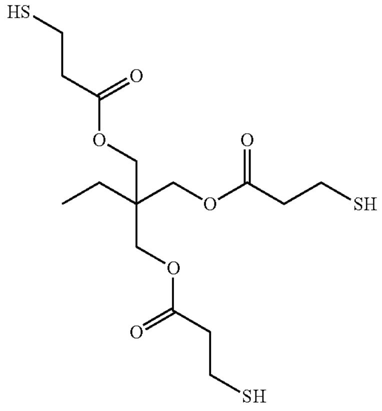
(H-10)
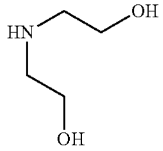
(H-11)
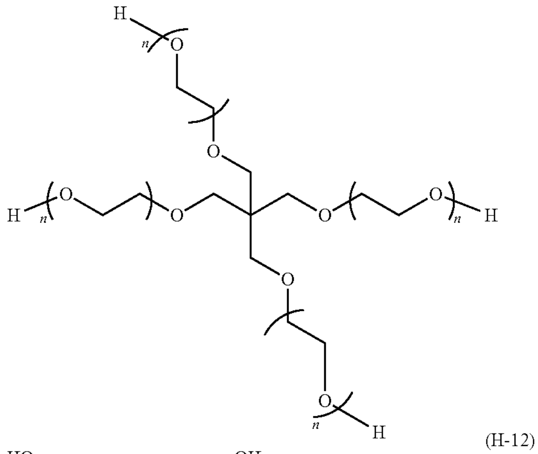
(H-12)
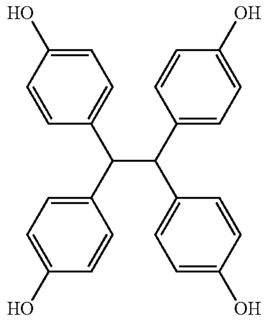
(H-13)
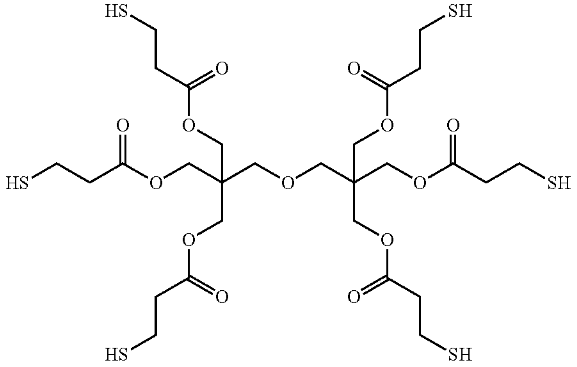

As the adduct-type isocyanate compound having three or more functional groups, it is preferable to use a compound obtained by reacting a compound having two or more active hydrogen groups in a molecule with a difunctional isocyanate compound according to the combination listed in Table 2 shown below.

TABLE 2

| | Structure of polyisocyanate | | Composition | |
|---|---|---|---|---|
| Compound No. | Compound having two or more active hydrogen groups | Difunctional isocyanate compound | Compound having two or more active hydrogen groups (molar equivalent) | Difunctional isocyanate compound (molar equivalent) |
| NCO 101 | 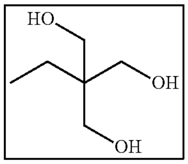 | 2,4-Tolylene diisocyanate (TDI) | 1 | 4 |
| NCO 102 | | m-Xylylene diisocyanate (XDI) | 1 | 4 |
| NCO 103 | | Hexamethylene diisocyanate (HDI) | 1 | 4 |
| NCO 104 | | 1,3-Bis(isocyanatomethyl) cyclohexane (HXDI) | 1 | 4 |
| NCO 105 | Trimethylolpropane | Isophorone diisocyanate (IPDI) | 1 | 4 |
| NCO 106 | 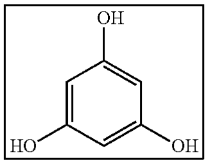 | Hexamethylene diisocyanate (HDI) | 1 | 4 |
| NCO 107 | 1,3,5-trihydroxybenzene | Isophorone diisocyanate (IPDI) | 1 | 4 |
| NCO 108 | 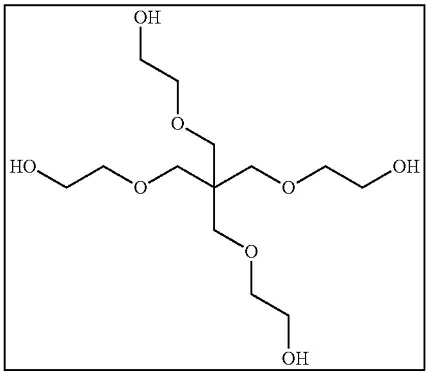 | 1,3-Bis(isocyanatomethyl) cyclohexane (HXDI) | 1 | 5 |
| NCO 109 | Pentaerythritol ethylene oxide | Isophorone diisocyanate (IPDI) | 1 | 5 |
| NCO 110 | 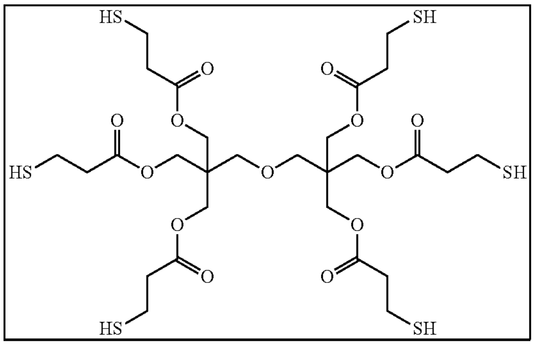 | Hexamethylene diisocyanate (HDI) | 1 | 7 |
| NCO 111 | Dipentaerythritol hexakis(3-mercaptopropionate) | Isophorone diisocyanate (IPDI) | 1 | 7 |

TABLE 2-continued

| Compound No. | Structure of polyisocyanate: Compound having two or more active hydrogen groups | Structure of polyisocyanate: Difunctional isocyanate compound | Composition: Compound having two or more active hydrogen groups (molar equivalent) | Composition: Difunctional isocyanate compound (molar equivalent) |
|---|---|---|---|---|
| NCO 112 | 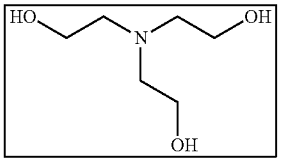 Triethanolamine | Hexamethylene diisocyanate (HDI) | 1 | 4 |
| NCO 113 | | Isophorone diisocyanate (IPDI) | 1 | 4 |

As the adduct-type isocyanate compound having three or more functional groups, among the compounds shown in Table 2, NCO 102 to NCO 105, NCO 107, NCO 108, NCO 111, and NCO 113 are more preferable.

As the adduct-type isocyanate compound having three or more functional groups, commercially available products may also be used, and examples thereof include D-102, D-103, D-103H, D-103M2, P49-75S, D-110, D-120N, D-140N, D-160N (manufactured by Mitsui Chemicals, Inc.), DESMODUR (registered trademark) L75, UL57SP (manufactured by Sumika Bayer Urethane Co., Ltd.), CORONATE (registered trademark) HL, HX, L (manufactured by Nippon Polyurethane Industry Co., Ltd.), P301-75E (manufactured by Asahi Kasei Corporation), and the like.

Among these adduct-type isocyanate compounds having three or more functional groups, D-110, D-120N, D-140N, and D-160N (manufactured by Mitsui Chemicals, Inc.) are more preferable.

—Isocyanurate Type and Biuret Type—

As the isocyanurate-type isocyanate compound having three or more functional groups, a compound represented by Formula (11C) is preferable.

As the biuret-type isocyanate compound having three or more functional groups, a compound represented by Formula (11D) is preferable.

Formula (11C)

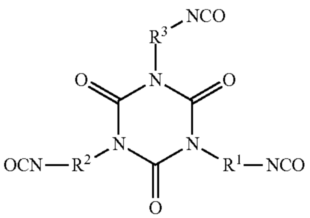

Formula (11D)

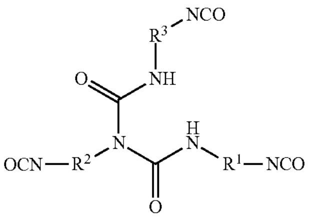

In Formula (11C) and Formula (11D), $R^1$, $R^2$, and $R^3$ each independently represent a divalent organic group.

In Formula (11C) and Formula (11D), $R^1$, $R^2$, and $R^3$ each independently preferably represent an alkylene group having 1 to 20 carbon atoms that may have a substituent, a cycloalkylene group having 1 to 20 carbon atoms that may have a substituent, or an arylene group having 1 to 20 carbon atoms that may have a substituent.

In Formula (11C) and Formula (11D), $R^1$, $R^2$, and $R^3$ each independently particularly preferably represent a group selected from the groups represented by (R-1) to (R-20) described above.

In Formula (11C) and Formula (11D), $R^1$ to $R^3$ each independently more preferably represent any one of the group (R-3) derived from isophorone diisocyanate (IPDI), the group (R-7) derived from hexamethylene diisocyanate (HDI), the group (R-5) derived from trimethylhexamethylene diisocyanate (TMHDI), the group (R-9) derived from m-xylylene diisocyanate (XDI), the group (R-1) derived from 1,3-bis(isocyanatomethyl)cyclohexane, and the group (R-2) derived from dicyclohexylmethane 4,4'-diisocyanate.

As the isocyanurate-type isocyanate compound having three or more functional groups, commercially available products may also be used. Examples thereof include D-127, D-170N, D-170HN, D-172N, D-177N (manufactured by Mitsui Chemicals, Inc.), SUMIDUR N3300, DESMODUR (registered trademark) N3600, N3900, Z4470BA (manufactured by Sumika Bayer Urethane Co., Ltd.), CORONATE (registered trademark) HX, HK (manufactured by Nippon Polyurethane Industry Co., Ltd.), DURANATE (registered trademark) TPA-100, TKA-100, TSA-100, TSS-100, TLA-100, TSE-100 (manufactured by Asahi Kasei Corporation), and the like.

As the biuret-type isocyanate compound having three or more functional groups, commercially available products may also be used. Examples thereof include D-165N, NP 1100 (manufactured by Mitsui Chemicals, Inc.), DESMODUR (registered trademark) N3200 (Sumika Bayer Urethane Co., Ltd.), DURANATE (registered trademark) 24A-100 (manufactured by Asahi Kasei Corporation), and the like.

Among these isocyanurate-type or biuret-type isocyanate compounds having three or more functional groups, Duranate (registered trademark) 24A-100 (manufactured by Asahi Kasei Corporation), D-127 (manufactured by Mitsui Chemicals, Inc.), TKA-100, and TSE-100 (manufactured by Asahi Kasei Corporation) are more preferable.

The content (unit: mmol/g) of the isocyanate group per 1 g of the isocyanate compound having three or more functional groups is preferably 1 mmol/g to 10 mmol/g, more preferably 1.5 mmol/g to 8 mmol/g, and even more preferably 2 mmol/g to 6 mmol/g.

For obtaining the content of the isocyanate group, the isocyanate compound of interest is dissolved in dehydrated toluene, an excess of di-n-butylamine solution is then added thereto so as to cause a reaction, and the rest of the di-n-butylamine solution is subjected to back titration by using hydrochloric acid. From the titration amount at an inflection point on the titration curve, the content of the isocyanate group can be calculated.

More specifically, the content of the isocyanate group can be calculated by the method described below.

By using a potentiometric titrator (AT-510, manufactured by KYOTO ELECTRONICS MANUFACTURING CO., LTD.) and a 1 mol/L aqueous hydrochloric acid solution, neutralization titration is performed at 25° C. by the blank measurement and the sample measurement described below. From the obtained titration amounts Z1 and Z2, the content of the isocyanate group can be calculated from Equation (N).

$$\text{Content of isocyanate group (mmol/g)} = (Z1-Z2)/(W \times Y) \qquad \text{Equation (N)}$$

In Equation (N), Z1 represents the titration amount of a blank, Z2 represents the titration amount of a sample, W represents the solid content of the sample, and Y represents the mass of the sample.

~Blank Measurement~

10 mL of dehydrated toluene, 10.0 mL of a 2 mol/L di-n-butylamine solution, and 50 mL of isopropyl alcohol are put into a 100 mL beaker and mixed together, thereby preparing a mixed liquid. For the mixed liquid, neutralization titration is performed using a 1 mol/L hydrochloric acid solution. The inflection point on the titration curve is taken as the end point, and the titration amount Z1 (mL) to the end point is determined.

~Sample Measurement~

A sample (an isocyanate compound) Yg with W % by mass of solid content is collected and put into a 100 mL beaker, 20 mL of dehydrated toluene is added to the beaker, and the sample is dissolved, thereby preparing a solution. 10.0 mL of a 2 mol/L di-n-butylamine solution is added to and mixed with the solution, and then the solution is left to stand for 20 minutes or longer. 50 mL of isopropyl alcohol is added to the solution having been left to stand, and then neutralization titration is performed using a 1 mol/L hydrochloric acid solution. The inflection point on the titration curve is taken as an end point, and the titration amount Z2 (mL) to the end point is determined.

(Water or Compound Having Two or More Active Hydrogen Groups)

The gel particles are preferably manufactured by reacting the aforementioned isocyanate compound having three or more functional groups with water or a compound having two or more active hydrogen groups.

As a compound to be reacted with the isocyanate compound having three or more functional groups, generally, water is used. By reacting the isocyanate compound having three or more functional groups with water, a three-dimensional cross-linked structure having a urea bond is formed.

Examples of the compound to be reacted with the isocyanate compound having three or more functional groups other than water include a compound having two or more active hydrogen groups. As the compound having two or more active hydrogen groups, a polyfunctional alcohol, a polyfunctional phenol, a polyfunctional amine having a hydrogen atom on a nitrogen atom, and a polyfunctional thiol can also be used.

By reacting the isocyanate compound having three or more functional groups with a polyfunctional alcohol or a polyfunctional phenol, a three-dimensional cross-linked structure having a urethane bond is formed.

By reacting the isocyanate compound having three or more functional groups with a polyfunctional amine having a hydrogen atom on a nitrogen atom, a three-dimensional cross-linked structure having a urea bond is formed.

Specific examples of the polyfunctional alcohol include propylene glycol, glycerin, trimethylolpropane, 4,4',4"-trihydroxytriphenylmethane, and the like.

Specific examples of the polyfunctional amine include diethylene triamine, tetraethylene pentamine, and the like.

Specific examples of the polyfunctional thiol include 1,3-propanedithiol, 1,2-ethanedithiol, and the like.

Specific examples of the polyfunctional phenol include bisphenol A and the like.

One kind of these compounds may be used singly, or two or more kinds thereof may be used in combination.

The compound having two or more active hydrogen groups also includes the aforementioned compound having three or more active hydrogen groups in a molecule.

(Polymerizable Group of Gel Particles)

The gel particles each have a polymerizable group.

The gel particles may each have a polymerizable group in a manner in which the polymerizable group is introduced into the three-dimensional cross-linked structure, or may have a polymerizable group in a manner in which the polymerizable monomer is incorporated into the interior of each of the gel particles (a void of the three-dimensional cross-linked structure). Furthermore, both the aforementioned manners may be simultaneously adopted.

In a case where the polymerizable monomer is not contained in the interior of the gel particles, the gel particles each have the polymerizable group in the three-dimensional cross-linked structure.

From the viewpoint of the sensitivity and the cross-linking properties, it is preferable that the gel particles each have a polymerizable group on the surface of the gel particles or in the vicinity of the surface of the gel particles.

Because the gel particles each have a polymerizable group, the gel particles adjacent to each other are bonded to each other by being irradiated with active energy rays, and hence a cross-linked structure can be formed. As a result, it is possible to form an image having high cross-linking properties and excellent film hardness.

Examples of the method for introducing a polymerizable group into the gel particles include a method in which at the time of forming a three-dimensional cross-linked structure having at least one kind of bond selected from a urethane bond and a urea bond, the aforementioned isocyanate compound having three or more functional groups is reacted with water or the aforementioned compound having two or more active hydrogen groups and a polymerizable compound as a polymerizable group-introducing monomer, a method in which at the time of manufacturing the aforementioned isocyanate compound having three or more functional groups, the aforementioned difunctional isocyanate compound is reacted with a polymerizable compound as a polymerizable group-introducing monomer, and an isocyanate compound into which a polymerizable group is introduced in advance is reacted with water or the aforementioned compound having two or more active hydrogen groups, and a method in which at the time of manufacturing the gel particles, the components constituting the gel particles as well as a polymerizable compound as a polymerizable group-introducing monomer are dissolved in an oil-phase component, a water-phase component is added to and mixed with the oil-phase component, followed by emulsification.

Examples of the polymerizable compound used for introducing a polymerizable group into the gel particles include a compound which has at least one active hydrogen group and has an ethylenically unsaturated bond on at least one terminal thereof.

The compound which has at least one active hydrogen group and has an ethylenically unsaturated bond on at least one terminal thereof can be represented by Structural Formula (a).

$$L^1Lc_mZ_n \quad (a)$$

In Structural Formula (a), $L^1$ represents an (m+n)-valent linking group, m and n each independently represent an integer selected from 1 to 100, Lc represents a monovalent ethylenically unsaturated group, and Z represents an active hydrogen group.

$L^1$ is preferably an aliphatic group having a valency of 2 or higher, an aromatic group having a valency of 2 or higher, a heterocyclic group having a valency of 2 or higher, —O—, —S—, —NH—, —N<, —CO—, —SO—, $—SO_2—$, or a combination of these.

m and n each independently preferably represent 1 to 50, more preferably represent 2 to 20, even more preferably represent 3 to 10, and particularly preferably represent 3 to 5.

Examples of the monovalent ethylenically unsaturated group represented by Lc include an allyl group, a vinyl group, an acryloyl group, a methacryloyl group, and the like.

Z is preferably OH, SH, NH, or $NH_2$, more preferably OH or $NH_2$, and even more preferably OH.

Examples of the compound which has at least one active hydrogen group and has an ethylenically unsaturated bond on at least one terminal thereof will be shown below, but the present invention is not limited to the structures. n in the compounds (a-3) and (a-12) represents an integer selected from 1 to 90, for example.

(a-1)

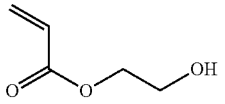

(a-2)

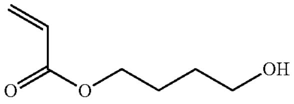

(a-3)

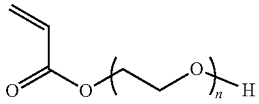

(a-4)

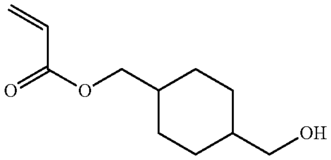

(a-5)

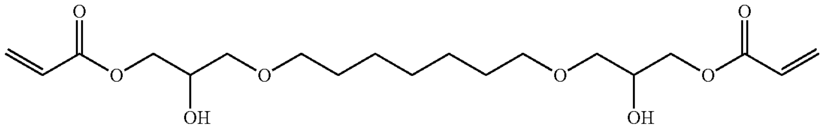

DA-212

(a-6)

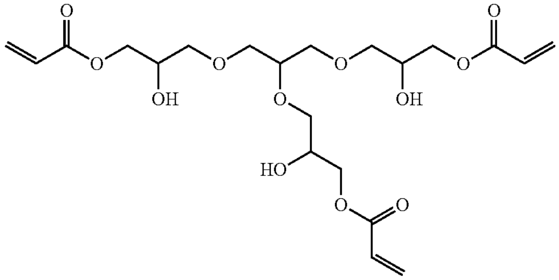

DA-314

(a-7)

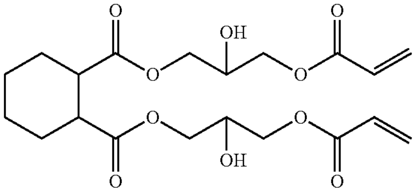

DA-722

(a-8)

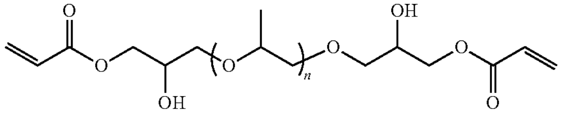

DA-911M
n = 1

(a-9)

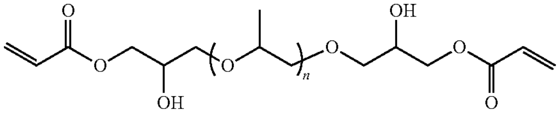

DA-920
n = 3

-continued (a-10)

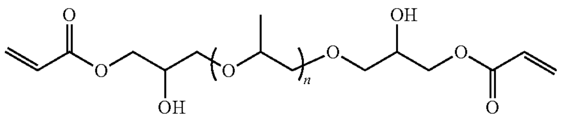

DA-931
n = 11

(a-11)

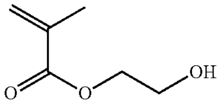

(a-12)

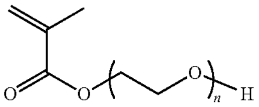

(a-13)

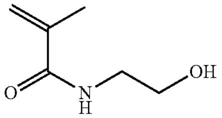

(a-14)

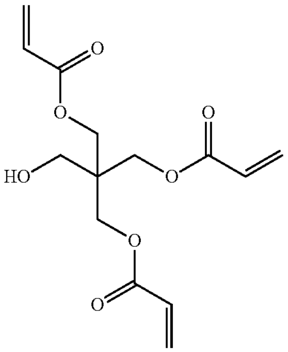

A-TMM-3L (a-15)

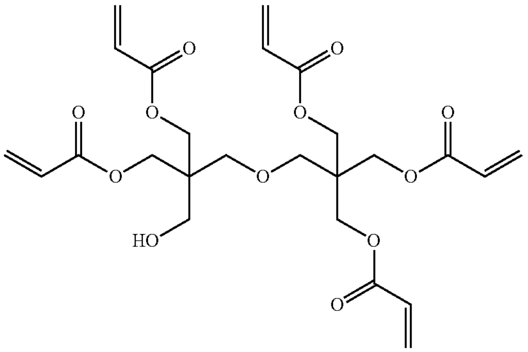

SR399E

As the compound which has at least one active hydrogen group and has an ethylenically unsaturated bond on at least one terminal thereof, commercially available products may also be used. Examples thereof include acrylates such as hydroxyethyl acrylate (manufactured by OSAKA ORGANIC CHEMICAL INDUSTRY LTD), 4-hydroxybutyl acrylate, 1,4-cyclohexanedimethanol monoacrylate (manufactured by Nippon Kasei Chemical Co., Ltd), BLEMMER (registered trademark) AE-90U (n=2), AE-200 (n=4.5), AE-400 (n=10), AP-150 (n=3), AP-400 (n=6), AP-550 (n=9), AP-800 (n=13) (manufactured by NOF CORPORATION), and DENACOL (registered trademark) ACRYLATE DA-212, DA-250, DA-314, DA-721, DA-722, DA-911M, DA-920, DA-931 (manufactured by Nagase ChemteX Corporation), methacrylates such as 2-hydroxyethyl methacrylate (manufactured by KYOEISHA CHEMICAL Co., LTD), and BLEMMER (registered trademark) PE-90 (n=2), PE-200 (n=4.5), PE-350 (n=8), PP-1000 (N=4 to 6), PP-500 (n=9), PP-800 (n=13) (manufactured by NOF CORPORATION), acrylamide (manufactured by KJ Chemicals Corporation), A-TMM-3L (manufactured by SHIN-NAKAMURA CHEMICAL CO., LTD.), SR-399E (manufactured by Sartomer Arkema Inc.), and the like.

Among these compounds which have at least one active hydrogen group and have an ethylenically unsaturated bond on at least one terminal thereof, hydroxyethyl acrylate (manufactured by OSAKA ORGANIC CHEMICAL INDUSTRY LTD), AE-400 (n=10), AP-400 (n=6) (manufactured by NOF CORPORATION), DENACOL (registered trademark) ACRYLATE DA-212 (manufactured by Nagase ChemteX Corporation), PP-500 (n=9) (manufactured by NOF CORPORATION), A-TMM-3L (manufactured by SHIN-NAKAMURA CHEMICAL CO., LTD.), and SR-399E (manufactured by Sartomer Arkema Inc.) are preferable.

The introduction of a polymerizable group into the gel particles can be performed, for example, in a manner shown in a synthesis scheme 3 described below in which an isocyanate compound into which a polymerizable group is introduced is prepared by reacting the isocyanate group of the isocyanate compound having three or more functional groups with the active hydrogen group of the compound which has at least one active hydrogen group and has an ethylenically unsaturated bond on at least one terminal thereof, and the prepared isocyanate compound into which a polymerizable group is introduced is reacted with the aforementioned compound having two or more active hydrogen groups.

-Synthesis scheme 3-

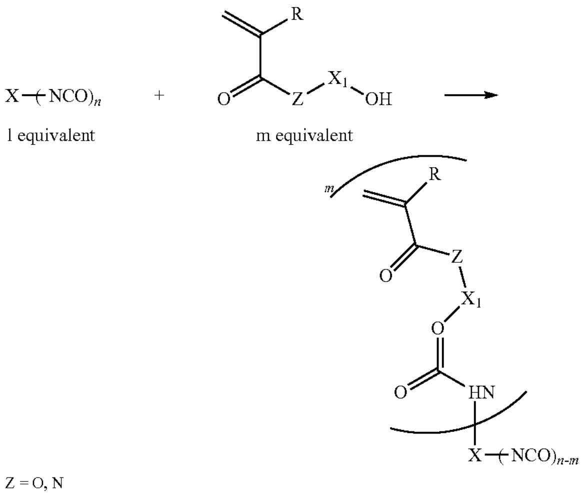

As the isocyanate compound into which a polymerizable group is introduced for manufacturing the gel particles, it is preferable to use a compound obtained by reacting a compound (indicated as "Polymerizable group-introducing monomer" in Table 3) which has at least one active hydrogen group and has one ethylenically unsaturated bond on at least one terminal thereof with an isocyanate compound (indicated as "Polyisocyanate" in Table 3) having three or more functional groups according to the combination shown in the following Table 3.

TABLE 3

| Compound No. | Structure of polyisocyanate: Polyisocyanate | Structure of polyisocyanate: Polymerizable group-introducing monomer | Composition Amount of active hydrogen group in polymerizable group-introducing monomer with respect to NCO group of polyisocyanate (mol %) |
|---|---|---|---|
| NCO 201 | NCO 104 | Hydroxybutyl acrylate | 15 |
| NCO 202 | NCO 104 | BLEMMER AP-400 | 15 |
| NCO 203 | NCO 104 | BLEMMER AE-400 | 15 |
| NCO 204 | NCO 104 | BLEMMER PP-500 | 15 |
| NCO 205 | NCO 104 | DA212 | 15 |
| NCO 206 | NCO 104 | DA920 | 15 |
| NCO 207 | DURANATE 24A-100 | BLEMMER AP-400 | 15 |
| NCO 208 | D-127 | BLEMMER AP-400 | 15 |
| NCO 209 | SUMIDUR N3300 | BLEMMER AP-400 | 15 |
| NCO 210 | DURANATE TKA-100 | BLEMMER AP-400 | 15 |
| NCO 211 | DURANATE TSE-100 | BLEMMER AP-400 | 15 |

One kind of monomer for introducing a polymerizable group may be used singly, or two or more kinds thereof may be used in combination.

At the time of manufacturing the isocyanate compound into which a polymerizable group is introduced, the polyisocyanate (that is, the isocyanate compound having three or more functional groups) and the polymerizable group-introducing monomer are reacted with each other, such that the number of moles of the active hydrogen group of the polymerizable group-introducing monomer preferably becomes 1% to 30% (more preferably becomes 2% to 25% and even more preferably becomes 3% to 20%) of the number of moles of the isocyanate group of the polyisocyanate.

In the isocyanate compound into which a polymerizable group is introduced, the average number of functional groups of the isocyanate group is equal to or smaller than 3 in some cases. However, even in these cases, as long as the raw materials for forming a three-dimensional cross-linked structure includes at least one isocyanate compound having three or more functional groups, the three-dimensional cross-linked structure can be formed.

(Photopolymerization Initiator)

The gel particles each contain at least one kind of photopolymerization initiator in the interior thereof.

As described above, in a case where the gel particles each contain a photopolymerization initiator in the interior thereof, the sensitivity to light is enhanced, and the hardness of the formed film is improved.

Furthermore, in a case where the gel particles each contain a photopolymerization initiator in the interior thereof, it is possible to use a photopolymerization initiator which cannot be readily used in the related art because the photopolymerization initiator has high sensitivity but exhibits low dispersibility or solubility in water. As a result, a range of choice of the photopolymerization initiator to be used broadens, and hence a range of choice of the light source to be used also broadens. Accordingly, the curing sensitivity can be further improved compared to the related art.

As the photopolymerization initiator contained in the interior of the gel particles (hereinafter, referred to as an internal photopolymerization initiator as well), known photopolymerization initiators can be appropriately selected and used.

The internal photopolymerization initiator is a compound generating a radical, which is a polymerization initiating species, by absorbing light (that is, active energy rays).

Known compounds can be used as the internal photopolymerization initiator. Examples of preferable internal photopolymerization initiators include (a) carbonyl compound such as aromatic ketones, (b) acylphosphine oxide compound, (c) aromatic onium salt compound, (d) organic peroxide, (e) thio compound, (f) hexaarylbiimidazole compound, (g) ketoxime ester compound, (h) borate compound, (i) azinium compound, (j) metallocene compound, (k) active ester compound, (l) compound having carbon halogen bond, (m) alkylamine compound, and the like.

As the internal photopolymerization initiator, one kind of the compounds (a) to (m) may be used singly, or two or more kinds thereof may be used in combination.

Preferable examples of (a) carbonyl compound, (b) acylphosphine oxide compound, and (e) thio compound include the compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77~117, and the like.

More preferable examples of the compounds include the α-thiobenzophenone compound described in JP1972-6416B (JP-S47-6416B), the benzoin ether compound described in JP1972-3981B (JP-S47-3981B), the α-substituted benzoin compound described in JP1972-22326B (JP-S47-22326B), the benzoin derivative described in JP1972-23664B (JP-S47-23664B), the aryolphosphonic acid ester described in JP1982-30704A (JP-557-30704A), the dialkoxybenzophenone described in JP1985-26483B (JP-560-26483B), the benzoin ethers described in JP1985-26403B (JP-560-26403B) and JP1987-81345A (JP-562-81345A), the α-aminobenzophenones described in JP1989-34242B (JP-H01-34242B), U.S. Pat. No. 4,318,791A, and EP0284561A1, the p-di(dimethylaminobenzoyl)benzene described in JP1990-211452A (JP-H02-211452A), the thio-substituted aromatic ketone described in JP1986-194062A (JP-561-194062A), the acylphosphine sulfide described in JP1990-9597B (JP-H02-9597B), the acylphosphine described in JP1990-9596B (JP-H02-9596B), the thioxanthones described in JP1988-61950B (JP-563-61950B), the coumarins described in JP1984-42864B (JP-559-42864B), and the like.

Furthermore, the polymerization initiators described in JP2008-105379A and JP2009-114290A are also preferable.

Among these internal photopolymerization initiators, (a) carbonyl compound or (b) acylphosphine oxide compound is more preferable. Specific examples thereof include bis(2,4,6-trimethylbenzoyl)-phenylphosphine oxide (for example, IRGACURE (registered trademark) 819 manufactured by BASF SE), 2-(dimethylamine)-1-(4-morpholinophenyl)-2-benzyl-1-butanone (for example, IRGACURE (registered trademark) 369 manufactured by BASF SE), 2-methyl-1-(4-methylthiophenyl)-2-morpholinopropan-1-one (for example, IRGACURE (registered trademark) 907 manufactured by BASF SE), 1-hydroxy-cyclohexyl-phenyl-ketone (for example, IRGACURE (registered trademark) 184 manufactured by BASF SE), 2,4,6-trimethylbenzoyl-diphenyl-phosphine oxide (for example, DAROCUR (registered trademark) TPO, LUCIRIN (registered trademark) TPO (all manufactured by BASF SE)), and the like.

Among these, from the viewpoint of improving sensitivity and from the viewpoint of suitability for LED light, as the internal photopolymerization initiator, (b) acylphosphine oxide compound is preferable, and a monoacylphosphine oxide compound (particularly preferably 2,4,6-trimethylbenzoyl-diphenyl-phosphine oxide) or a bisacylphoephine oxide compound (particularly preferably bis(2,4,6-trimethylbenzoyl)-phenylphosphine oxide) is more preferable.

At the time of manufacturing the gel particles, the internal photopolymerization initiator is dissolved as an oil-phase component together with the components constituting the gel particles, a water-phase component is added to and mixed with the oil-phase component, followed by emulsification. In this way, the internal photopolymerization initiator can be incorporated into the interior of the gel particles.

The content of the internal photopolymerization initiator with respect to the total solid content of the gel particles is preferably 0.1% by mass to 25% by mass, more preferably 0.5% by mass to 20% by mass, and even more preferably 1% by mass to 15% by mass.

(Polymerizable Monomer)

It is preferable that each of the gel particles further contains a polymerizable monomer.

In a case where each of the gel particles does not have a polymerizable group in the three-dimensional cross-linked structure, each of the gel particles contains a polymerizable monomer in the interior thereof, and a polymerizable group of the polymerizable monomer functions as a polymerizable group that the gel particles have.

The polymerizable monomer contained in the interior of each of the gel particles (hereinafter, referred to as an internal polymerizable monomer as well) can be selected from polymerizable monomers having a radically polymerizable ethylenically unsaturated bond.

Examples of the polymerizable monomer, which is used as an internal polymerizable monomer and has a radically polymerizable ethylenically unsaturated bond, include radically polymerizable monomers such as a compound having an ethylenically unsaturated group, acrylonitrile, styrene, and various ethylenically unsaturated polyesters, unsaturated polyethers, unsaturated polyamides, and unsaturated urethanes.

As the internal polymerizable monomer, a compound having an ethylenically unsaturated group is preferable.

One kind of internal polymerizable monomer may be used singly, or two or more kinds thereof may be used in combination.

Specific examples of the internal polymerizable monomer include acrylate monomers such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, bis(4-acryloxypolyethoxyphenyl)propane, polyethylene glycol diacrylate, polypropylene glycol diacrylate, dipentaerythritol tetraacrylate, trimethylolpropane triacrylate (for example, A-TMPT manufactured by SHIN-NAKAMURA CHEMICAL CO., LTD.), pentaerythritol triacrylate (for example, A-TMM-3L manufactured by SHIN-NAKAMURA CHEMICAL CO., LTD.), ditrimethylolpropane tetraacrylate (for example, AD-TMP manufactured by SHIN-NAKAMURA CHEMICAL CO., LTD.), dipentaerythritol pentaacrylate (for example, SR-399E manufactured by Sartomer Arkema Inc.), dipentaerythritol hexaacrylate (for example, A-DPH manufactured by SHIN-NAKAMURA CHEMICAL CO., LTD.), oligoester acrylate, N-methylol acrylamide, diacetone acrylamide, epoxy acrylate, isobornyl acrylate, dicyclopentenyl acrylate, dicyclopentenyl oxyethyl acrylate, dicyclopentanyl acrylate, neopentyl glycol propylene oxide adduct diacrylate (NPGPODA), cyclic trimethylolpropane formal acrylate, tetrahydrofurfuryl acrylate, 2-(2-ethoxyethoxy)ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, and 4-t-butylcyclohexyl acrylate; methacrylate monomers such as methyl methacrylate, n-butyl methacrylate, allyl methacrylate, glycidyl methacrylate, benzyl methacrylate, dimethylaminomethyl methacrylate, polyethylene glycol dimethacrylate, polypropylene glycol dimethacrylate, and 2,2-bis(4-methacryloxypolyethoxyphenyl)propane; allyl glycidyl ether, diallyl phthalate, triallyl trimellitate, N-vinyl caprolactam, and the like.

Among these internal polymerizable monomers, as polyfunctional polymerizable monomers, trimethylolpropane triacrylate, pentaerythritol triacrylate, ditrimethylolpropane tetraacrylate, dipentaerythritol pentaacrylate, dipentaerythritol hexaacrylate, and neopentyl glycol propylene oxide adduct diacrylate are preferable, and dipentaerythritol pentaacrylate is more preferable. As monofunctional polymerizable monomers, cyclic trimethylolpropane formal acrylate, isobornyl acrylate, tetrahydrofurfuryl acrylate, 2-(2-ethoxyethoxy)ethyl acrylate, 2-phenoxyethyl acrylate, and N-vinyl caprolactam are preferable.

From the viewpoint of the cross-linking properties and the film hardness, the internal polymerizable monomer is preferably a polyfunctional polymerizable monomer, more preferably a polymerizable monomer having three or more functional groups, and even more preferably a polymerizable monomer having four or more functional groups.

As the polyfunctional internal polymerizable monomer, a methacrylate monomer and an acrylate monomer are preferable, and an acrylate monomer is more preferable.

The internal polymerizable monomer is even more preferably an acrylate monomer having three or more functional groups, and particularly preferably an acrylate monomer having four or more functional groups.

In a case where the aforementioned monofunctional internal polymerizable monomer is used as the internal polymerizable monomer, the adhesiveness of the film is improved. Furthermore, in a case where two or more kinds of the aforementioned monofunctional internal polymerizable monomers are used in combination, the adhesiveness of the film is further improved.

In a case where two or more kinds of monofunctional internal polymerizable monomers and a polyfunctional internal polymerizable monomer are used in combination as the internal polymerizable monomer, in addition to the effect of improving the adhesiveness of the film, the effect of further improving the hardness of the film is also obtained.

In addition to the internal polymerizable monomers exemplified above, it is possible to use the commercially available products described in "Cross-linking Agent Handbook" edited by Shinzo Yamashita (1981, TAISEI-SHUPPAN CO., LTD.); "UV•EB Curing Handbook (raw materials)" edited by Kiyomi Kato (1985, Kobunshi Kankokai); "Application and Market of UV•EB Curing Technology" edited by RadTech Japan, p. 79, (1989, CMC); "Polyester Resin Handbook" written by Eichiro Takiyama, (1988, NIKKAN KOGYO SHIMBUN, LTD.) or to use radically polymerizable or cross-linkable monomers known in the related art.

As the internal polymerizable monomer, for example, the photocurable polymerizable monomers used in photopolymerizable compositions described in JP1995-159983A (JP-H07-159983A), JP1995-31399B (JP-H07-31399B), JP1996-224982A (JP-H08-224982A), JP1998-863A (JP-H10-863A), JP1997-134011A (JP-H09-134011A), JP2004-514014A, and the like are known. These monomers can also be suitably used in the gel particles.

Furthermore, as the internal polymerizable monomer, commercially available products may also be used. Examples thereof include ethoxylated or propoxylated acrylates such as AH-600, AT-600, UA-306H, UA-306T, UA-3061, UA-510H, UF-8001G DAUA-167 (manufactured by KYOEISHA CHEMICAL Co., LTD), SR444, SR454, SR492, SR499, CD501, SR502, SR9020, CD9021, SR9035, and SR494 (manufactured by Sartomer Arkema Inc.), isocyanuric monomers such as A-9300 and A-9300-1CL (manufactured by SHIN-NAKAMURA CHEMICAL CO., LTD.), and the like.

In addition, as the polymerizable monomer, it is possible to suitably use the commercially available products such as neopentyl glycol propylene oxide adduct diacrylate (NPG-PODA, Sartomer Arkema Inc.), SR399E (dipentaerythritol pentaacrylate, Sartomer Arkema Inc.), ATMM-3L (pentaerythritol triacrylate, SHIN-NAKAMURA CHEMICAL CO., LTD.), A-DHP (dipentaerythritol hexaacrylate, SHIN-NAKAMURA CHEMICAL CO., LTD.), ARONIX (registered trademark) M-156 (manufactured by TOAGOSEI CO., LTD.), V-CAP (manufactured by BASF-SE), VISCOAT #192 (manufactured by OSAKA ORGANIC CHEMICAL INDUSTRY LTD), SR-531, SR-285, and SR256 (manufactured by Sartomer Arkema Inc).

At the time of manufacturing the gel particles, the internal polymerizable monomer is dissolved as an oil-phase component together with the components constituting the gel particles, and a water-phase component is added to and mixed with the oil-phase component, followed by emulsification. In this way, the internal polymerizable monomer can be incorporated into the interior of the gel particles.

The molecular weight of the internal polymerizable monomer is, in terms of a weight-average molecular weight, preferably 100 to 100,000, more preferably 100 to 30,000, even more preferably 100 to 10,000, still more preferably 100 to 1,000, yet more preferably 100 to 900, much more preferably 100 to 800, and particularly preferably 150 to 750.

The weight-average molecular weight is measured by gel permeation chromatography (GPC).

The content of the internal polymerizable monomer in the total solid content of the gel particles is preferably 0.1% by mass to 75% by mass, more preferably 0.5% by mass to 60% by mass, and even more preferably 1% by mass to 50% by mass. In a case where the content of the internal polymerizable monomer is within the above range, the cross-linking properties and the hardness of the formed film are improved.

(Compound Having Hydrophilic Group)

As described above, it is preferable that the gel particles each have a hydrophilic group on the surface thereof.

The introduction of a hydrophilic group into the surface of each of the gel particles can be performed by reacting the aforementioned isocyanate compound having three or more functional groups with the aforementioned compound having two or more active hydrogen groups and a compound having a hydrophilic group. Furthermore, at the time of manufacturing the aforementioned isocyanate compound having three or more functional groups, by reacting an isocyanate compound having two or more functional groups with a compound having a hydrophilic group, and reacting an isocyanate compound, into which a hydrophilic group is introduced in advance, with the aforementioned compound having two or more active hydrogen groups, a hydrophilic group can be introduced into the surface of each of the gel particles.

Examples of the compound having a hydrophilic group that is used for introducing a hydrophilic group into the surface of each of the gel particles include compounds having hydrophilic groups described above.

The preferable range of the hydrophilic group is as described above.

As the compound having a hydrophilic group, a compound having a polyether structure, a compound having a carboxyl group, or a compound having a salt of a carboxyl group is particularly preferable.

Examples of the compound having a polyether structure include a compound having a polyoxyalkylene chain. Specific examples thereof include polyethylene oxide, polypropylene oxide, polytetramethylene oxide, polystyrene oxide, polycyclohexylene oxide, a polyethylene oxide-polypropylene oxide block copolymer, a polyethylene oxide-polypropylene oxide random copolymer, and the like.

Among these compounds having a polyoxyalkylene chain, polyethylene oxide, polypropylene oxide, and a polyethylene oxide-polypropylene oxide block copolymer are preferable, and polyethylene oxide is more preferable.

Furthermore, as the compound having a polyether structure, a polyethylene oxide monoether compound (examples of the monoether include monomethyl ether, monoethyl ether, and the like) and a polyethylene oxide monoester compound (examples of the monoester include a monoacetic acid ester, a mono(meth)acrylic acid ester, and the like) are also preferable.

Specific examples of the compound having an ionic hydrophilic group such as a carboxyl group are as below.

HD-1

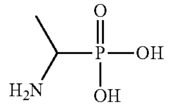

-continued
HD-2
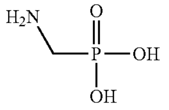
HD-3
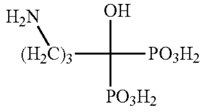
HD-4
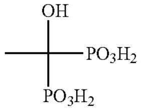
HD-5
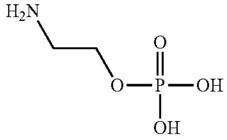
HD-6
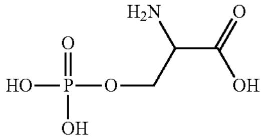
HD-7
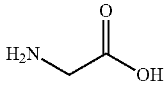
HD-8
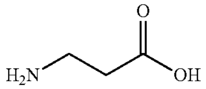
HD-9
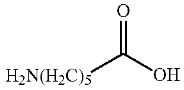
HD-10
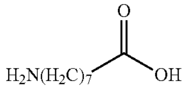
HD-11
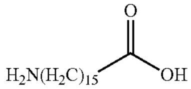
HD-12
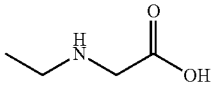
HD-13
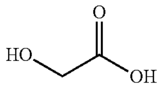
HD-14
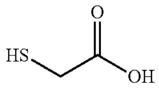
HD-15
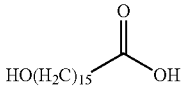
-continued
HD-16
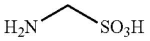
HD-17
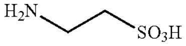
HD-18
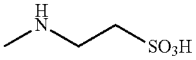
HD-19
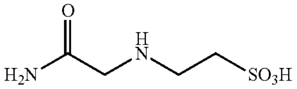
HD-20
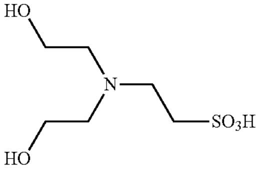
HD-21
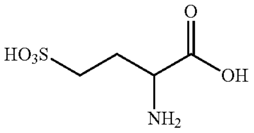
HD-22
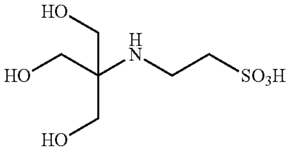
HD-23
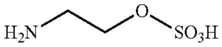
HD-24
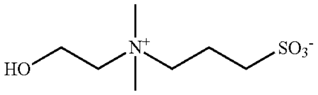
HD-25
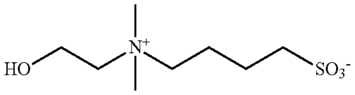
HD-26
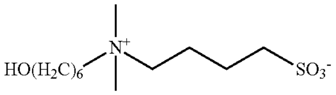
HD-27
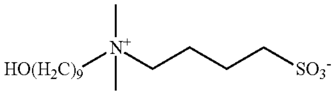
HD-28
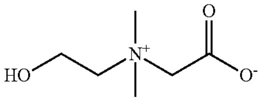
HD-29
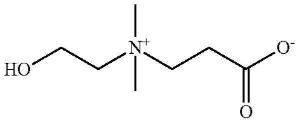

-continued

HD-30

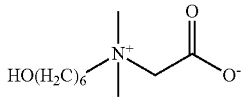

HD-31

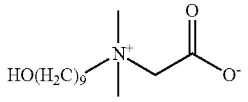

HD-32

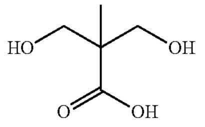

HD-33

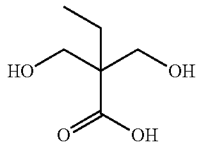

Examples of the compound having an ionic hydrophilic group such as a carboxyl group also include amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

The compound having an ionic hydrophilic group such as a carboxyl group may be used by being partially neutralized using an inorganic base such as sodium hydroxide and an organic base such as triethylamine.

—Isocyanate Compound into which Hydrophilic Group is Introduced—

As described above, for introducing a hydrophilic group into the surface of each of the gel particles, an isocyanate compound into which a hydrophilic group is introduced can also be used.

Examples of the isocyanate compound into which a hydrophilic group is introduced include a reaction product between a compound having a hydrophilic group and a difunctional isocyanate compound (preferably, isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), or cyclohexylmethane-4,4'-diisocyanate (HMDI)).

In a case where the group having a polyether structure is introduced into the gel particles, as the isocyanate compound into which the hydrophilic group (specifically, the group having a polyether structure) is introduced, it is preferable to use an adduct of a compound having two or more active hydrogen groups, a difunctional isocyanate compound, and a compound having a polyether structure.

The preferable aspects of the compound having two or more active hydrogen groups and the difunctional isocyanate compound are as described above.

As the compound having a polyether structure, a compound represented by Formula (WM) is preferable.

$$HO\text{-}(R^{W1}\text{—}O)_{nw}\text{-}R^{W2} \qquad \text{Formula (WM)}$$

In Formula (WM), each of $R^{W1}$, $R^{W2}$, and nw has the same definition as $R^{W1}$, $R^{W2}$, and nw in Formula (WS) described above, and the preferable aspect thereof is also the same.

As the adduct of the compound having two or more active hydrogen groups, the difunctional isocyanate compound, and the compound having a polyether structure, an adduct (for example, TAKENEATE (registered trademark) D-116N manufactured by Mitsui Chemicals, Inc.) of trimethylolpropane (TMP), m-xylylene diisocyanate (XDI), and polyethylene glycol monomethyl ether (EO) is preferable.

In a case where a carboxyl group or a salt of a carboxyl group is introduced as a hydrophilic group into the surface of each of the gel particles, as the isocyanate compound into which the hydrophilic group (specifically, a carboxyl group or a salt of a carboxyl group) is introduced, it is preferable to use a reaction product (isocyanate compound containing a carboxyl group or a salt of a carboxyl group) between 2,2-bis(hydroxymethyl)propionic acid (DMPA) or a salt of 2,2-bis(hydroxymethyl)propionic acid (DMPA) and isophorone diisocyanate (IPDI).

As the salt of a carboxyl group, a sodium salt, a potassium salt, a triethylamine salt, or a dimethylethanolamine salt is preferable, and a sodium salt or a triethylamine salt is more preferable.

The amount of the compound having a hydrophilic group added that is used for introducing a hydrophilic group into the surface of each of the gel particles is preferably 0.1% by mass to 50% by mass, more preferably 1% by mass to 45% by mass, and even more preferably 3% by mass to 40% by mass, with respect to the mass of the gel particles.

The gel particles may contain other components in the interior thereof, in addition to the above components.

Examples of other components that can be contained in the interior of the gel particles include a sensitizer which will be described later, a resin, and the like.

The resin that can be contained in the interior of the gel particles (hereinafter, referred to as "internal resin" as well) may or may not have a polymerizable group.

In a case where the aqueous dispersion of the present disclosure contains the internal resin, as the internal resin, a water-insoluble resin may be used.

Herein, "water-insoluble resin" means a resin dissolved in amount of equal to or smaller than 1 g in 100 g of distilled water with a temperature of 25° C. in a case where the resin is dried for 2 hours at 105° C.

As described above, in the aqueous dispersion of the present disclosure, by incorporating a water-insoluble resin exhibiting low solubility in water into the interior of the gel particles, the aqueous dispersion which is an aqueous composition can contain the water-insoluble resin.

~Physical Properties of Gel Particles~

From the viewpoint of the dispersibility, the volume average particle diameter of the gel particles is preferably 0.01 μm to 10.0 μm, more preferably 0.01 μm to 5 μm, and even more preferably 0.05 μm to 1 μm.

The volume average particle diameter of the gel particles can be measured by a light scattering method. In the present specification, as the volume average particle diameter, a value measured using LA-910, (manufactured by HORIBA, Ltd.) is used.

The amount of the total solid content of the gel particles with respect to the total amount of the aqueous dispersion is preferably 0.3% by mass to 20.0% by mass, more preferably 0.5% by mass to 15.0% by mass, even more preferably 0.6% by mass to 13.0% by mass, still more preferably 1.0% by mass to 12.0% by mass, and particularly preferably 1.5% by mass to 7.5% by mass.

<Water>

The aqueous dispersion of the present disclosure contains water as a dispersion medium for the gel particles.

The content of water in the aqueous dispersion of the present disclosure is not particularly limited. However, the content of water with respect to the total amount of the aqueous dispersion is preferably 10% by mass to 99% by mass, more preferably 20% by mass to 95% by mass, even more preferably 30% by mass to 90% by mass, and particularly preferably 50% by mass to 90% by mass.

<Sensitizer>

The aqueous dispersion of the present disclosure may contain a sensitizer.

In a case where the aqueous dispersion of the present disclosure contains a sensitizer, the decomposition of the photopolymerization initiator by the irradiation of active energy rays can be further accelerated.

The sensitizer is a substance which becomes in an electron-excited state by absorbing specific active energy rays. By coming into contact with the photopolymerization initiator, the sensitizer in the electron-excited state performs an action such as electron transfer, energy transfer, or heating. As a result, the chemical change of the photopolymerization initiator, that is, the decomposition, the generation of a radical, an acid, or a base, or the like is accelerated.

Examples of the sensitizer include benzophenone, thioxanthone, isopropylthioxanthone, anthraquinone, a 3-acylcoumarin derivative, terphenyl, styryl ketone, 3-(aroylmethylene)thiazolyl, camphorquinone, eosin, rhodamine, erythrosine, and the like.

Furthermore, as the sensitizer, the compound represented by General Formula (i) described in JP2010-24276A or the compound represented by General Formula (I) described in JP1994-107718A (JP-H06-107718A) can also be suitably used.

Among the above compounds, as the sensitizer, from the viewpoint of the suitability for LED light and the reactivity with the photopolymerization initiator, at least one kind of compound selected from thioxanthone, isopropylthioxanthone, and benzophenone is preferable, at least one kind of compound selected from thioxanthone and isopropylthioxanthone is more preferable, and isopropylthioxanthone is even more preferable.

In a case where the aqueous dispersion of the present disclosure contains a sensitizer, the aqueous dispersion may contain one kind of sensitizer singly or two or more kinds of sensitizers in combination.

In a case where the aqueous dispersion of the present disclosure contains a sensitizer, from the viewpoint of further improving the reactivity with the photopolymerization initiator, it is preferable that the sensitizer is contained in the interior of the gel particles.

In a case where the aqueous dispersion of the present disclosure contains a sensitizer, the content of the sensitizer with respect to the total solid content of the gel particles is preferably 0.1% by mass to 25% by mass, more preferably 0.5% by mass to 20% by mass, and even more preferably 1% by mass to 15% by mass.

<Colorant>

The aqueous dispersion of the present disclosure may contain at least one kind of colorant.

In a case where the aqueous dispersion contains a colorant, it is preferable that the aqueous dispersion contains the colorant in the exterior of the gel particles.

The colorant is not particularly limited and can be used by being arbitrarily selected from known coloring materials such as a pigment, a water-soluble dye, and a dispersed dye. It is more preferable that the aqueous dispersion contains a pigment among the above colorants, because the pigment has high weather fastness and excellent color reproducibility.

The pigment is not particularly limited and can be appropriately selected according to the purpose. Examples thereof include known organic pigments and inorganic pigments, resin particles stained with a dye, commercially available pigment dispersions, and surface-treated pigments (for example, those obtained by dispersing a pigment in water, a liquid compound, an insoluble resin, or the like as a dispersion medium and pigments of which the surface is treated with a resin, a pigment derivative, or the like).

Examples of the organic pigments and inorganic pigments include a yellow pigment, a red pigment, a magenta pigment, a blue pigment, a cyan pigment, a green pigment, an orange pigment, a purple pigment, a brown pigment, a black pigment, a white pigment, and the like.

In a case where a pigment is used as a colorant, if necessary, a pigment dispersant may be used at the time of preparing the pigment particles.

Regarding the coloring material such as a pigment and the pigment dispersant, paragraphs "0180" to "0200" in JP2014-040529A can be referred to as appropriate.

<Other Components>

If necessary, the aqueous dispersion of the present disclosure may contain other components in addition to the components described above.

Those other components may or may not be contained in the gel particles.

(Surfactant)

The aqueous dispersion of the present disclosure may contain a surfactant.

In a case where the aqueous dispersion of the present disclosure contains a surfactant, the dispersibility of the gel particles can be further improved.

Examples of the surfactant include a higher fatty acid salt, alkyl sulfate, alkyl ester sulfate, alkyl sulfonate, alkylbenzene sulfonate, sulfosuccinate, naphthalene sulfonate, alkyl phosphate, polyoxyalkylene alkyl ether phosphate, polyoxyalkylene alkyl phenyl ether, polyoxyethylene polyoxypropylene glycol, glycerin ester, sorbitan ester, polyoxyethylene fatty acid amide, amine oxide, and the like.

Among these, as a surfactant, at least one kind of surfactant selected from alkyl sulfate, alkyl sulfonate, and alkylbenzene sulfonate is preferable, and alkyl sulfate is particularly preferable.

From the viewpoint of the dispersibility of the gel particles, the surfactant is preferably alkyl sulfate having an alkyl chain length of 8 to 18, more preferably at least one kind of surfactant selected from sodium dodecyl sulfate (SDS, alkyl chain length: 12) and sodium cetyl sulfate (SCS, alkyl chain length: 16), and even more preferably sodium cetyl sulfate (SCS).

The aqueous dispersion of the present disclosure may contain other surfactants in addition to the aforementioned surfactant. Examples of other surfactants include those described in JP1987-173463A (JP-S62-173463A) and JP1987-183457A (JP-S62-183457A). Examples of other surfactants include nonionic surfactants such as polyoxyethylene alkyl ethers, polyoxyethylene alkyl allyl ethers, acetylene glycols, polyoxyethylene/polyoxypropylene block copolymers, and siloxanes.

As a surfactant, an organic fluoro compound may also be used.

The organic fluoro compound is preferably hydrophobic. Examples of the organic fluoro compound include a fluorine-based surfactant, an oil-like fluorine-based compound (for example, fluorine oil), a solid-like fluorine compound resin (for example tetrafluoroethylene resin), and those described in JP1982-9053B (JP-S57-9053B) (the eighth column to the seventeenth column) and JP1987-135826A (JP-S62-135826A).

As the surfactant, a surfactant having a weight-average molecular weight less than 1,000 (particularly preferably less than 700) is preferable.

(Polymerization Inhibitor)

The aqueous dispersion of the present disclosure may contain a polymerization inhibitor.

In a case where the aqueous dispersion of the present disclosure contains a polymerization inhibitor, the storage stability of the aqueous dispersion can be further improved.

Examples of the polymerization inhibitor include p-methoxyphenol, quinones (for example, hydroquinone, benzoquinone, methoxybenzoquinone, and the like), phenothiazine, catechols, alkyl phenols (for example, dibutylhydroxytoluene (BHT) and the like), alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidin-1-oxyl (TEMPO), 2,2,6,6-tetramethyl-4-hydroxypiperidin-1-oxyl (TEMPOL), cupferron Al, a tris(N-nitroso-N-phenylhydroxylamine)aluminum salt, and the like.

Among these, at least one kind of compound selected from p-methoxyphenol, catechols, quinones, alkyl phenols, TEMPO, TEMPOL, cupferron Al, and a tris(N-nitroso-N-phenylhydroxylamine)aluminum salt is preferable, and at least one kind of compound selected from p-methoxyphenol, hydroquinone, benzoquinone, BHT, TEMPO, TEMPOL, cupferron Al, and a tris(N-nitroso-N-phenylhydroxylamine) aluminum salt is more preferable.

(Ultraviolet Absorber)

The aqueous dispersion of the present disclosure may contain an ultraviolet absorber.

In a case where the aqueous dispersion of the present disclosure contains an ultraviolet absorber, the weather fastness of the film can be further improved.

Examples of the ultraviolet absorber include known ultraviolet absorbers such as a benzotriazole-based compound, a benzophenone-based compound, a triazine-based compound, a benzoxazole-based compound, and the like.

(Organic Solvent)

The aqueous dispersion of the present disclosure may contain an organic solvent.

In a case where the aqueous dispersion of the present disclosure contains an organic solvent, the adhesiveness between the film and the substrate can be further improved.

In a case where the aqueous dispersion of the present disclosure contains an organic solvent, the content of the organic solvent with respect to the total amount of the aqueous dispersion is preferably 0.1% by mass to 5% by mass.

Specific examples of the organic solvent are as below.

Alcohols (for example, methanol, ethanol, propanol, isopropanol, butanol, isobutanol, sec-butanol, tert-butanol, pentanol, hexanol, cyclohexanol, benzyl alcohol, and the like)

Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, 2-methylpropanediol, and the like)

Polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether, and the like)

Amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine, and the like)

Amides (for example, formamide, N,N-dimethylformamide, N,N-dimethylacetamide, and the like)

Heterocyclic rings (for example, 2-pyrrolidone, N-methyl-2-pyrrolidone, cyclohexyl pyrrolidone, 2-oxazolidone, 1,3-dimethyl-2-imidazolidinone, γ-butyrolactone, and the like)

Sulfoxides (for example, dimethyl sulfoxide and the like)

Sulfones (for example, sulfolane and the like)

Others (urea, acetonitrile, acetone, and the like)

From the viewpoint of the physical properties of the film, the adhesiveness, and the control of jetting properties, if necessary, the aqueous dispersion of the present disclosure may contain a photopolymerization initiator, a polymerizable monomer, a resin not having a polymerizable group, and the like in the exterior of the gel particles.

(Photopolymerization Initiator that can be Contained in Exterior of Gel Particles)

Examples of the photopolymerization initiator that can be contained in the exterior of the gel particles include the same photopolymerization initiator as the aforementioned photopolymerization initiator (the photopolymerization initiator contained in the interior of the gel particles). As the photopolymerization initiator that can be contained in the exterior of the gel particles, a water-soluble or water-dispersible photopolymerization initiator is preferable. In this respect, examples of preferable photopolymerization initiators include DAROCUR (registered trademark) 1173, IRGACURE (registered trademark) 2959, IRGACURE (registered trademark) 754, DAROCUR (registered trademark) MBF, IRGACURE (registered trademark) 819DW, IRGACURE (registered trademark) 500 (all manufactured by BASF SE) and the like.

"Water-soluble" in the aforementioned photopolymerization initiator has the same definition as "water-soluble" in the "water-soluble resin" described above, and "water-dispersible" in the aforementioned photopolymerization initiator has the same definition as "water-dispersible" in "water-dispersible resin" described above.

(Polymerizable Monomer that can be Contained in Exterior of Gel Particles)

Examples of the polymerizable monomer that can be contained in the exterior of the gel particles include radically polymerizable compounds such as a compound having an ethylenically unsaturated group, acrylonitrile, styrene, unsaturated polyester, unsaturated polyether, unsaturated polyamide, and unsaturated urethane.

Among these, as the aforementioned polymerizable monomer, a compound having an ethylenically unsaturated group is preferable, and a compound having a (meth) acryloyl group is particularly preferable.

As the polymerizable monomer that can be contained in the exterior of the gel particles, a water-soluble or water-dispersible polymerizable monomer is preferable.

"Water-soluble" in the aforementioned polymerizable monomer has the same definition as "water-soluble" in "water-soluble resin" described above, and "water-dispersible" in the aforementioned polymerizable monomer has the same definition as "water-dispersible" in "water-dispersible resin" described above.

From the viewpoint of the water solubility or the water dispersibility, as the aforementioned polymerizable monomer, a compound having at least one kind of structure selected from the group consisting of an amide structure, a polyethylene glycol structure, a polypropylene glycol structure, a carboxyl group, and a salt of a carboxyl group is preferable.

From the viewpoint of the water solubility or the water dispersibility, as the polymerizable monomer that can be contained in the exterior of the gel particles, at least one kind of compound selected from (meth)acrylic acid, sodium (meth)acrylate, potassium (meth)acrylate, N,N-dimethylacrylamide, N,N-diethylacrylamide, morpholine acrylamide, N-2-hydroxyethyl (meth)acrylamide, N-vinylpyrrolidone, N-vinylcaprolactam, 2-hydroxyethyl (meth)acrylate, 3-hydroxypropyl (meth)acrylate, 2-hydroxypropyl (meth) acrylate, glycerin monomethacrylate, N-[tris(3-acryloylaminopropyloxymethylene)methyl]acrylamide, diethylene glycol bis(3-acryloylaminopropyl)ether, polyethylene glycol di(meth)acrylate, and polypropylene glycol di(meth)acrylate is preferable, and at least one kind of compound selected from (meth)acrylic acid, N,N-dimethylacrylamide, N-2-hydroxyethyl (meth)acrylamide, 2-hydroxyethyl (meth)acrylate, glycerin monomethacrylate, N-[tris(3-acryloylaminopropyloxymethylene)methyl]acrylamide, diethylene glycol bis(3-acryloylaminopropyl)ether, polyethylene glycol di(meth)acrylate, and polypropylene glycol di(meth)acrylate is more preferable.

The weight-average molecular weight of the polymerizable monomer that can be contained in the exterior of the gel particles is preferably less than 700.

(Resin not Having Polymerizable Group that can be Contained in Exterior of Gel Particles)

As the resin not having a polymerizable group that can be contained in the exterior of the gel particles, the same polymerizable resin as described above that does not have a polymerizable group can be used.

Here, as the resin not having a polymerizable group, in addition to a resin having a polyurethane structure that is a preferable aspect of the polymerizable resin, a resin having at least one kind of structure selected from the group consisting of a polyester structure, a polyvinyl structure, and a polyolefin structure may be used, or a resin having at least one kind of structure described above and a polyurethane structure may be used.

<Preferable Physical Properties of Aqueous Dispersion>

In a case where the temperature of the aqueous dispersion of the present disclosure is within a range of 25° C. to 50° C., the viscosity of the aqueous dispersion is preferably 3 mPa·s to 15 mPa·s, and more preferably 3 mPa·s to 13 mPa·s. Particularly, in a case where the temperature of the aqueous dispersion of the present disclosure is 25° C., the viscosity of the aqueous dispersion is preferably equal to or lower than 50 mPa·s. In a case where the viscosity of the aqueous dispersion is within the above range, at the time of using the aqueous dispersion as an ink composition for ink jet recording, high jetting stability can be realized.

The viscosity of the aqueous dispersion is a value measured using a viscometer (VISCOMETER TV-22, manufactured by TOKI SANGYO CO., LTD).

[Method for Manufacturing Aqueous Dispersion]

The method for manufacturing an aqueous dispersion of the present disclosure is not particularly limited, as long as the aqueous dispersion of the present disclosure having the constitution described above can be manufactured.

As the method for manufacturing an aqueous dispersion of the present disclosure, from the viewpoint of easily obtaining the aqueous dispersion of the present disclosure, a method for manufacturing an aqueous dispersion of the present embodiment that will be described below is preferable.

The method for manufacturing an aqueous dispersion of the present embodiment (hereinafter, referred to as "manufacturing method of the present embodiment" as well) includes a preparation step of preparing a gel particle dispersion containing the aforementioned gel particles and water and a resin mixing step of mixing the gel particle dispersion with a polymerizable resin (that is, a resin having polymerizing properties) so as to obtain the aqueous dispersion of the present disclosure.

If necessary, the manufacturing method of the present embodiment may include other steps.

According to the manufacturing method of the present embodiment, the aforementioned aqueous dispersion of the present disclosure can be easily manufactured.

Hereinafter, each of the steps in the manufacturing method of the present embodiment will be specifically described.

Specific examples of the components used in each step and preferable aspects thereof are the same as described above in the section of the aqueous dispersion. Therefore, the description thereof will not be repeated.

(Preparation Step)

The preparation step is a step of preparing a gel particle dispersion containing gel particles and water.

It is preferable that the gel particle dispersion substantially does not contain a polymerizable resin. The content of the polymerizable resin in the gel particle dispersion is preferably less than 1% by mass, and particularly preferably 0% by mass (that is, it is particularly preferable that the gel particle dispersion does not contain the polymerizable resin).

The preparation step is a step performed for the sake of convenience. That is, in the manufacturing method of the present embodiment, at the time of manufacturing the aqueous dispersion of the present disclosure, a gel particle dispersion prepared in advance may be used. Alternatively, at the time of manufacturing the aqueous dispersion of the present disclosure, first, a gel particle dispersion may be manufactured, and then the manufactured gel particle dispersion may be used.

In the gel particle dispersion, the internal content rate of the photopolymerization initiator contained in the interior of the gel particles can be measured by the same method as the measurement method described in the section of "Aqueous dispersion", except that the amount of tetrahydrofuran (THF) for preparing the diluted solution is changed such that the mass of the THF becomes 100 times the mass of the total solid content of the gel particle dispersion. The preferable range of the internal content rate of the photopolymerization initiator in the gel particle dispersion is the same as the preferable range described in the section of "Aqueous dispersion".

Furthermore, whether the gel particle dispersion contains the gel particles having a three-dimensional cross-linked structure is checked by the same method as the method for checking whether the aqueous dispersion contains the gel particles having a three-dimensional cross-linked structure described in the section of "Aqueous dispersion", except that the amount of tetrahydrofuran (THF) for preparing the diluted solution is changed such that the mass of the THF becomes 100 times the mass of the total solid content of the gel particle dispersion.

The preparation step preferably includes an emulsification step of obtaining an emulsion by mixing any oil-phase component, which is selected from an oil-phase component containing a photopolymerization initiator, an isocyanate compound having three or more functional groups, a polymerizable monomer, and an organic solvent (hereinafter, referred to as "oil-phase component A" as well), an oil-phase component containing a photopolymerization initiator, a polymerizable group-containing isocyanate compound having three or more functional groups, and an organic solvent (hereinafter, referred to as "oil-phase component B" as well), and an oil-phase component containing a photopolymerization initiator, a polymerizable group-containing isocyanate compound having three or more functional groups, a polymerizable monomer, and an organic solvent (hereinafter, referred to as "oil-phase component C" as well), with a water-phase component containing water and emulsifying the mixture; and a gelification step of obtaining the aforementioned gel particle dispersion by heating the emulsion.

—Emulsification Step—

The emulsification step is a step of obtaining an emulsion by mixing any oil-phase component selected from the oil-phase component A, oil-phase component B, and the oil-phase component C with a water-phase component containing water, and emulsifying the mixture.

In the emulsification step, as an oil-phase component, any oil-phase component selected from the oil-phase component A containing a photopolymerization initiator, an isocyanate compound having three or more functional groups, a polymerizable monomer, and an organic solvent, the oil-phase component B containing a photopolymerization initiator, a polymerizable group-containing isocyanate compound having three or more functional groups, and an organic solvent, and the oil-phase component C containing a photopolymerization initiator, a polymerizable group-containing isocyanate compound having three or more functional groups, a polymerizable monomer, and an organic solvent is used. In this way, finally, it is possible to obtain gel particles that each contain at least a photopolymerization initiator in the interior thereof and have a polymerizable group on the surface or in the vicinity of the surface of each of the gel particles.

It is considered that the polymerizable monomer contained in the oil-phase component A, the polymerizable group-containing isocyanate compound having three or more functional groups contained in the oil-phase component B, and the polymerizable monomer and the polymerizable group contained in the polymerizable group-containing isocyanate compound having three or more functional groups that are contained in the oil-phase component C become the polymerizable group present on the surface of each of the gel particles or present on the surface and in the vicinity of the surface of each of the gel particles.

Examples of the organic solvent contained in the oil-phase component include ethyl acetate, methyl ethyl ketone, and the like.

If necessary, the oil-phase component may contain other components in addition to the aforementioned components.

Examples of other components include a compound having the aforementioned hydrophilic group.

In a case where the oil-phase component contains a compound having the aforementioned hydrophilic group, gel particles having a hydrophilic group on the surface thereof can be obtained.

As the isocyanate compound having three or more functional groups, an isocyanate compound is preferable which is derived from at least one kind of compound selected from isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane 4,4'-diisocyanate.

If necessary, the water-phase component may contain other components in addition to water.

In a case where the oil-phase component contains, as the compound having a hydrophilic group, a compound having at least one kind of hydrophilic group selected from a carboxyl group, a sulfo group, a sulfuric acid group, a phosphonic acid group, and a phosphoric acid group, the water-phase component may contain a neutralizer.

In a case where the oil-phase component contains the compound having a hydrophilic group, and the water-phase component contains a neutralizer, by mixing the oil-phase component with the water-phase component, the hydrophilic group such as a carboxyl group is neutralized, and a salt of the carboxyl group and the like are formed. The formed salts also function as a hydrophilic group of the gel particles. These salts are particularly effective for dispersing the gel particles in water.

Examples of the neutralizer include sodium hydroxide and the like.

In the manufacturing method of the present embodiment, depending on the reaction with the isocyanate group, as a raw material for forming the gel particles having a three-dimensional cross-linked structure containing at least one bond selected from a urethane bond and a urea bond, in addition to water, the polyfunctional alcohol, the polyfunctional phenol, the polyfunctional amine having a hydrogen atom on a nitrogen atom, the polyfunctional thiol, and the like described above may be used.

Specifically, examples thereof include compounds such as a polyfunctional alcohol (for example, propylene glycol, glycerin, trimethylolpropane, and the like), a polyfunctional amine (for example, bis(hexamethylene)triamine, ethylene diamine, diethylene triamine, and the like), a polyfunctional thiol (for example, pentaerythritol tetra(3-mercaptopropionate) and the like). Among these, a polyfunctional alcohol is particularly preferable.

One kind of these compounds may be used singly, or two or more kinds thereof may be used in combination. These compounds are added to the oil-phase component and/or the water-phase component according to the solubility and the like of the compounds.

In the manufacturing method of the present embodiment, in addition to the aforementioned raw materials, a surfactant is preferably used. Examples of the surfactant include the surfactants described above.

Generally, as a surfactant used for emulsification dispersion, a hydrophobic group-containing surfactant having a relatively long chain is considered excellent. For example, as the surfactant, the surfactants described in "Surfactant Handbook" (Ichiro Nishi et al., published from Sangyo Tosho Publishing Co., Ltd. (1980)), specifically, an alkali metal salt such as alkyl sulfate, alkyl sulfonate, or alkyl benzene sulfonic acid is preferable, and an alkyl sulfuric acid ester salt is more preferable.

From the viewpoint of the dispersion stability, the alkyl chain length of the alkyl sulfuric acid ester salt is preferably equal to or greater than 12, and more preferably equal to or greater than 16.

The surfactant may be added any of the oil-phase component and the water-phase component. However, because the surfactant exhibits low solubility in an organic solvent in general, the surfactant is added to the water-phase component.

The amount of the surfactant with respect to the amount of the total solid content of the oil-phase component is preferably 0.1% by mass to 5% by mass, and more preferably 0.5% by mass to 3% by mass.

The amount of the solid content (hereinafter, referred to as "amount of the total solid content" as well) obtained by subtracting the amount of the organic solvent and the water from the amount of the oil-phase component and the water-phase component in the emulsification step corresponds to the amount of the total solid content of the manufactured gel particles.

The amount of the photopolymerization initiator in the oil-phase component is not particularly limited, and is preferably 0.1% by mass to 25% by mass with respect to the amount of the total solid content, for example.

The amount of the isocyanate compound having three or more functional groups (or the polymerizable group-containing isocyanate compound having three or more functional groups) in the oil-phase component is not particularly limited, and is preferably 10% by mass to 70% by mass with respect to the amount of the total solid content, for example.

In a case where the oil-phase component contains a polymerizable monomer, the amount of the polymerizable monomer in the oil-phase component is not particularly limited, and is preferably 0.1% by mass to 75% by mass with respect to the amount of the total solid content, for example.

The amount of the organic solvent is not particularly limited, and is appropriately selected according to the type and amount of the components contained in the oil-phase component and the like.

The amount of water is not particularly limited, and is appropriately selected according to the type and amount of the components contained in the oil-phase component and the like.

In a case where the oil-phase component contains a compound having a hydrophilic group, the amount of the compound having a hydrophilic group contained in the oil-phase component is not particularly limited, and is preferably 0.1% by mass to 40% by mass with respect to the amount of the total solid content, for example.

The components contained in the oil-phase component need to be simply mixed together. All of the components may be mixed together at the same time, or the components may be mixed together by being divided into several groups.

The method for mixing the oil-phase component with the water-phase component is not particularly limited, and examples thereof include mixing by stirring.

The method for emulsifying the mixture obtained by mixing is not particularly limited, and examples thereof include emulsification by an emulsification device (for example, a disperser) such as a homogenizer.

The rotation speed of the disperser used for the emulsification is 5,000 rpm to 20,000 rpm for example, and preferably 10,000 rpm to 15,000 rpm.

The rotation time during the emulsification is 1 minute to 120 minutes for example, preferably 3 minutes to 60 minutes, more preferably 3 minutes to 30 minutes, and even more preferably 5 minutes to 15 minutes.

—Gelification Step—

The gelification step is a step of obtaining a gel particle dispersion containing gel particles and water by heating the aforementioned emulsion.

In the gelification step, by heating the emulsion, the isocyanate compound having three or more functional groups reacts with water, and hence the isocyanate groups are cross-liked to each other. In this way, it is possible to obtain a gel particle dispersion containing gel particles which each have a three-dimensional cross-linked structure containing at least one bond selected from a urethane bond and a urea bond, have a polymerizable group, and contain at least a photopolymerization initiator in the interior thereof.

The heating temperature (reaction temperature) of the emulsion in the gelification step is preferably 35° C. to 70° C., and more preferably 40° C. to 60° C.

The heating time (reaction time) in the gelification step is preferably 6 hours to 50 hours, more preferably 12 hours to 40 hours, and even more preferably 15 hours to 35 hours.

It is preferable that the gelification step includes a step of distilling away the organic solvent from the emulsion.

(Resin Mixing Step)

The resin mixing step is a step of mixing the aforementioned gel particle dispersion with a polymerizable resin so as to obtain an aqueous dispersion.

In the resin mixing step, the gel particle dispersion may be mixed with the aqueous dispersion of the polymerizable resin.

By the resin mixing step, the aqueous dispersion containing the aforementioned gel particles, the polymerizable resin contained in the exterior of the gel particles, and water is obtained.

The preferable range of the polymerizable resin in the resin mixing step is the same as the preferable range of the polymerizable resin described above.

In the resin mixing step, at least the gel particle dispersion and the polymerizable resin are mixed together. However, in addition to these, other components (for example, at least one component selected from the group consisting of a colorant, a surfactant, an organic solvent, and water) may be further mixed together.

Those other components are as described above as other components that can be contained in the aqueous dispersion.

If necessary, the manufacturing method of the present embodiment may include other steps in addition to the emulsification step, the gelification step, and the resin mixing step.

Examples of those other steps include a step of adding other components described above.

Those other components to be added are as described above as other components that can be contained in the aqueous dispersion.

[Image Forming Method]

The image forming method of the present embodiment includes an application step of applying the aqueous dispersion of the present disclosure described above onto a recording medium, and an irradiation step of irradiating the aqueous dispersion applied onto the recording medium with light (that is, active energy rays).

If necessary, the image forming method of the present embodiment may include other steps.

According to the image forming method of the present embodiment, an image exhibiting excellent hardness and excellent surface conditions can be formed on a recording medium. The image also exhibits excellent adhesiveness with respect to a recording medium.

(Application Step)

The application step is a step of applying the aqueous dispersion of the present disclosure onto a recording medium.

As the aspect in which the aqueous dispersion is applied onto a recording medium, an aspect is particularly preferable in which the aqueous dispersion (that is, an ink composition for ink jet recording) is applied onto a recording medium by an ink jet method by using the aqueous dispersion as an ink composition for ink jet recording.

As the recording medium, it is possible to use the substrate exemplified above as "substrate for forming a film by using the aqueous dispersion".

The application of the aqueous dispersion by an ink jet method can be performed using a known ink jet recording device.

The ink jet recording device is not particularly limited, and a known ink jet recording device that can achieve intended resolution can be appropriately selected and used. That is, any of known ink jet recording devices including commercially available products can jet the aqueous dispersion onto a recording medium in the image forming method.

Examples of the ink jet recording device include a device including an ink supply system, a temperature sensor, and heating means.

The ink supply system includes, for example, a base tank containing the ink composition as the aqueous dispersion of the present disclosure, supply piping, an ink supply tank disposed immediately before an ink jet head, a filter, and a piezo-type ink jet head. The piezo-type ink jet head can be driven such that it can jet multi-sized dots preferably having a size of 1 pl to 100 pl and more preferably having a size of 8 pl to 30 pl, preferably at a resolution of 320 dots per inch (dpi)×320 dpi to 4,000 dpi×4,000 dots per inch (dpi), more preferably at a resolution of 400 dpi×400 dpi to 1,600 dpi×1,600 dpi, and even more preferably at a resolution of 720 dpi×720 dpi. dpi represents the number of dots per 2.54 cm (1 inch).

(Irradiation Step)

The irradiation step is a step of irradiating the aqueous dispersion applied onto the recording medium with active energy rays.

By irradiating the aqueous dispersion applied onto the recording medium with active energy rays, the cross-linking reaction between the gel particles in the aqueous dispersion proceeds, the image is fixed, and hence the film hardness of the image and the like can be improved.

Examples of the active energy rays that can be used in the irradiation step include ultraviolet rays (UV light), visible rays, electron beams, and the like. Among these, UV light is preferable.

The peak wavelength of the active energy rays (light) is preferably 200 nm to 405 nm, more preferably 220 nm to 390 nm, and even more preferably 220 nm to 385 nm.

Furthermore, the peak wavelength is preferably 200 nm to 310 nm or 200 nm to 280 nm.

At the time of the irradiation of the active energy rays (light), the illuminance of the exposure surface is 10 $mW/cm^2$ to 2,000 $mW/cm^2$ for example, and preferably 20 $mW/cm^2$ to 1,000 $mW/cm^2$.

As the source for generating the active energy rays (light), a mercury lamp, a metal halide lamp, a UV fluorescent lamp, a gas laser, a solid-state laser, and the like are widely known.

Furthermore, industrially and environmentally, it is extremely useful to substitute the aforementioned light sources with a semiconductor ultraviolet light-emitting devices.

Among the semiconductor ultraviolet light-emitting devices, a light emitting diode (LED) and a laser diode (LD) are expected to be good light sources because they are compact, have long service life and high efficiency, and incur low costs.

As the light source, a metal halide lamp, an ultra-high pressure mercury lamp, a high-pressure mercury lamp, a medium-pressure mercury lamp, a low-pressure mercury lamp, LED, or a blue-violet laser is preferable.

In a case where a sensitizer and a photopolymerization initiator are used in combination, among the above light sources, an ultra-high pressure mercury lamp that can radiate light having a wavelength of 365 nm, 405 nm, or 436 nm, a high-pressure mercury lamp that can radiate light having a wavelength of 365 nm, 405 nm, or 436 nm, or LED that can radiate light having a wavelength of 355 nm, 365 nm, 385 nm, 395 nm, or 405 nm is more preferable, and LED that can radiate light having wavelength of 355 nm, 365 nm, 385 nm, 395 nm, or 405 nm is most preferable.

In the irradiation step, the time for which the aqueous dispersion applied onto the recording medium is irradiated with the active energy rays is 0.01 seconds to 120 seconds for example, and preferably 0.1 seconds to 90 seconds.

As the irradiation conditions and the basic irradiation method, the irradiation conditions and the irradiation method disclosed in JP1985-132767A (JP-S60-132767A) can also be applied.

Specifically, as the irradiation method of the active energy rays, a method, in which a light source is provided on both sides of a head unit including an ink jet device and the head unit as well as the light source are scanned by a so-called shuttle method, or a method, in which the irradiation of the active energy rays is performed by a separate light source that is not driven, is preferable.

It is preferable that the irradiation of the active energy rays is performed at a certain time interval (for example, 0.01 seconds to 120 seconds and preferably 0.01 seconds to 60 seconds) after the aqueous dispersion lands and is dried by heating.

(Heating and Drying Step)

If necessary, the image forming method may additionally include a heating and drying step between the application step and the irradiation step.

In the heating and drying step, it is preferable that water and an organic solvent, which is used in combination if necessary, is evaporated from the aqueous dispersion jetted onto the recording medium by using heating means, such that the image is fixed.

The heating means only needs to be able to dry water and the organic solvent which is used in combination if necessary. The heating means is not particularly limited, and examples thereof include a heat drum, hot air, an infrared lamp, a heating oven, heating by a heat plate, and the like.

The heating temperature is preferably equal to or higher than 40° C., more preferably about 40° C. to 150° C., and even more preferably about 40° C. to 80° C.

The heating time can be appropriately set in consideration of the composition of the aqueous dispersion and the printing rate.

If necessary, the aqueous dispersion fixed by heating is further optically fixed by being irradiated with the active energy rays in the irradiation step. As described above, in the irradiation step, it is preferable that the aqueous dispersion is fixed by UV light.

EXAMPLES

Hereinafter, the present invention will be more specifically described based on examples, but the present invention is not limited to the examples as long as the gist of the present invention is maintained.

<Synthesis of Isocyanate Compound (NCO 104)>

10 g of trimethylolpropane (TMP), 57.91 g of 1,3-bis(isocyanatomethyl)cyclohexane (HXDI), and 126.11 g of ethyl acetate (AcOEt) were put into a three-neck flask and heated to 50° C. Then, 0.194 g of NEOSTANN U-600 (manufactured by NITTO KASEI CO., LTD., inorganic bismuth catalyst) was added thereto and reacted for 3 hours, thereby obtaining NCO 104.

NCO 104 is an isocyanate compound having three or more functional groups that does not have a polymerizable group.

<Synthesis of Isocyanate Compound (NCO 202)>

10 g of trimethylolpropane (TMP), 57.91 g of 1,3-bis(isocyanatomethyl)cyclohexane (HXDI), and 169.62 g of ethyl acetate (AcOEt) were put into a three-neck flask and heated to 50° C. Then, 0.261 g of NEOSTANN U-600 was added thereto and reacted for 3 hours. After the reaction, 23.43 g of BLEMMER AP-400 (manufactured by NOF CORPORATION) and 0.04 g of dihydroxytoluene (BHT) were added thereto and reacted for 3 hours at 50° C., thereby obtaining NCO 202.

NCO 202 is a polymerizable group-containing isocyanate compound having three or more functional groups.

<Synthesis of Hydrophilic Group-Containing Isocyanate Compound A>

45 g of 2,2-bis(hydroxymethyl)propionic acid (DMPA), 223.72 g of isophorone diisocyanate (IPDI), and 499.05 g of ethyl acetate (AcOEt) were put into a three-neck flask and heated to 50° C. Then, 0.7677 g of NEOSTANN U-600 was added thereto and reacted for 3 hours, thereby obtaining a hydrophilic group-containing isocyanate compound A.

The hydrophilic group-containing isocyanate compound A is an isocyanate compound having a carboxyl group as a hydrophilic group.

<Preparation of Aqueous Dispersion of Gel Particles 1 (Gel Particle Dispersion)>

(Emulsification Step)

—Preparation of Oil-Phase Component—

NCO 104 (isocyanate compound having three or more functional groups, solid content: 35% by mass) (19 g), the hydrophilic group-containing isocyanate compound A (2.51 g), a 50% by mass ethyl acetate solution (manufactured by Mitsui Chemicals, Inc., TAKENATE (registered trademark) D-116N) (3.5 g) of an adduct (an isocyanate compound into which a hydrophilic group was introduced) of trimethylolpropane, xylylene diisocyanate, and polyethylene glycol monomethyl ether (EO 90), dipentaerythritol pentaacrylate (SR-399E manufactured by Sartomer Arkema Inc.; a polymerizable monomer) (6.5 g), and IRGACURE (registered trademark) 819 (manufactured by BASF SE; a photopolymerization initiator (an internal photopolymerization initiator)) (2 g) were dissolved in ethyl acetate (18 g), thereby obtaining an oil-phase component.

The isocyanate compound into which the hydrophilic group in D-116N is introduced has, as a hydrophilic group, a group represented by Formula (WS) described above in which $R^{W1}$ represents an ethylene group, $R^{W2}$ represents a methyl group, and nw is 90.

—Preparation of Water-Phase Component—

0.4 g of sodium dodecyl sulfate (SDS; a surfactant) was dissolved in 50 g of distilled water, thereby obtaining a water-phase component.

The oil-phase component was mixed with the water-phase component, the obtained mixture was emulsified using a homogenizer for 10 minutes at 12,000 rpm, thereby obtaining an emulsion.

(Gelification Step)

The obtained emulsion was added to 15 g of distilled water and stirred for 30 minutes at room temperature and then for 3 hours at 50° C., such that the ethyl acetate was distilled away.

Thereafter, the resultant was further stirred for 24 hours at 50° C. and then diluted with distilled water such that the concentration of the solid content (that is, the amount of the total solid content of the gel particles 1) became 30% by mass, thereby obtaining an aqueous dispersion of the gel particles 1 (gel particle dispersion).

(Checking Whether Aqueous Dispersion Contains Gel Particles Having Polymerizable Group)

By the method described below, whether the aqueous dispersion of the gel particles 1 actually contained gel particles (that is, whether the gel particles 1 are actually gel particles) was checked. The operation described below was performed under the condition of a liquid temperature of 25° C.

From the aqueous dispersion of the gel particles 1 obtained as above, a sample was collected. Tetrahydrofuran (THF) having a mass 100 times the mass of the total solid content (gel particles 1) in the sample was added to and mixed with the collected sample, thereby preparing a diluted solution of the aqueous dispersion of the gel particles 1. The obtained diluted solution was subjected to centrifugation (80,000 rpm, 40 minutes). After centrifugation, whether or not the there was a residue was checked by visual observation. In a case where a residue was checked, water was added to the residue, and the resultant was stirred for 1 hour by using a stirrer. The residue was redispersed in water in this way, thereby obtaining a redispersion liquid. For the obtained redispersion liquid, by using a wet-type particle size distribution measurement apparatus (LA-910, manufactured by HORIBA, Ltd.), the particle size distribution was measured by a light scattering method. In a case where the particle size distribution was checked by the operation described above, it was determined that the aqueous dispersion contained gel particles.

As a result, it was confirmed that the aqueous dispersion of the gel particles 1 contained gel particles (that is, it was confirmed that the gel particles 1 were actually gel particles).

From the above result and the result of Fourier transform infrared spectroscopy (FT-IR), it was confirmed that the aqueous dispersion of the gel particles 1 actually contained gel particles having a polymerizable group (that is, it was confirmed that the gel particles 1 were actually gel particles having a polymerizable group).

(Measurement of Volume Average Particle Diameter of Gel Particles 1)

The volume average particle diameter of the gel particles 1 in the aqueous dispersion of the gel particles 1 was measured using the aforementioned LA-910 by a light scattering method. As a result, the volume average particle diameter of the gel particles 1 was 0.15 μm.

(Checking Whether Photopolymerization Initiator is Contained in Interior of Gel Particles)

For the aqueous dispersion of the gel particles 1, the internal content rate (%) of the photopolymerization initiator was measured. In this way, whether or not the photopolymerization initiator was actually contained in the gel particles 1 was checked. The details thereof are as described below. The operation described below was performed under the condition of a liquid temperature of 25° C.

From the aqueous dispersion of the gel particles 1, two samples (hereinafter, referred to as "sample 1A" and "sample 2A") of the same mass were collected.

Tetrahydrofuran (THF) having a mass 100 times the mass of the total solid content in the sample 1A was added to the sample 1A, thereby preparing a diluted solution. The obtained diluted solution was subjected to centrifugation under the condition of 80,000 rpm and 40 minutes. The supernatant (hereinafter, referred to as "supernatant 1A") generated by the centrifugation was collected. The mass of the photopolymerization initiator contained in the collected supernatant 1A was measured using a liquid chromatography device "Waters 2695" of WATERS. The obtained mass of the photopolymerization initiator was taken as "total amount of photopolymerization initiator"

Furthermore, the sample 2A was subjected to centrifugation under the same condition as in the centrifugation performed on the aforementioned diluted solution. The supernatant (hereinafter, referred to as "supernatant 2A") generated by the centrifugation was collected. The mass of the photopolymerization initiator contained in the collected supernatant 2A was measured using the aforementioned liquid chromatography device. The obtained mass of the photopolymerization initiator was taken as "amount of free photopolymerization initiator".

Based on "total amount of photopolymerization initiator" and "amount of free photopolymerization initiator", the internal content rate (% by mass) of the photopolymerization initiator was determined according to the following equation.

Internal content rate (% by mass) of photopolymerization initiator=((total amount of photopolymerization initiator−amount of free photopolymerization initiator)/total amount of photopolymerization initiator)×100

As a result, it was confirmed that the internal content rate of the photopolymerization initiator in the gel particles 1 was equal to or higher than 99%, and the photopolymerization initiator was contained in the interior of gel particles 1.

(Checking Whether Polymerizable Monomer is Contained in Interior of Gel Particles)

For the aqueous dispersion of the gel particles 1, the internal content rate (%) of a polymerizable monomer was measured. In this way, whether or not the polymerizable monomer was contained in the interior of the gel particles was checked.

Whether or not the polymerizable monomer was contained in the interior of the gel particles was checked by the same method as the method used for checking whether the photopolymerization initiator was contained in the interior of the gel particles.

As a result, it was confirmed that the internal content rate was equal to or higher than 99% in the gel particles 1, and the polymerizable monomer was contained in the interior of the gel particles.

<Preparation of Aqueous Dispersion of Gel Particles 2 (Gel Particle Dispersion)>

An aqueous dispersion of gel particles 2 was prepared by performing the same operation as in the preparation of the aqueous dispersion of the gel particles 1, except that in preparing the oil-phase component in the process of preparing the aqueous dispersion of the gel particles 1, 19 g of NCO 104 was changed to 38 g of NCO 202 (a polymerizable group-containing isocyanate compound having three or more functional groups, solid content: 35% by mass), and SR-399E (a polymerizable monomer) was not incorporated into the oil-phase component. The prepared aqueous dispersion of the gel particles 2 was measured and checked in the same manner as the manner used for measuring and checking the aqueous dispersion of the gel particles 1.

It was confirmed that just as the aqueous dispersion of the gel particles 1, the aqueous dispersion of the gel particles 2 actually contained gel particles having a polymerizable group (that is, it was confirmed that the gel particles 2 were actually gel particles having a polymerizable group).

The volume average particle diameter of the gel particles 2 was 0.15 μm.

Furthermore, it was confirmed that the internal content rate of the photopolymerization initiator in the gel particles 2 was equal to or higher than 99%, and the photopolymerization initiator was contained in the interior of the gel particles 2.

<Preparation of Aqueous Dispersion of Gel Particles 3 (Gel Particle Dispersion)>

An aqueous dispersion of gel particles 3 was prepared by performing the same operation as in the preparation of the aqueous dispersion of the gel particles 1, except that in preparing the oil-phase component in the process of preparing the aqueous dispersion of the gel particles 1, 2-isopropylthioxanthone (ITX; a sensitizer) (0.5 g) was further incorporated into the oil-phase component. The prepared aqueous dispersion of the gel particles 3 was measured and checked in the same manner as the manner used for measuring and checking the aqueous dispersion for the gel particles 1.

It was confirmed that just as the aqueous dispersion of the gel particles 1, the aqueous dispersion of the gel particles 3 also actually contained gel particles having a polymerizable group (that is, it was confirmed that the gel particles 3 were actually gel particles having a polymerizable group).

The volume average particle diameter of the gel particles 3 was 0.15 μm.

It was confirmed that the internal content rate of the photopolymerization initiator in the gel particles 3 was equal to or higher than 99%, and the photopolymerization initiator was contained in the interior of the gel particles 3.

It was confirmed that the internal content rate of the polymerizable monomer in the gel particles 3 was equal to or higher than 99%, and the polymerizable monomer was contained in the interior of the gel particles 3.

(Checking Whether Sensitizer is Contained in Interior of Gel Particles)

For the dispersion liquid of the gel particles 3, the internal content rate (%) of a sensitizer was measured. In this way, whether or not the sensitizer was contained in the interior of the gel particles 3 was checked.

Whether or not the sensitizer was contained in the interior of the gel particles 3 was checked by the same method as the method used for checking whether the photopolymerization initiator was contained in the interior of the gel particles.

As a result, it was confirmed that the internal content rate of the sensitizer in the gel particles 3 was equal to or higher than 99%, and the sensitizer was contained in the interior of the gel particles 3.

<Preparation of Aqueous Dispersions of Gel Particles 4 to 6 (Gel Particle Dispersion)>

The same operation as in "Preparation of aqueous dispersion of gel particles 1" described above was performed, except that the type of the photopolymerization initiator was changed as shown in Table 4.

It was confirmed that just as the aqueous dispersion of the gel particles 1, the aqueous dispersions of the gel particles 4 to 6 actually contained gel particles having a polymerizable group (that is, it was confirmed that the gel particles 4 to 6 were actually gel particles having a polymerizable group).

The volume average particle diameter of each of the gel particles 4 to 6 was 0.15 μm.

It was confirmed that the internal content rate of the photopolymerization initiator in each of the gel particles 4 to 6 was equal to or higher than 99%, and the photopolymerization initiator was contained in the interior of the gel particles 4 to 6.

Table 4 shows the overview of the gel particles 1 to 6 (Gel particle Nos. 1 to 6).

TABLE 4

| | | Polymerizable group | | | |
|---|---|---|---|---|---|
| Gel particle No. | Internal photopolymerization initiator | Polymerizable group in three-dimensional cross-linked structure | Internal polymerizable monomer | Internal sensitizer | Particle diameter (μm) |
| 1 | IRG 819 | Absent | SR-399E | Absent | 0.15 |
| 2 | IRG 819 | Present | Absent | Absent | 0.15 |
| 3 | IRG 819 | Absent | SR-399E | ITX | 0.15 |
| 4 | IRG 907 | Absent | SR-399E | Absent | 0.15 |
| 5 | IRG 369 | Absent | SR-399E | Absent | 0.15 |
| 6 | IRG 184 | Absent | SR-399E | Absent | 0.15 |

The internal photopolymerization initiators shown in Table 4 are as below.

IRG 819 . . . IRGACURE (registered trademark) 819 (an acylphosphine oxide compound; specifically, bis(2,4,6-trimethylbenzoyl)-phenylphosphine oxide; manufactured by BASF SE)

IRG 907 . . . IRGACURE (registered trademark) 907 (a carbonyl compound; specifically, 2-methyl-1-(4-methylthiophenyl)-2-morpholinopropan-1-one; manufactured by BASF SE)

IRG 369 . . . IRGACURE (registered trademark) 369 (a carbonyl compound; specifically, 2-benzyl-2-dimethylamino-1-(4-morpholinophenyl)-butane-1; manufactured by BASF SE)

IRG 184 . . . IRGACURE (registered trademark) 184 (a carbonyl compound; specifically, 1-hydroxy-cyclohexyl-phenyl-ketone; manufactured by BASF SE)

Example 1

<Preparation of Ink Composition>

An ink composition of Example 1 that is an aqueous dispersion containing gel particles, a polymerizable resin, and water was prepared in the manner described below (resin mixing step).

Specifically, by using the aqueous dispersion of the gel particles 1, the aqueous dispersion or the aqueous solution of the polymerizable resin shown in the following Table 5, and other components in the makeup described below, an ink composition having the following makeup was prepared as an aqueous dispersion containing the gel particles 1, a polymerizable resin, and water.

In the following makeup, the amount (% by mass) of the total solid content of the gel particles 1 is the amount of the total solid content (that is, the total solid content of the gel particles 1) in the aqueous dispersion of the gel particles 1 with respect to the total amount of the ink composition (described as "Total amount of ink" in Tables 5 to 7).

In the following makeup, the content of a polymerizable resin (% by mass) is the amount of the solid content (that is, the polymerizable resin) of the aqueous dispersion or the aqueous solution of the polymerizable resin shown in Table 5 with respect to the total amount of the ink composition (the same is true for Tables 6 and 7 which will be described later).

—Makeup of Ink Composition—

Total solid content of gel particles 1 . . . 3.0% by mass

Polymerizable resin . . . 12% by mass

Pigment dispersion liquid (Pro-jet (registered trademark) Cyan APD1000 (FUJIFILM Imaging Colorants, Inc, pigment concentration: 14% by mass) . . . 10% by mass Fluorine-based surfactant (manufactured by DuPont, Capstone FS-31, solid content: 25% by mass) . . . 0.3% by mass 2-Methylpropanediol . . . 4.3% by mass Water . . . balance that makes the total amount become 100% by mass.

<Evaluation>

By using the aforementioned ink composition, the following evaluation was performed.

The results are shown in Table 5.

(Adhesiveness of Cured Film)

The adhesiveness was evaluated using a sample for evaluation (PVC), a sample for evaluation (A-PET), and a sample for evaluation (Acryl) described below.

The sample for evaluation (PVC) was prepared in a manner in which a polyvinyl chloride (PVC) sheet as a substrate was coated with the ink composition obtained as above at a thickness of 12 μm by using a No. 2 bar of K HAND COATER manufactured by RK PrintCoat Instruments Ltd, and the obtained coating film was dried by being heated for 3 minutes at 60° C.

The sample for evaluation (A-PET) was prepared in the same manner as in the preparation of the sample for evaluation (PVC), except that the substrate was changed to an amorphous polyethylene terephthalate (A-PET) sheet.

The sample for evaluation (Acryl) was prepared in the same manner as in the preparation of the sample for evaluation (PVC), except that the substrate was changed to an acryl resin sheet.

As the PVC sheet, the A-EPT sheet, and the acryl resin sheet, the following sheets were used.

PVC sheet: "AVERY (registered trademark) 400 GLOSS WHITE PERMANENT" manufactured by AVERY DENNISON CORPORATION.

A-PET sheet: "A-PET" manufactured by Takiron Co., Ltd (an amorphous polyethylene terephthalate sheet)

Acryl resin sheet: "ACRYACE (registered trademark) UV" manufactured by JSP.

During the evaluation of the adhesiveness, as an exposure device, an experimental UV miniconveyor device CSOT (manufactured by Yuasa Power Supply Ltd.) was used which was equipped with an ozoneless metal halide lamp MAN 250L and in which a conveyor speed was set to be 35 m/min and an exposure intensity was set to be 2.0 W/$cm^2$.

By being irradiated with UV light (ultraviolet rays) by using the aforementioned exposure device, the coating film of each of the samples for evaluation was cured and becomes a cured film.

The cured film was subjected to a crosshatch test based on ISO 2409 (cross-cut method), and evaluated according to the evaluation standards described below.

During the crosshatch test, cuts were made at an interval of 1 mm, and in this way, 25 square lattices having a size of 1 mm×1 mm were formed.

In the evaluation standards described below, 0 or 1 is an acceptable level for practical use.

In the evaluation standards described below, the proportion (%) of peeled lattices is a value obtained by the following equation. The total number of lattices in the following equation is 25.

Proportion (%) of peeled lattices=[(number of peeled grids)/(total number of grids)]×100

—Evaluation Standards of Adhesiveness of Cured Film—

0: The proportion (%) of peeled lattices was 0%.

1: The proportion (%) of peeled lattices was higher than 0% and equal to or lower than 5%.

2: The proportion (%) of peeled lattices was higher than 5% and equal to or lower than 15%.

3: The proportion (%) of peeled lattices was higher than 15% and equal to or lower than 35%.

4: The proportion (%) of peeled lattices was higher than 35% and equal to or lower than 65%.

5: The proportion (%) of peeled lattices was higher than 65%.

(Pencil Hardness of Cured Film)

The pencil hardness of the cured film was evaluated using the aforementioned sample for evaluation (PVC).

In the same manner as in the preparation of the adhesiveness of the cured film, the coating film of the sample for evaluation (PVC) was irradiated with UV light and cured, thereby preparing a cured film.

By using UNI (registered trademark) manufactured by MITSUBISHIPENCIL CO., LTD as a pencil, a pencil hardness test was performed on the cured film based on JIS K5600-5-4 (1999).

In the test results, the acceptable range of the pencil hardness is equal to or higher than HB, and it is preferable that the pencil hardness is equal to or higher than H. A printed material having a pencil hardness of equal to or lower than B is not preferable, because such a printed material is likely to be scratched when it is handled.

(Surface Conditions of Cured Film)

The surface conditions of the cured film were evaluated using the aforementioned sample for evaluation (PVC).

In the same manner as in the evaluation of the adhesiveness of the cured film, the coating film of the sample for evaluation (PVC) was cured by being irradiated with UV light, thereby obtaining a cured film.

The surface of the cured film was visually observed, and the surface conditions of the cured film were evaluated according to the standards described below.

—Evaluation Standards of Surface Conditions of Cured Film—

A: No cloudiness or aggregate was observed on the surface of the cured film, and the surface conditions of the cured film were extremely excellent.

B: Although slight cloudiness was observed on the surface of the cured film, no aggregate was observed, and the surface conditions of the cured film were excellent.

C: The cloudiness and slight aggregate were observed on the surface of the cured film, and the surface conditions of the cured film were poorer than the surface conditions of a film graded B.

D: The cloudiness and aggregate were observed on the surface of the cured film, and the surface conditions of the cured film were poorer than the surface conditions of a film graded C.

(Jetting Properties of Ink Composition)

The ink composition obtained as above was jetted from a head of an ink jet printer (SP-300V, manufactured by Roland DG Corporation) for 30 minutes, and then the jetting was stopped.

Five minutes after the jetting was stopped, the ink composition was jetted again from the aforementioned head onto the aforementioned polyvinyl chloride (PVC) sheet, thereby forming a 5 cm×5 cm solid image.

By visually observing the image, whether or not dead pixels occurred due to defective nozzles and the like was checked, and the jetting properties of the ink composition were evaluated according to the evaluation standards described below.

—Evaluation Standards of Jetting Properties of Ink Composition—

A: The dead pixels occurring due to defective nozzles and the like were not observed, and an excellent image was obtained.

B: Although a small number of dead pixels occurring due to defective nozzles and the like were observed, the dead pixels were unproblematic for practical use.

C: Dead pixels occurred due to defective nozzles and the like, and the image was in appropriate for practical use.

D: The ink composition could not be jetted from the head.

<Redispersibility of Ink Composition>

By performing the following operation under yellow light, the redispersibility of the ink composition obtained as above was evaluated.

By using a No. 2 bar of K HAND COATER manufactured by RK PrintCoat Instruments Ltd, an aluminum plate was coated with the ink composition obtained as above at a thickness of 12 μm, thereby forming a coating film. The obtained coating film was dried by being heated for 3 minutes at 60° C. The surface of the dried coating film was rubbed sponge impregnated with water.

For each of the coating film not yet being rubbed with the sponge and the coating film having been rubbed with the sponge, Fourier transform infrared spectroscopy (FT-IR) was performed. From the obtained results, a residual rate of the gel particles was calculated based on the following equation.

Residual rate of gel particles=(peak intensity resulting from gel particles in coating film having been rubbed with sponge/peak intensity resulting from gel particles in coating film not yet being rubbed with sponge)×100

The peak resulting from the gel particles is a peak of 1,700 $cm^{-1}$.

Based on the obtained residual rate of the gel particles, the redispersiblity of the ink composition was evaluated according to the evaluation standards described below.

—Evaluation Standards of Redispersibility of Ink Composition—

A: The residual rate of the gel particles was equal to or lower than 1%, and the redispersibility was excellent.

B: The residual rate of the gel particles was higher than 1% and equal to or lower than 5%, and the redispersibility was within an acceptable range for practical use.

C: The residual rate of the gel particles was higher than 5% and equal to or lower than 10%, and the redispersibility was outside an acceptable range for practical use.

D: The residual rate of the gel particles was higher than 10%, and the redispersibility was extremely poor.

<Storage Stability of Ink Composition>

The ink composition obtained as above was sealed into a container and left to stand for 2 weeks at 60° C. Then, the ink composition was evaluated in the same manner as in the evaluation of of jetting properties, and the storage stability of the ink composition was evaluated according to the same evaluation standards as described above.

Examples 2 to 50

The same operation as in Example 1 was performed, except that in preparing the ink composition of Example 1, at least one of the type of the aqueous dispersion or the aqueous solution of the polymerizable resin (the type of the resin), the type of the gel particles (Gel particle No.), or the amount of the total solid content of the gel particles was changed as shown in Tables 5 and 6.

The results are shown in Tables 5 and 6.

Comparative Examples 1 and 2

The same operation as in Example 5 was performed, except that in preparing the ink composition of Example 5, the aqueous dispersion of the gel particles 1 was not incorporated into the ink composition, and an external initiator shown in Table 6 was incorporated into the ink composition in the content shown in Table 6. The content of the external initiator shown in Table 6 is the content of the external initiator (solid content in a case where the aqueous dispersion of the initiator is used) with respect to the total amount of the ink composition.

The results are shown in Table 6.

Comparative Example 3

<Synthesis of Amphiphatic Urethane Acrylate (a)>

A reaction container including a stirring device, a cooling pipe, a dropping funnel, and an air introduction pipe was filled with 444.6 parts by mass of isophorone diisocyanate (IPDI) and 202.3 parts by mass of 1,12-dodecanediol. While the components were being stirred, 0.26 parts by mass of stannous octanoate was added thereto, the internal temperature of the reaction container was increased up to 90° C., and the components were reacted for 1.5 hours. After the reaction, 700.0 parts by mass of methoxy PEG 1000 (methoxypolyethylene glycol, manufactured by TOHO Chemical Industry Co., Ltd.) and 0.54 parts by mass of stannous octanoate were added thereto, and the components were further reacted for 1.5 hours.

Thereafter, the reaction container was filled with 1300.0 parts by mass of dipentaerythritol pentaacrylate (SR399E), 1.32 parts by mass of methoquinone, and 1.06 parts by mass of stannous octanoate, and the components were mixed together. The internal temperature of the reaction container was increased up to 85° C. with air bubbling, and the components were reacted for 3 hours and then cooled, thereby obtaining an amphiphatic urethane acrylate (a).

<Preparation of Aqueous Dispersion of Comparative Particles X>

A reaction container including a stirring device, a cooling pipe, a dropping funnel, and an air introduction pipe was filled with 27.5 parts by mass of the amphiphatic urethane acrylate (a) obtained as above, 9.2 parts by mass of VISCOAT #802 (a mixture of tripentaerythritol acrylate, mono- and dipentaerythritol acrylate, and polypentaerythritol acrylate, a polymerizable monomer, manufactured by OSAKA ORGANIC CHEMICAL INDUSTRY LTD), 5 parts by mass of DIANAL (registered trademark) BR-113 (resin), and 3.3 parts by mass of LUCIRIN (registered trademark) TPO (2,4,6-trimethylbenzoyl-diphenyl-phosphine oxide, a photopolymerization initiator, manufactured by BASF SE). While the components were being stirred, the internal temperature of the container was increased up to 80° C. and kept as it was for 2 hours.

Thereafter, the internal temperature of the container was cooled to 50° C., and then while the components were being stirred, 60 parts by mass of deionized water was added thereto. The solution was kept at 40° C. for 1 hour. Subsequently, the solution was diluted with deionized water such that the concentration of the nonvolatile fraction (the amphiphatic urethane acrylate (a), the polymerizable monomer, BR-113, and the photopolymerization initiator) became 20% by mass, thereby obtaining an aqueous dispersion of comparative particles 1.

The comparative particles 1 are not gel particles (that is, the comparative particles 1 are not gelified).

Then, the same operation as in Example 5 was performed, except that in preparing the ink composition of Example 5, the aqueous dispersion of the gel particles 1 was changed to the aqueous dispersion of the comparative particles 1.

The results are shown in Table 6.

TABLE 5

| | Ink composition | | | | | | | | Evaluation result | | | | | | | |
|---|---|---|---|---|---|---|---|---|---|---|---|---|---|---|---|---|
| | Polymerizable resin | | | Gel particles | | | External initiator | | | | | | | Adhesiveness | | |
| | Type of aqueous dispersion or aqueous solution of polymerizable resin | Type of polymerizable resin | Content of polymerizable resin (% by mass) | Gel particle No. | Amount of total solid content: Content with respect to total amount of ink (% by mass) | Amount of total solid content: Content with respect to total amount of polymerizable resin (% by mass) | Type | Content (% by mass) | Pencil hardness | Surface conditions | Storage stability | Redispersibility | Jetting properties | PVC | A-PET | Acryl |
| Example 1 | R-444 | Polyurethane | 12 | 1 | 3.0 | 25.0 | N/A | 0 | 2H | A | A | A | A | 0 | 0 | 0 |
| Example 2 | YS-103 | Polyurethane | 12 | 1 | 3.0 | 25.0 | N/A | 0 | 2H | A | A | A | A | 0 | 0 | 0 |
| Example 3 | YS-105 | Polyurethane | 12 | 1 | 3.0 | 25.0 | N/A | 0 | 2H | A | A | A | A | 0 | 0 | 0 |
| Example 4 | 8105 | Polyurethane | 12 | 1 | 3.0 | 25.0 | N/A | 0 | 2H | A | A | A | A | 0 | 0 | 0 |
| Example 5 | U7571 | Polyurethane | 12 | 1 | 3.0 | 25.0 | N/A | 0 | 2H | A | A | A | A | 0 | 0 | 0 |
| Example 6 | U7849 | Polyurethane | 12 | 1 | 3.0 | 25.0 | N/A | 0 | 2H | A | A | A | A | 0 | 0 | 0 |
| Example 7 | U7655 | Polyurethane | 12 | 1 | 3.0 | 25.0 | N/A | 0 | 2H | A | A | A | A | 0 | 0 | 0 |
| Example 8 | UV100A | Polyurethane | 12 | 1 | 3.0 | 25.0 | N/A | 0 | 2H | A | A | A | A | 0 | 0 | 0 |
| Example 9 | UV100B | Polyurethane | 12 | 1 | 3.0 | 25.0 | N/A | 0 | 2H | A | A | A | A | 0 | 0 | 0 |
| Example 10 | LR8983 | Polyurethane | 12 | 1 | 3.0 | 25.0 | N/A | 0 | 2H | A | A | A | A | 0 | 0 | 0 |
| Example 11 | 400AU | Polyurethane | 12 | 1 | 3.0 | 25.0 | N/A | 0 | 2H | A | A | A | A | 0 | 0 | 0 |
| Example 12 | 800AU | Polyurethane | 12 | 1 | 3.0 | 25.0 | N/A | 0 | 2H | A | A | A | A | 0 | 0 | 0 |
| Example 13 | CD9035 | EO-modified acrylate | 12 | 1 | 3.0 | 25.0 | N/A | 0 | H | A | A | A | A | 0 | 1 | 0 |
| Example 14 | E11 | EO-modified acrylate | 12 | 1 | 3.0 | 25.0 | N/A | 0 | H | A | A | A | A | 0 | 1 | 0 |
| Example 15 | E2000 | Polyurethane | 12 | 1 | 3.0 | 25.0 | N/A | 0 | 2H | A | A | A | A | 0 | 0 | 0 |
| Example 16 | U7655 | Polyurethane | 12 | 1 | 12.0 | 100.0 | N/A | 0 | 2H | B | A | A | A | 0 | 1 | 0 |
| Example 17 | U7655 | Polyurethane | 12 | 1 | 9.0 | 75.0 | N/A | 0 | 2H | A | A | A | A | 0 | 0 | 0 |
| Example 18 | U7655 | Polyurethane | 12 | 1 | 6.0 | 50.0 | N/A | 0 | 2H | A | A | A | A | 0 | 0 | 0 |
| Example 19 | U7655 | Polyurethane | 12 | 1 | 4.2 | 35.0 | N/A | 0 | 2H | A | A | A | A | 0 | 0 | 0 |
| Example 20 | U7655 | Polyurethane | 12 | 1 | 1.8 | 15.0 | N/A | 0 | 2H | A | A | A | A | 0 | 0 | 0 |
| Example 21 | U7655 | Polyurethane | 12 | 1 | 1.2 | 10.0 | N/A | 0 | 2H | A | A | A | A | 0 | 0 | 0 |
| Example 22 | U7655 | Polyurethane | 12 | 1 | 0.6 | 5.0 | N/A | 0 | 2H | A | A | A | A | 0 | 0 | 0 |
| Example 23 | U7655 | Polyurethane | 12 | 1 | 0.4 | 3.0 | N/A | 0 | H | A | A | A | A | 0 | 1 | 0 |
| Example 24 | U7655 | Polyurethane | 12 | 1 | 0.1 | 1.0 | N/A | 0 | F | A | A | A | A | 0 | 1 | 0 |
| Example 25 | 800AU | Polyurethane | 12 | 1 | 12.0 | 100.0 | N/A | 0 | 2H | B | A | A | A | 0 | 1 | 0 |

TABLE 5-continued

| | Ink composition: Polymerizable resin: Type of aqueous dispersion or aqueous solution of polymerizable resin | Ink composition: Polymerizable resin: Type of polymerizable resin | Ink composition: Polymerizable resin: Content of polymerizable resin (% by mass) | Ink composition: Gel particles: Gel particle No. | Ink composition: Gel particles: Amount of total solid content: Content with respect to total amount of ink (% by mass) | Ink composition: Gel particles: Amount of total solid content: Content with respect to total amount of polymerizable resin (% by mass) | Ink composition: External initiator: Type | Ink composition: External initiator: Content (% by mass) | Evaluation result: Pencil hardness | Evaluation result: Surface conditions | Evaluation result: Storage stability | Evaluation result: Redispersibility | Evaluation result: Jetting properties | Evaluation result: Adhesiveness: PVC | Evaluation result: Adhesiveness: A-PET | Evaluation result: Adhesiveness: Acryl |
|---|---|---|---|---|---|---|---|---|---|---|---|---|---|---|---|---|
| Example 26 | 800AU | Polyurethane | 12 | 1 | 9.0 | 75.0 | N/A | 0 | 2H | A | A | A | A | 0 | 0 | 0 |
| Example 27 | 800AU | Polyurethane | 12 | 1 | 6.0 | 50.0 | N/A | 0 | 2H | A | A | A | A | 0 | 0 | 0 |
| Example 28 | 800AU | Polyurethane | 12 | 1 | 4.2 | 35.0 | N/A | 0 | 2H | A | A | A | A | 0 | 0 | 0 |
| Example 29 | 800AU | Polyurethane | 12 | 1 | 1.8 | 15.0 | N/A | 0 | 2H | A | A | A | A | 0 | 0 | 0 |
| Example 30 | 800AU | Polyurethane | 12 | 1 | 1.2 | 10.0 | N/A | 0 | 2H | A | A | A | A | 0 | 0 | 0 |
| Example 31 | 800AU | Polyurethane | 12 | 1 | 0.6 | 5.0 | N/A | 0 | 2H | A | A | A | A | 0 | 0 | 0 |
| Example 32 | 800AU | Polyurethane | 12 | 1 | 0.4 | 3.0 | N/A | 0 | H | A | A | A | A | 0 | 1 | 0 |
| Example 33 | 800AU | Polyurethane | 12 | 1 | 0.1 | 1.0 | N/A | 0 | F | A | A | A | A | 0 | 1 | 0 |

TABLE 6

| | Ink composition | | | | | | | |
|---|---|---|---|---|---|---|---|---|
| | Polymerizable resin | | | Gel particles | | | | |
| | | | | | Amount of total solid content | | | |
| | Type of aqueous dispersion or aqueous solution of polymerizable resin | Type of polymerizable resin | Content of polymerizable resin (% by mass) | Gel particle No. | Content with respect to total amount of ink (% by mass) | Content with respect to total amount of polymerizable resin (% by mass) | External initiator Type | External initiator Content (% by mass) |
| Example 34 | YS-103 | Polyurethane | 12 | 2 | 3.0 | 25.0 | N/A | 0 |
| Example 35 | U7571 | Polyurethane | 12 | 2 | 3.0 | 25.0 | N/A | 0 |
| Example 36 | UV100B | Polyurethane | 12 | 2 | 3.0 | 25.0 | N/A | 0 |
| Example 37 | LR8983 | Polyurethane | 12 | 2 | 3.0 | 25.0 | N/A | 0 |
| Example 38 | 800AU | Polyurethane | 12 | 2 | 3.0 | 25.0 | N/A | 0 |
| Example 39 | CD9035 | EO-modified acrylate | 12 | 2 | 3.0 | 25.0 | N/A | 0 |
| Example 40 | E2000 | Polyurethane | 12 | 2 | 3.0 | 25.0 | N/A | 0 |
| Example 41 | YS-103 | Polyurethane | 12 | 3 | 3.0 | 25.0 | N/A | 0 |
| Example 42 | U7571 | Polyurethane | 12 | 3 | 3.0 | 25.0 | N/A | 0 |
| Example 43 | UV100A | Polyurethane | 12 | 3 | 3.0 | 25.0 | N/A | 0 |
| Example 44 | LR8983 | Polyurethane | 12 | 3 | 3.0 | 25.0 | N/A | 0 |
| Example 45 | 800AU | Polyurethane | 12 | 3 | 3.0 | 25.0 | N/A | 0 |
| Example 46 | CD9035 | EO-modified acrylate | 12 | 3 | 3.0 | 25.0 | N/A | 0 |
| Example 47 | E2000 | Polyurethane | 12 | 3 | 3.0 | 25.0 | N/A | 0 |
| Example 48 | 800AU | Polyurethane | 12 | 4 | 3.0 | 25.0 | N/A | 0 |
| Example 49 | 800AU | Polyurethane | 12 | 5 | 3.0 | 25.0 | N/A | 0 |
| Example 50 | 800AU | Polyurethane | 12 | 6 | 3.0 | 25.0 | N/A | 0 |
| Comparative Example 1 | U7571 | Polyurethane | 12 | N/A | 0 | 0 | IRG2959 | 1.0 |
| Comparative Example 2 | U7571 | Polyurethane | 12 | N/A | 0 | 0 | IRG819DW | 3.0 |
| Comparative Example 3 | U7571 | Polyurethane | 12 | Comparative particles X | 3.0 | 25.0 | N/A | 0 |

| | Evaluation result | | | | | | | |
|---|---|---|---|---|---|---|---|---|
| | Pencil hardness | Surface conditions | Storage stability | Redispersibility | Jetting properties | Adhesiveness PVC | Adhesiveness A-PET | Adhesiveness Acryl |
| Example 34 | 2H | A | A | A | A | 0 | 0 | 0 |
| Example 35 | 2H | A | A | A | A | 0 | 0 | 0 |
| Example 36 | 2H | A | A | A | A | 0 | 0 | 0 |
| Example 37 | 2H | A | A | A | A | 0 | 0 | 0 |
| Example 38 | 2H | A | A | A | A | 0 | 0 | 0 |
| Example 39 | 2H | A | A | A | A | 0 | 1 | 0 |
| Example 40 | 2H | A | A | A | A | 0 | 0 | 0 |
| Example 41 | 3H | A | A | A | A | 0 | 0 | 0 |
| Example 42 | 3H | A | A | A | A | 0 | 0 | 0 |
| Example 43 | 3H | A | A | A | A | 0 | 0 | 0 |
| Example 44 | 3H | A | A | A | A | 0 | 0 | 0 |
| Example 45 | 3H | A | A | A | A | 0 | 0 | 0 |
| Example 46 | 3H | A | A | A | A | 0 | 1 | 0 |
| Example 47 | 3H | A | A | A | A | 0 | 0 | 0 |
| Example 48 | H | A | A | A | A | 0 | 0 | 0 |
| Example 49 | H | A | A | A | A | 0 | 0 | 0 |
| Example 50 | H | A | A | A | A | 0 | 0 | 0 |
| Comparative Example 1 | 2B | A | B | B | A | 3 | 4 | 4 |
| Comparative Example 2 | 2B | A | D | B | D | 3 | 4 | 4 |
| Comparative Example 3 | B | A | D | C | D | 3 | 4 | 4 |

The types of the aqueous dispersions of the polymerizable resin in Tables 5 and 6 (as well as Table 7 which will be described later) are as below.

R-444 . . . "NeoRad R-444" manufactured by DSM, an aqueous dispersion of polyurethane having a polymerizable group YS-103 . . . an aqueous dispersion of polyurethane having a polymerizable group, manufactured by UBE INDUSTRIES, LTD.

YS-105 . . . an aqueous dispersion of polyurethane having a polymerizable group, manufactured by UBE INDUSTRIES, LTD.

8105 . . . an aqueous dispersion of polyurethane having a polymerizable group, manufactured by UBE INDUSTRIES, LTD.

U7571 . . . "UCECOAT 7571" manufactured by DAICELL-ALLNEX LTD., an aqueous dispersion of polyurethane (weight-average molecular weight: 10,000) having a polymerizable group U7849 . . . "UCECOAT 7849" manufactured by DAICELL-ALLNEX LTD., an aqueous dispersion of polyurethane (weight-average molecular weight: 10,000) having a polymerizable group U7655 . . . "UCECOAT 7655" manufactured by DAICELL-ALLNEX LTD., an aqueous dispersion of polyurethane (weight-average molecular weight: 10,000) having a polymerizable group UA100A . . . "HYDRAN UV100A" manufactured by DIC Corporation, an aqueous dispersion of polyurethane having a polymerizable group UA100B . . . "HYDRAN UV100B" manufactured by DIC Corporation, an aqueous dispersion of polyurethane having a polymerizable group LR8983 . . . "Laromer LR8983" manufactured by BASF SE, an aqueous dispersion of polyurethane (volume average particle diameter: 50 nm) having a polymerizable group 400AU . . . "DA-400AU" manufactured by NOF CORPORATION, an aqueous dispersion of polyurethane (weight-average molecular weight: 800) having a polymerizable group 800AU . . . "DA-800AU" manufactured by NOF CORPORATION, an aqueous solution of polyurethane (weight-average molecular weight: 1,100) having a polymerizable group CD9035 . . . manufactured by Sartomer Arkema Inc., an aqueous solution of ethylene oxide (EO)-modified acrylate (weight-average molecular weight: 960)

E11 . . . "EBECRYL 11" manufactured by DAICELL-ALLNEX LTD., an aqueous solution of ethylene oxide (EO)-modified acrylate E2000 . . . "EBECRYL 2000" manufactured by DAICELL-ALLNEX LTD., an aqueous solution of polyurethane having a polymerizable group The types of the external initiator in Tables 5 and 6 (and Table 7 which will be described later) are as below.

IRG2959 . . . IRGACURE (registered trademark) 2959 (1-[4-(2-hydroxyethoxy)-phenyl]-2-hydroxy-2-methyl-1-propan-1-one; manufactured by BASF SE)

IRG819DW . . . IRGACURE (registered trademark) 819DW (an aqueous dispersion of IRGACURE 819; manufactured by BASF SE)

As shown in Tables 5 and 6, the ink composition (aqueous dispersion) of each of the examples, which contains a resin having a polymerizable resin, gel particles having a polymerizable group and a three-dimensional cross-linked structure containing at least one kind of bond selected from a urethane bond and a urea bond and containing a photopolymerization initiator in the interior of the gel particles, and water, and in which the amount of the total solid content of the gel particles with respect to the resin having a polymerizable group is 0.1% by mass to 100% by mass, was excellent in the storage stability, the redispersibility, and the jetting properties. Furthermore, a film formed of the aqueous dispersion of each of the examples was excellent in the pencil hardness, the surface conditions, and the adhesiveness between the film and the substrate.

In contrast, in Comparative Examples 1 and 2 which contained an external initiator but did not contain gel particles, the pencil hardness of the film, the adhesiveness between the film and the substrate, and the like deteriorated.

Specifically, in Comparative Example 1 in which IRG2959 was used as an external initiator, the pencil hardness of the film and the adhesiveness between the film and the substrate further deteriorated than in each of the examples. It is considered that the above result was obtained because the sensitivity of IRG2959 was poorer than that of the internal photopolymerization initiator of each of the examples, and the content of IRG2959 (1.0% by mass with respect to the total amount of the ink composition) could not be reduced owing to the low solubility of IRG2959 in water.

In Comparative Example 2 in which IRG819DW was used as an external additive, the pencil hardness of the film and the adhesiveness between the film and the substrate further deteriorated than in each of the examples, and the storage stability also deteriorated Comparative Example 2. It is considered that due to the influence of the dispersant in IRG819DW used for dispersing IRG819 in water, the sensitivity deteriorated, and hence the pencil hardness and the adhesiveness deteriorated. In addition, in Comparative Example 2, although the use of the dispersant for dispersing IRG819 in water is regarded as a cause of the deterioration of the storage stability, the dispersibility of the photopolymerization initiator that is poorer than the dispersibility of the gel particles in each of the examples is considered as a main cause of the deterioration of the storage stability.

In Comparative Example 3 in which the comparative particles X not being gelified were used instead of gel particles, the storage stability, the redispersibility, and the jetting properties deteriorated. Furthermore, the film formed in Comparative Example 3 had low pencil hardness and exhibited poor adhesiveness with respect to the substrate, compared to the film formed in Example 5.

<Evaluation Using LED>

The ink composition of each of the examples of the comparative examples shown in Table 7 was evaluated using LED.

Specifically, the same operation as described above was performed, except that in evaluating each of the examples regarding the pencil hardness, the surface conditions, and the adhesiveness, the exposure light source was changed to an experimental 385 nm UV-LED irradiator (manufactured by CCS Inc.), and the exposure energy was changed to 300 $mJ/cm^2$.

The results are shown in Table 7.

TABLE 7

| | Ink composition | | | | | | | | Evaluation result obtained using LED light | | | | |
|---|---|---|---|---|---|---|---|---|---|---|---|---|---|
| | Polymerizable resin | | | Gel particles | | | External initiator | | | | Adhesiveness | | |
| | | | | | Amount of total solid content | | | | | | | | |
| | | | | | Content | | | | | | | | |
| | Type of aqueous dispersion or aqueous solution of polymerizable resin | Type of polymerizable resin | Content of polymerizable resin (% by mass) | Gel particle No. | Content with respect to total amount of ink (% by mass) | Content with respect to total amount of polymerizable resin (% by mass) | Type | Content (% by mass) | Pencil hardness | Surface conditions | PVC | A-PET | Acryl |
| Example 3 | YS-105 | Polyurethane | 12 | 1 | 3.0 | 25.0 | N/A | 0 | 2H | A | 0 | 0 | 0 |
| Example 5 | U7571 | Polyurethane | 12 | 1 | 3.0 | 25.0 | N/A | 0 | 2H | A | 0 | 0 | 0 |
| Example 9 | UV100B | Polyurethane | 12 | 1 | 3.0 | 25.0 | N/A | 0 | 2H | A | 0 | 0 | 0 |
| Example 12 | 800AU | Polyurethane | 12 | 1 | 3.0 | 25.0 | N/A | 0 | 2H | A | 0 | 0 | 0 |
| Example 15 | E2000 | Polyurethane | 12 | 1 | 3.0 | 25.0 | N/A | 0 | 2H | A | 0 | 0 | 0 |
| Example 17 | U7655 | Polyurethane | 12 | 1 | 9.0 | 75.0 | N/A | 0 | 2H | A | 0 | 0 | 0 |
| Example 19 | U7655 | Polyurethane | 12 | 1 | 4.2 | 35.0 | N/A | 0 | 2H | A | 0 | 0 | 0 |
| Example 20 | U7655 | Polyurethane | 12 | 1 | 1.8 | 15.0 | N/A | 0 | 2H | A | 0 | 0 | 0 |
| Example 22 | U7655 | Polyurethane | 12 | 1 | 0.6 | 5.0 | N/A | 0 | 2H | A | 0 | 0 | 0 |
| Example 23 | U7655 | Polyurethane | 12 | 1 | 0.4 | 3.0 | N/A | 0 | H | A | 0 | 1 | 0 |
| Example 27 | 800AU | Polyurethane | 12 | 1 | 6.0 | 50.0 | N/A | 0 | 2H | A | 0 | 0 | 0 |
| Example 28 | 800AU | Polyurethane | 12 | 1 | 4.2 | 35.0 | N/A | 0 | 2H | A | 0 | 0 | 0 |
| Example 30 | 800AU | Polyurethane | 12 | 1 | 1.2 | 10.0 | N/A | 0 | 2H | A | 0 | 0 | 0 |
| Example 31 | 800AU | Polyurethane | 12 | 1 | 0.6 | 5.0 | N/A | 0 | 2H | A | 0 | 0 | 0 |
| Example 32 | 800AU | Polyurethane | 12 | 1 | 0.4 | 3.0 | N/A | 0 | H | A | 0 | 1 | 0 |
| Example 34 | YS-103 | Polyurethane | 12 | 2 | 3.0 | 25.0 | N/A | 0 | 2H | A | 0 | 0 | 0 |
| Example 35 | U7571 | Polyurethane | 12 | 2 | 3.0 | 25.0 | N/A | 0 | 2H | A | 0 | 0 | 0 |
| Example 36 | UV100B | Polyurethane | 12 | 2 | 3.0 | 25.0 | N/A | 0 | 2H | A | 0 | 0 | 0 |
| Example 37 | LR8983 | Polyurethane | 12 | 2 | 3.0 | 25.0 | N/A | 0 | 2H | A | 0 | 0 | 0 |
| Example 38 | 800AU | Polyurethane | 12 | 2 | 3.0 | 25.0 | N/A | 0 | 2H | A | 0 | 0 | 0 |
| Example 41 | YS-103 | Polyurethane | 12 | 3 | 3.0 | 25.0 | N/A | 0 | 3H | A | 0 | 0 | 0 |
| Example 42 | U7571 | Polyurethane | 12 | 3 | 3.0 | 25.0 | N/A | 0 | 3H | A | 0 | 0 | 0 |
| Example 43 | UV100A | Polyurethane | 12 | 3 | 3.0 | 25.0 | N/A | 0 | 3H | A | 0 | 0 | 0 |
| Example 44 | LR8983 | Polyurethane | 12 | 3 | 3.0 | 25.0 | N/A | 0 | 3H | A | 0 | 0 | 0 |
| Example 45 | 800AU | Polyurethane | 12 | 3 | 3.0 | 25.0 | N/A | 0 | 3H | A | 0 | 0 | 0 |
| Comparative Example 1 | U7571 | Polyurethane | 12 | N/A | 0 | 0 | IRG2959 | 1.0 | <5B | D | 5 | 5 | 5 |
| Comparative Example 2 | U7571 | Polyurethane | 12 | N/A | 0 | 0 | IRG819DW | 3.0 | 2B | A | 3 | 4 | 4 |
| Comparative Example 3 | U7571 | Polyurethane | 12 | Comparative particles X | 3.0 | 25.0 | N/A | 0 | B | A | 3 | 4 | 4 |

As shown in Table 7, in the evaluation of the pencil hardness, the surface conditions, and the adhesiveness by using LED light, the ink composition of each of the examples yielded better results, compared to the ink composition of each of the comparative examples.

Among Comparative Examples 1 to 3, particularly in Comparative Example 1, because IRG2959 did not absorb LED light, the curing properties markedly deteriorated, and hence the pencil hardness, the surface conditions, and the adhesiveness significantly deteriorated (see Tables 6 and 7).

The entire content of JP2015-171418 filed on Aug. 31, 2015 is incorporated into the present specification by reference.

All of the documents, the patent applications, and the technical standards described in the present specification are incorporated into the present specification by reference, as if each of the documents, the patent applications, and the technical standards is specifically and independently described by reference.

What is claimed is:

1. An inkjet ink, comprising:

a resin having a polymerizable group and having a functional group selected from the group consisting of a carboxyl group, a salt of a carboxyl group, a sulfo group, a salt of a sulfo group, a sulfuric acid group, a salt of a sulfuric acid group, a phosphonic acid group, a salt of a phosphonic acid group, a phosphoric acid group, a salt of a phosphoric acid group, an ammonium base, a hydroxyl group, a carboxylic acid amide group, and an alkyleneoxy group;

a gel particle which comprises a polymerizable group, comprises a three-dimensional cross-linked structure comprising at least one selected from the group consisting of a urethane bond and a urea bond, and comprises a photopolymerization initiator in the interior of the gel particle; and water, wherein a total amount of a solid content of the gel particle with respect to a total amount of the resin having a polymerizable group is 0.1% by mass to 100% by mass, and wherein the gel particle further comprises a hydrophilic group on a surface of the gel particle, the hydrophilic group being a group represented by the following Formula (WS):

$$*\!-\!(R^{W1}\!-\!O)_{nw}\!-\!R^{W2} \qquad \text{Formula (WS)}$$

wherein, in Formula (WS), $R^{W1}$ represents an alkylene group having 1 to 6 carbon atoms that may be branched, $R^{W2}$ represents an alkyl group having 1 to 6 carbon atoms that may be branched, nw represents an integer from 2 to 200, and * represents a binding position.

2. The inkjet ink according to claim 1, wherein the photopolymerization initiator comprises at least one selected from the group consisting of a carbonyl compound and an acylphosphine oxide compound.

3. The inkjet ink according to claim 1, wherein the gel particle comprises a polymerizable monomer in the interior of the gel particle.

4. The inkjet ink according to claim 1, wherein the gel particle comprises a sensitizer in the interior of the gel particle.

5. The inkjet ink according to claim 1, wherein the resin having a polymerizable group comprises a polyurethane structure.

6. The inkjet ink according to claim 1, wherein a total amount of a solid content of the gel particle with respect to a total amount of the resin having a polymerizable group is 5% by mass to 75% by mass.

7. The inkjet ink according to claim 1, wherein a content of the resin having a polymerizable group with respect to a total amount of the inkjet ink is 2% by mass to 40% by mass.

8. A method for manufacturing the inkjet ink according to claim 1, the method comprising:

preparing a gel particle dispersion comprising the gel particle and water; and mixing the gel particle dispersion with the resin having a polymerizable group to obtain the inkjet ink.

9. The method for manufacturing the inkjet ink according to claim 8, wherein the preparation comprises:

obtaining an emulsion by mixing and emulsifying any one oil-phase component selected from the group consisting of an oil-phase component comprising a photopolymerization initiator, an isocyanate compound having three or more functional groups, a polymerizable monomer, and an organic solvent, an oil-phase component comprising a photopolymerization initiator, a polymerizable group-containing isocyanate compound having three or more functional groups, and an organic solvent, and an oil-phase component comprising a photopolymerization initiator, a polymerizable group-containing isocyanate compound having three or more functional groups, a polymerizable monomer, and an organic solvent, with a water-phase component comprising water; and obtaining the gel particle dispersion by heating the emulsion.

10. The method for manufacturing the inkjet ink according to claim 9, wherein the isocyanate compound having three or more functional groups in the oil-phase component comprises an isocyanate compound derived from at least one selected from the group consisting of isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane 4,4'-diisocyanate.

11. An inkjet recording method, comprising:

applying the inkjet ink according to claim 1 onto a recording medium; and irradiating the inkjet ink applied onto the recording medium with an active energy ray.

12. The inkjet ink of claim 1, where $R^{W1}$ represents an ethylene group.

* * * * *